US006300887B1

United States Patent
Le

(10) Patent No.: US 6,300,887 B1
(45) Date of Patent: Oct. 9, 2001

(54) EFFICIENT HANDOFF PROCEDURE FOR HEADER COMPRESSION

(75) Inventor: Khiem Le, Coppell, TX (US)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/522,497

(22) Filed: Mar. 9, 2000

Related U.S. Application Data

(60) Provisional application No. 60/164,329, filed on Nov. 9, 1999.

(51) Int. Cl.[7] .................................................. H03M 7/00
(52) U.S. Cl. ............................................................ 341/60
(58) Field of Search ............................. 341/60; 709/247, 709/216, 217, 246

(56) References Cited

U.S. PATENT DOCUMENTS

| | | | |
|---|---|---|---|
| 6,032,197 | * | 2/2000 | Birdwell .................. 709/247 |
| 6,094,453 | * | 7/2000 | Gosselin .................. 375/240 |

* cited by examiner

*Primary Examiner*—Brian Young
(74) *Attorney, Agent, or Firm*—Antonelli, Terry, Stout & KRaus, LLP

(57) ABSTRACT

The invention is a method of relocating of header compression/decompression functions between a plurality of network entities and mobile compressors and/or mobile decompressors. A method of communication in a packet network which transmits packets having compressed headers in accordance with the invention includes establishing a connection between a first network node and a second network node including storing context information used with compression and decompression of the headers of the packets at the first and second nodes; and changing the connection between the first network node and the second network node to a connection between the second network node and a third network node including transferring the context information representative of the context information stored by the first node to the third network node which is stored by the third node as the context information of the third node and using the stored context information at the second and third nodes for compression and decompression of the headers of the packets at the second and third nodes.

264 Claims, 35 Drawing Sheets

Procedure for Downlink Traffic

Procedure for Uplink Traffic

FIG. 14

|  | Delta | VLE with feedback | Implicit encoding |
|---|---|---|---|
| Downlink (Fig. 11) | Compression context component = value in header last acked<br><br>Compression context component Identifier = RTP SN, or some short form, of header last acked<br><br>Decompression context component identical to compression context component (trivial derivation) | Compression context component = (V_min, V_max)<br><br>Compression context component Identifier = RTP SN, or some short form, of last compressed header and RTP SN, or some short form, of header last acked<br><br>Decompression context component derived from compression context component = Value in the header last acked | Compression context component = static value<br><br>Compression context component Identifier is empty (not needed, there is only one choice)<br><br>Decompression context component identical to compression context component (trivial derivation) |

FIG. 15

| | Delta | VLE with feedback | Implicit encoding |
|---|---|---|---|
| Uplink (Fig. 12) | Decompression context component = value in header last acked<br><br>Decompression context component Identifier = RTP SN, or some short form, of header last acked<br><br>Compression context component identical to decompression context component (trivial derivation) | Decompression context component = Value in header last decompressed<br><br>Decompression context component Identifier = RTP SN, or some short form, of header last decompressed<br><br>Compression context component derived from decompression context component is (V_min, V_max), where V_min = V_max = value in header identified by DC_u_Id | Same as (Fig. 11) Downlink |

FIG. 16

| | Delta | VLE with feedback | Implicit encoding |
|---|---|---|---|
| Downlink (Fig. 8&9) | Compression context component sent from old ANI_AD to new ANI_AD = value in header last acked | Compression context component sent from old ANI_AD to new ANI_AD = (V_min, V_max) | Compression context component sent from old ANI_AD to new ANI_AD = static value |

FIG. 17

| | Delta | VLE with feedback | Implicit encoding |
|---|---|---|---|
| Uplink (Fig. 10) | Decompression context component sent from old ANI_AD to new ANI_AD = value in header last acked | Decompression context component sent from old ANI_AD to new ANI_AD = Value last decompressed | Decompression context component sent from old ANI_AD to new ANI_AD = static value |

FIG. 18

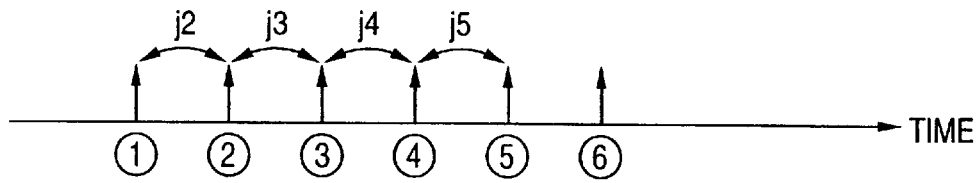

j2 = JITTER OF PACKET 2 WITH RESPECT TO 1
j3 = JITTER OF PACKET 3 WITH RESPECT TO 2
j4 = JITTER OF PACKET 4 WITH RESPECT TO 3
| j5 = JITTER OF PACKET 5 WITH RESPECT TO 4 | ← DONE AT PACKET 5

NETWORK JITTER FOR PACKET 2 = j2
NETWORK JITTER FOR PACKET 3 = j3
NETWORK JITTER FOR PACKET 4 = j4, etc.

FIG. 19

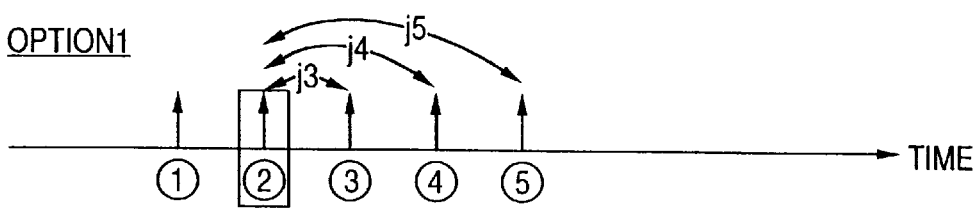

PACKET 2 IS THE REFERENCE.

N_JITTER(3, 2) = j3 = JITTER OF PACKET 3 WITH RESPECT TO REFERENCE
    ASSUME j3 = 2

N_JITTER(4, 2) = j4 = JITTER OF PACKET 4 WITH RESPECT TO REFERENCE
    ASSUME j4 = 3

| N_JITTER(5, 2) = j5 = JITTER OF PACKET 5 WITH RESPECT TO REFERENCE
    ASSUME j5 = -1 |

BEFORE PKT 5:  N_JITTER_MIN = 2    N_JITTER_MAX = 3
   AT PKT 5:  N_JITTER_MIN = -1   N_JITTER_MAX = 3

| N_JITTER_MAX_N_JITTER_MIN = 3 - (-1) = 4 |

MAX NETWORK JITTER = 4 FOR PACKET 5

CALCULATE JITTER OF PACKET 5 WITH RESPECT TO 1: j(5,1) = 2 = N_JITTER (5,1)
CALCULATE JITTER OF PACKET 5 WITH RESPECT TO 2: j(5,2) = 3 = N_JITTER (5,2)
CALCULATE JITTER OF PACKET 5 WITH RESPECT TO 3: j(5,3) = 4 = N_JITTER (5,3)
CALCULATE JITTER OF PACKET 5 WITH RESPECT TO 4: j(5,4) = 7 = N_JITTER (5,4)
MAX NETWORK JITTER = 7 FOR PACKET 5

FIG. 21

|  | Timer option 1 | Timer option 2a | Timer option 2b |
|---|---|---|---|
| HO with handshake, downlink traffic (FIG. 8&9) | At ST1, the old ANI_AD queries the MS_AD for its decompression context component<br><br>At ST2, the MS_AD takes a snapshot of its decompression context component = (p_TS_RFH, T_RFH, TS0, TS_stride) stores it, and returns identifier to old ANI_AD identifier is RFH in short form. RFH is last decompressed header. T_RFH is timer value of RFH at decompressor (R_timer) Old ANI_AD derives the compression context component = (p_TS_RFH, T_RFH, TS0, TS_stride, current value of S_timer) and sends to new ANI_AD<br><br>New ANI_AD loads its S_timer with current value of S_timer, stores the other data and initializes its window W to consist of RFH. It also initializes N_jitter_max = N_jitter_min = 0 T_RFH is timer value of RFH at compressor (S_timer)<br><br>After radio HO, the new ANI_AD takes over compression using its context component; MS_AD uses the decompression context component stored at ST2. Additionally, there is an optional context transfer optimization. | Same as option 1, except no N_jitter_max nor N_jitter_min | Same as option 1, except no N_jitter_max nor N_jitter_min |

FIG. 22

| | Timer option 1 | Timer option 2a | Timer option 2b |
|---|---|---|---|
| HO with handshake, uplink traffic (FIG. 8) | At ST1, the old ANI_AD takes a snapshot of its decompression context component and sends identifier to MS_AD<br><br>Decompression context = (p_TS_RFH, T_RFH, TS0, TS_stride, current value of R_timer)<br><br>At ST2, the MS_AD derives the corresponding compression context component = (p_TS_RFH, N_jitter_max = N_jitter_min = 0 T_RFH, TS0,TS_stride), stores it and returns ack<br><br>At ST3, the old ANI_AD sends to the new ANI_AD = (p_TS_RFH, T_RFH, TS0, TS_stride, current value of R_timer) - Note: this current value of R_timer may differ from the one in ST1.<br><br>New ANI_AD loads its R_timer with current value of R_timer, and stores the other data.<br><br>Right after HO, MS_AD initializes its window W to consist of RFH and uses the stored context to compress; new ANI_AD decompresses with context component stored at ST3<br><br>Additionally, there is an optional context transfer optimization | Same as option 1, except no N_jitter_max nor N_jitter_min | Same as option 1, except no N_jitter_max nor N_jitter_min |

FIG. 23

| | Timer option 1 | Timer option 2a | Timer option 2b |
|---|---|---|---|
| HO without handshake, downlink traffic (FIG. 11) | Old ANI_AD sends to new ANI_AD compression context component CC_d = (p_TS_RFH, T_RFH, TS0, TS_stride, current value of S_timer) N_jitter_max = N_jitter_min = 0<br><br>CC_d_Id is the number of RFH<br><br>MS_AD retrieves as decompression context component the packed RTP TS and timer value of RFH<br><br>If the MS_AD cannot find the decompression context in sync with CC_d, it will select one, and send its identifier to the new ANI_AD. The new ANI_AD then derives a compression context in sync with the decompression context selected by MS_AD, and use it for compression. | Same as option 1, except no N_jitter_max nor N_jitter_min | Old ANI_AD sends to new ANI_AD compression context component CC_d = {(TS_j, T_j) for all headers j in window W, TS0 TS_stride, current value of S_timer}<br><br>If W does not have any misordering, CC_d_Id is the range of sequesnce numbers of headers in W. If W has misordering an alternative scheme is used, or all the headers in W are listed<br><br>Examples of W without misordering: headers listed in the order they are sent = {3, 4, 5, 7, 9} Example of W with misordering: headers listed in the order they are sent = {3, 4, 2, 1}<br><br>MS_AD retrieves as decompression context component the packed RTP TS and timer value of any header in the range<br><br>New ANI_AD uses the window management scheme, with window initialized with the window received from the old ANI_AD |

FIG. 24

|  | Timer option 1 | Timer option 2a | Timer option 2b |
|---|---|---|---|
| HO without handshake, uplink traffic (FIG. 12) | Decompression context component selected by old ANI_AD DC_u = (p_TS_RFH, T_RFH)<br><br>DC_u_Id = RFH in short form is piggybacked on HO command<br><br>Decompression context component transferred from old ANI_AD to new ANI_AD is DC_u = (p_TS_RFH, T_RFH, TS0, TS_stride, current value of R_timer<br><br>Right after radio HO, MS_AD uses new window W consisting of RFH<br><br>Right after radio HO, new ANI_AD uses DC_u to decompress; subsequently it updates its decompression context component with received headers<br><br>Additionally, there is an optional context transfer optimization described below | Same as option 1 | Same as option 1, but in addition, after radio HO, MS_AD then uses the window management scheme, with window initialized with RFH |

FIG. 25

| | Timer option 1 | Timer option 2a | Timer option 2b |
|---|---|---|---|
| HO without handshake, downlink traffic (FIG. 8&9) | Solution 1<br>Compression context component sent at ST1 = (p_TS_RFH, T_RFH, TS0, TS_stride, N_jitter_max, N_jitter_min, current value of S_timer)<br><br>When the new ANI_AD receives the context component, it loads its S_timer with the current value of S_timer, and starts to compress. It subsequently continuously updates its context component with the flow of incoming headers and acks from MS_AD<br><br>Additionally, there is an optional context transfer optimization<br><br>Solution 2: See Wait-for-ack-from-MS scheme | Solution 1<br>Compression context component sent at ST1 = {(p_TS_j, T_j) for all headers j in window W, TS0, TS_stride, current value of S_timer}<br><br>The rest is the same as option 1 | Solution 1<br>Compression context component sent at ST1 = (p_TS_j, T_j) for all headers j in window W, TS0, TS_stride, current value of S_timer}<br><br>When the new ANI_AD receives the context component, it loads its S_timer with the current value of S_timer, and starts to compress. It subsequently continuously updates its context component with the flow of incoming headers<br><br>Additionally, there is an optional context transfer optimization<br><br>Solution 2: See Wait-for-window-full scheme |

FIG. 26

|  | Timer option 1 | Timer option 2a | Timer option 2b |
|---|---|---|---|
| HO without handshake, uplink traffic (FIG. 10) | See Wait-for-ack-from-old-ANI_AD scheme | Same as option 1 | Same as option 1 |

FIG. 27

| | Compression Context Information | |
|---|---|---|
| | FO context information | SO context information |
| Context information component for implicit encoding | Values of the static fields: e.g. IP addresses, UDP port numbers, etc. | Values of the static fields: e.g. IP addresses, UDP port numbers, etc. |
| Context information component for VLE | $(V\_min, V\_max)$ for the RTP SN and $(V\_min, V\_max)$ for the IP-ID | FOD = +1 for RTP SN, +1 for IP-ID |
| Context information component for timer-based | $\{(p\_TS\_j, T\_j)\}$ for all headers j in window W, TS0, TS_stride, current value of S_timer} <br> p_TS_j = packed RTP TS of header j <br> T_j: Value of S_timer when header j was received | FOD = TS_stride |
| Context information component for direct encoding | None | None |

FIG. 28

| | Decompression Context Information | |
|---|---|---|
| | FO context information | SO context information |
| Context information component for implicit encoding | Values of the static fields: e.g. IP addresses, UDP port numbers, etc. | Values of the static fields: e.g. IP addresses, UDP port numbers, etc. |
| Context information component for VLE | V_last for the RTP SN and V_last for the IP-ID | FOD = +1 for RTP SN, +1 for IP-ID |
| Context information component for timer-based | (p_TS_last, T_last, TS0, TS_stride, current value of R_timer) p_TS_last = packed RTP TS of last header decompressed T_last: Value of R_timer when last header decompressed was received | FOD = TS_stride |
| Context information component for direct encoding | None | None |

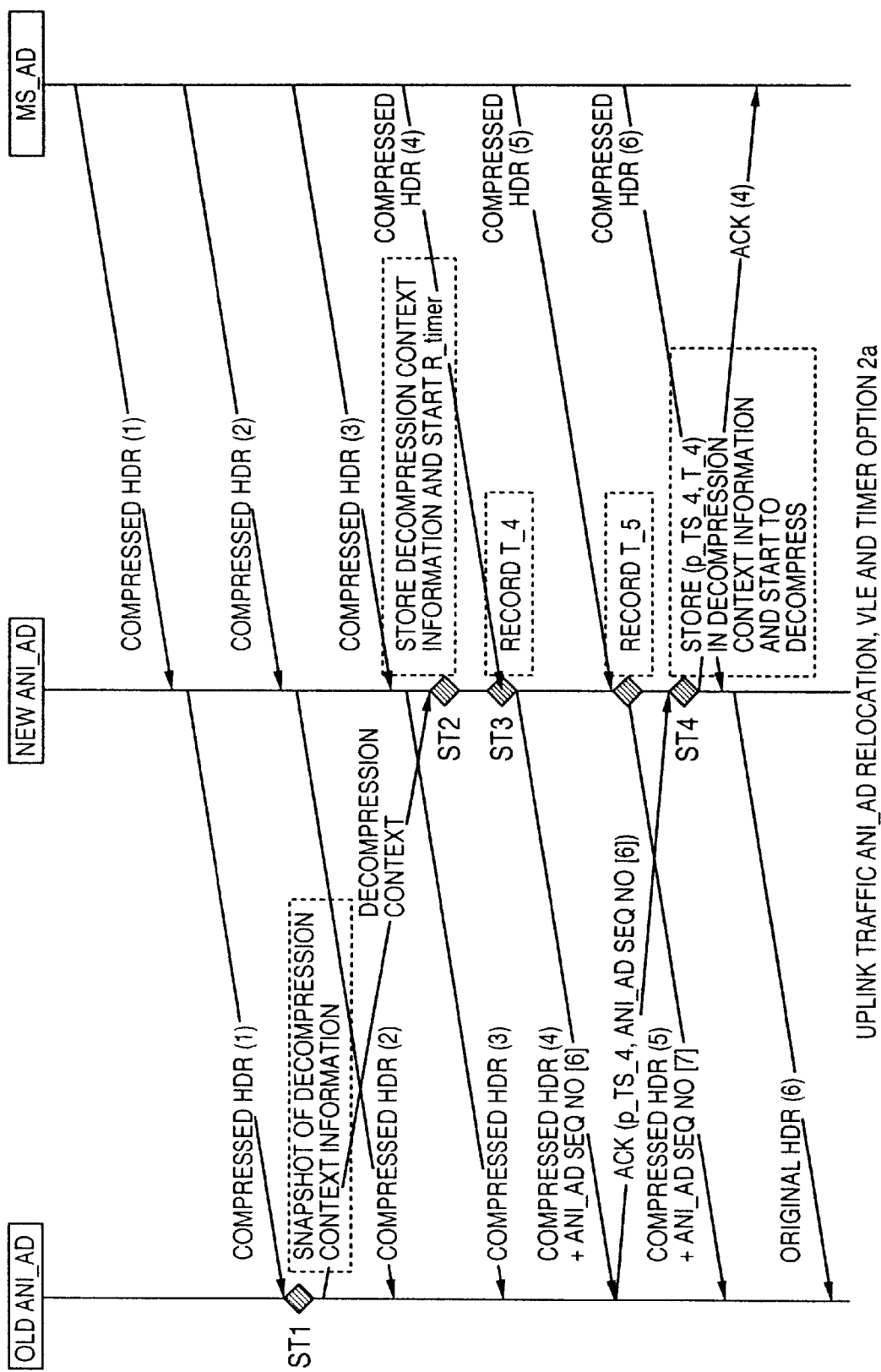

EFFICIENT HANDOFF PROCEDURE FOR HEADER COMPRESSION

CROSS REFERENCE TO RELATED APPLICATIONS

This application claims the filing date of U.S. provisional application Ser. No. 60/164,329, filed Nov. 9, 1999, entitled "An Efficient Handoff Procedure for Header Compression".

Reference is also made to U.S. patent application Ser. No. 09/522,363, entitled "A Technique for Compressing a Header Field in a Data Packet", filed on even date herewith, which application is incorporated herein by reference in its entirety.

BACKGROUND OF THE INVENTION

1. Field of the Invention

The invention relates to the relocation of header compression/decompression functions between a plurality of network entities and mobile terminals.

2. Description of the Prior Art

Carrying real-time multi-media traffic over IP-based network has become of great interest since the real-time transport protocol has been introduced. Due to the large size of the IP/UDP/RTP header, that is undesirable in low bandwidth networks such as wireless networks, suitable header compression mechanisms are needed. All known RTP header compression techniques require the storing of context information used for compression and decompression of headers of packets at the compressor (transmitter) and decompressor (receiver) and to initialize the compression/decompression process by sending essentially full headers. When header compression/decompression is utilized with a wireless link, headers sent on the uplink traffic are compressed by the mobile terminal and decompressed by a network entity. In the downlink traffic, the network entity compresses the headers, and the mobile terminal decompresses the headers.

In normal operation of compression/decompression, the decompression context information is in synchronism with the compression context information, in the sense that when the decompression context information is used to decompress a header that was compressed with the compression context information, the original uncompressed header is reconstructed. Both the compression context information and decompression context information may be continuously updated by the compressor and decompressor respectively, based on the incoming headers, etc. However, the two contexts normally stay in synchronism.

When a mobile terminal is handed off to another radio cell served by another network entity, if no efficient procedure is defined to transfer the context information to the new network entity, the header compression/decompression process has to again proceed through reinitialization, which entails sending full headers in both the downlink traffic and the uplink traffic. Such a reinitialization with full headers is both disruptive of the ongoing communications and consumes the bandwidth over the air interface. The transfer of compression and decompression context information is a challenge because the compression/decompression process is asynchronous relative to and independent of the handoff process, since the former is driven by the flow of packets, while the latter is driven by the radio conditions. Hence, by the time the new network entity uses the transferred context information, it may already be out-of-synchronism with the contexts at the mobile terminal.

FIG. 1 illustrates the problem in the prior art involving transfer of compression and decompression context information associated with radio handoff. There is a non zero handoff preparation time (time ST1 to time ST2), during which the compression and decompression context information may be updated by the old network entity thus rendering the transferred value of the compression and decompression context information stale. Consequently, compression and decompression after the radio handoff is incorrect. In addition, the mobile terminal (MS) may be involved in information exchange, but transfer of information over the air interface should be kept to a minimum.

In RFC 2508, a short sequence number is included in each packet in order to detect error or packet loss. When the decompressor receives a header with a sequence number that is not consecutive from the previous one, packet loss is detected and a recovery scheme is employed to resynchronize the compressor and decompressor.

Just using a short sequence number to detect packet loss is not robust to an error-prone network, such as wireless network where 'long loss' may happen frequently. Long loss is defined as the loss of 'sequence cycle' or more packets in a row.

When long loss occurs, the sequence number in the packet received by decompressor 'wraps around'. For example, assuming the sequence number consists of k bits, hence the sequence cycle equals to $2^k$ packets. If $2^k$ packets are lost in a row, the decompressor fails to detect the packet losses since it still sees consecutive sequence number in the incoming packets.

IP/UDP/RTP header compression schemes, as described for example in RFC 2508, S. Casner, V. Jacobson "Compressing IP/UDP/RTP Headers for Low Speed Serial Links, Internet Engineering Task Force, February 1999, which is incorporated herein by reference in its entirety, take advantage of the fact that certain information fields carried in the headers either 1.) do not change ('Type 1' header fields) or 2.) change in a fairly predictable way ('Type 2' header fields). Other fields, referred to as 'Type 3' header fields, vary in such a way that they must be transmitted in some form in every packet (i.e. they are not compressible).

Examples of Type 1 header fields are the IP address, UDP port number, RTP SSRC (synchronization source), etc. These fields need only be transmitted to the receiver/decompressor once during the course of a session (as part of the packet(s) transferred at session establishment, for example). Type 1 fields are also called 'unchanging' fields.

Examples of Type 2 header fields are the RTP timestamp, RTP sequence number, and IP ID fields. All have a tendency to increment by some constant amount from packet (n) to packet (n+1). Thus, there is no need for these values to be transmitted within every header. It is only required that the receiver/decompressor be made aware of the constant increment value, hereafter referred to as the first order difference (FOD), associated with each field that exhibits this behavior. Receiver/decompressor utilizes these FODs to regenerate up-to-date Type 2 field values when reconstructing the original header. Type 2 fields are part of 'changing' fields.

It should be emphasized that, on occasion, Type 2 fields will change in some irregular way. Frequency of such events depends on several factors, including the type of media being transmitted (e.g., voice or video), the actual media source (e.g., for voice, behavior may vary from one speaker to another), and the number sessions simultaneously sharing the same IP-address.

An Example of a Type 3 header field is the RTP M-bit (Marker), which indicates the occurrence of some boundary in the media (e.g., end of a video frame). Because the media normally varies in unpredictable ways, this information cannot be truly predicted. Type 3 fields are part of 'changing' fields.

The decompressor maintains decompression context information that contains all the pertinent information related to rebuilding the header. This information is mainly type 1 fields, FOD values, and other information. When packets are lost or corrupted, the decompressor can lose synchronization with the compressor such that it can no longer correctly rebuild packets. Loss of synchronization can occur when packets are dropped or corrupted during transmission between compressor and decompressor.

Given the above, the compressor needs to transmit three different types of headers during the course of a session:

Full Header (FH): Contains the complete set of all header fields (Types 1, 2, and 3). This type of header is the least optimal to send due to its large size (e.g., 40 bytes for IPv4). In general, it is desirable to send an FH packet only at the beginning of the session (to establish Type 1 data at the receiver). Transmission of additional FH packets has adverse effects on the efficiency of the compression algorithm. When the compressor transmits FH packets, it is said to be in the 'FH state'.

First Order (FO): Contains minimal header information (e.g. Type 3 fields), compressor/decompressor specific control fields (specific to the compression algorithm in use), and information describing changes in current FOD fields. An FO packet is basically an SO packet (described below), with additional information that establishes new FOD information for one or more Type 2 fields at the decompressor. If the header compression is being applied to a VoIP (voice over internet protocol) stream, transmission of an FO packet might be triggered by the occurrence of a talk spurt after a silence interval in the voice. Such an event results in some unexpected change in the RTP timestamp value, and a need to update the RTP time stamp at the receiver by a value other than the current FOD. The size of FO packets depends on the number of Type 2 fields whose first order difference changed (and the amount of the absolute value of each change). When the compressor transmits FO packets, it is said to be in the 'FO state'.

Second Order (SO): A SO packet contains minimal header information (e.g. Type 3 fields), and compressor and decompressor specific control fields. The preferred mode of operation for the compressor and decompressor is transmission and reception of SO packets, due to their minimal size (on the order of just 2 bytes or even less). When the compressor transmits SO packets, it is said to be in the 'SO state'. SO packets are transmitted only if the current header fits the pattern of an FOD.

SUMMARY OF THE INVENTION

The present invention transfers the compression and decompression context information used for compression and decompression of the headers of packets to enable the seamless relocation of compression/decompression functions from a first old network entity (ANI_AD) to a second new network entity (ANI_AD), i.e. the entity seamlessly continues compression and decompression where the first network entity (ANI_AD) stopped. The invention is applicable to, but is not limited to IP/UDP/RTP header compression.

In a first embodiment of the invention, relocation is concurrent with radio handoff. For the downlink traffic, the first network entity queries the mobile decompressor for its decompression context information. The mobile decompressor takes a snapshot of its decompression context information, saves it and sends a representation of the context information to the first network entity. The first network entity derives the in-synchronism compression context information, and transmits it to the second network entity which stores the received context information as the context information of the second network entity; the second network entity uses the stored compression context information to compress a header of at least one packet transmitted to the mobile decompressor and the mobile decompressor uses the previously saved decompression context information to decompress the header of the at least one data packet. For the uplink traffic, the first network entity takes a snapshot of its current compression context information and sends the value thereof or a representation of the context information to the mobile compressor; the mobile compressor derives the in synchronism compression context information from the received information, saves it for subsequent use and returns an acknowledgment to the first network entity. The first network entity transmits the snapshot decompression context information to the second network entity. The mobile compressor compresses at least one header of at least one packet with the saved context information and transmits the compressed at least one header of at least one packet to the second network entity; and the second network entity decompresses the received at least one packet of the at least one header with the stored decompression context information.

In a second embodiment of the invention, the relocation of context information is deferred until after radio handoff. The transfer of the context information from the first network entity to the second network entity occurs after the radio handoff. For the downlink traffic mode, compression context information used for compressing headers of packets is transferred from the first network entity to the second network entity; the second network entity stores the received context compression information and some time after that, transmits at least one packet having a compressed header to the one mobile decompressor which is compressed by the second network entity. The second network entity also transmits notification to the first network entity of reception of the compression context information and some time after that, the first network entity stops transmitting packets having compressed headers to the second network entity. In the uplink traffic mode, decompression context information stored by the first network entity is transmitted from the first network entity to the second network entity and the second network entity stores the received context decompression information as the decompression context information used for decompressing headers of packets received from the mobile compressor; the first network entity in response to receiving at least one packet, which does not need to be the first received packet, having a compressed header transmitted from the mobile compressor transmits feedback to the second network entity and to the mobile compressor that the first network entity has received at least one packet having a compressed header and in response to the feedback the second network entity updates the stored decompression context information. In response to the storing of the decompression context information, the second network entity also decompresses at least one compressed header in a packet received from the mobile compressor and transmits the decompressed at least one header to the first network entity.

In a third embodiment of the invention, the relocation is concurrent with radio handoff. The transfer of context information from the first network entity to the second network entity occurs before and/or during radio handoff. For the downlink traffic, the first network entity takes a snapshot of the compression context information to be used at relocation; the first network transmits the snapshot compression context information to the second network entity which stores the received compression context information as compression context information used to compress headers of packets transmitted from the second network entity to the one mobile terminal. The transmission of the compression context information from the first network entity to the second network entity may include an identifier of the compression context which is transmitted by the second network entity to the mobile decompressor along with the compressed header information; and the one mobile decompressor uses the identifier to determine the decompression context information used to decompress the at least one received packet having a header compressed with the stored context information. For the uplink traffic, the first network entity selects a decompression context information to be used by the second network entity to decompress packets having compressed headers transmitted from the one mobile compressor to the second network entity; the selected decompression context information is transmitted from the first network entity to the second network entity which stores the decompression context information for decompression of headers of packets received from the one mobile terminal. A handoff command is transmitted from the first network entity to the mobile compressor and may be with the decompression context identifier. At least one packet having a compressed header from the one mobile compressor is transmitted to the second network entity and the second network entity uses the stored decompression context information to decompress at least one received packet having a compressed header received from the mobile compressor.

This invention is based on the old first network entity capturing the relevant context compression or decompression information and transmitting it to the new second network entity. No context compression information needs to be transferred within the mobile compressor and mobile decompressor. In the embodiments where relocation is concurrent with radio handoff, the mobile compressor or decompressor is informed of the handoff (when it starts communications with the second network entity).

In the first embodiment for downlink traffic, the first network entity transmits the compression context information derived from a snapshot of the decompression context information to the second network entity. At the time of snapshot, the decompression context information at the mobile decompressor whose snapshot was taken is normally in synchronism with the compression context information. However, by the time the second network entity starts to use that compression context information, the snapshot decompression context at the mobile may no longer be in synchronism with the snapshot compression context information, since the compression context may have evolved in the meantime. Therefore, at the time of snapshot, the network entity may carry out a handshake with the mobile decompressor to ensure that the mobile decompressor stores the decompression context information that is in synchronism with the compression context information. Right after handoff, the entity uses the compression context information received from the first network entity and the mobile decompressor uses the snapshot decompression context information.

For the uplink traffic, the first network entity takes a snapshot of its current decompression context information and transmits the context identifier to the mobile compressor. The mobile compressor derives the corresponding in synchronism compression context information and stores it, then returns an acknowledgment.

The first network entity sends the snapshot decompression context information to the second network entity. Right after handoff, the second network entity uses the decompression context information received from the first network entity and the mobile compressor uses the stored compression context information.

An advantage of all the above approaches is that the compressor and decompressor are allowed to update their context information at any time before and after radio handoff, for optimal compression/decompression operation. Yet the contexts whose snapshot were taken, can still be used later since the snapshot compression and decompression context informations are in synchronism.

The context compression and decompression information may be exchanged with the mobile compressor and mobile decompressor very efficiently by use of compression technologies such as numerical indices.

A method of communication in a packet network which transmits packets having compressed headers in accordance with the invention includes establishing a connection between a first network node and a second network node including storing context information used with compression and decompression of the headers of the packets at the first and second nodes; and changing the connection between the first network node and the second network node to a connection between the second network node and a third network node including transferring the context information representative of the context information stored by the first node to the third network node which is stored by the third node as the context information of the third node and using the stored context information at the second and third nodes for compression and decompression of the headers of the packets at the second and third nodes. The stored context information may be used for compressing and decompressing first and second order compressed headers. The stored context information may include at least one type of information used for compressing headers of the packets and at least one type of information used for decompressing headers of the packets. The third network node may be a network entity which is a transmitter of packets in a downlink traffic to a mobile decompressor which is the second node and the stored context information may be used by the third node to compress the headers of the packets transmitted in the downlink traffic. The second node may be a mobile compressor which is a transmitter of packets in an uplink traffic to the third node which is a network entity and the stored context information may be used by the mobile compressor to compress the headers of packets transmitted in the uplink traffic. The third network node may be a network entity which is a receiver of packets in an uplink traffic from the second node which is a mobile compressor and the stored context information may be used by the third network node to decompress the headers of the packets transmitted in the uplink traffic. The second node may be a mobile decompressor which is a receiver of packets in a downlink traffic from the third node which is a network entity and the stored context information may be used by the mobile decompressor to decompress the packets transmitted in the downlink traffic. The second node may store context information used to compress the headers of packets which are transmitted to the third node and the context information stored by the third node may be derived from the context information stored by the second node. The context information stored by the third node may be identical to the context information stored by the second node. The first network node may be a network entity which is a transmitter of packets in a downlink traffic to a mobile decompressor which is the second node and the stored context information of the first network node may be used by the first node to compress the headers of the packets transmitted in the downlink traffic. The stored context information of the first network node may be information used prior to changing the connection for compressing the headers of the packets to a first order or a second order of compression. The second node may be a mobile compressor which is a transmitter of packets in an uplink traffic, prior to changing the connection, to the first node which is a network entity and the stored context information is used by the mobile compressor to compress the headers of packets transmitted in the uplink traffic. The stored context information of the mobile compressor may be information used for compressing the headers of the packets to a first or second order of compression. The context information transmitted from the first node to the third node may comprise a context information component which is time related and the context information component which is time related may include elements related to at least one of a time stamp and an arrival time of at least one previous packet, may be a current timer value and may consist of a current timer value.

A method of transferring context information used for compression of headers of packets transmitted in a downlink traffic from one of a plurality of network entities to one of a plurality of mobile decompressors when one mobile decompressor is handed off from a first network entity to a second network entity in accordance with the invention includes storing at the first network entity context information at a time at which the mobile decompressor is to be handed off to the second network entity which is used for compression of packets transmitted from the first network entity to the one mobile decompressor; transmitting from the first network entity the stored context information to the one mobile decompressor or information representative of the context information stored at the first network entity which is used by the one mobile decompressor to obtain the stored context information of the one mobile terminal to the one mobile terminal; transmitting feedback from the one mobile decompressor to the first network entity that the stored context information or information representative of the context information has been received by the one mobile decompressor; and in response to receiving the feedback, transmitting the context information from the first network entity to the second network entity which stores the received context information. The second network entity may use the stored context information to compress the headers of packets which are transmitted to the one mobile decompressor. The stored context information used by the second network entity to compress the headers of the packets may provide a first or second order of compression of the headers. The one mobile decompressor may decompress the headers of the compressed packets transmitted from the second network entity. The stored context information used to decompress the headers of the packets transmitted from the second network entity may provide a decompression of headers having a first or second order of compression. The context information transmitted from the first network entity to the second network entity may comprise a context information component which is time related and the context information component which is time related may include elements related to at least one of a time stamp and an arrival time of at least one previous packet, may be a current timer value and may consist of a current timer value.

A method of transferring context information used for compression of headers of packets transmitted in an uplink traffic from one of a plurality of mobile compressors to one of a plurality of network entities when one mobile compressor is handed off from a first network entity to a second network entity in accordance with the invention includes sending a request to the one mobile compressor that the one mobile compressor store context information used by the one mobile compressor in the compression of the headers of packets transmitted from the one mobile compressor to the first network entity; in response to the request, storing the context information at the one mobile compressor and transmitting the stored context information or information representative of the stored context information to the first network entity; and deriving decompression context information at the first network entity from the context information received from the one mobile compressor or information representative of the stored context information received from the one mobile compressor and transmitting the decompression context information to the second network entity which stores the decompression context information. The method further includes, after storage of the decompression context information by the second network entity, handing off the one mobile compressor to the second network entity; and using the stored compression context information at the one mobile compressor to compress the headers of data packets transmitted to the second network entity. The first network entity may transmit feedback of decompression context information of the first network entity to the one mobile compressor before transmission of the decompression context information to the second network entity. The feedback may be transmitted to the one mobile compressor with the request. The stored compression context information used by the one mobile compressor to compress the headers of the packets may provide a first or second order of compression of the headers. After handoff, the one mobile compressor may compress the headers of data packets transmitted to the second network entity and the second network entity may use the stored decompression context information to decompress the headers of data packets received from the one mobile compressor. The information representative of the context information may comprise a numerical index and may be a sequence number of a packet. The first network entity may transmit to the one mobile compressor feedback of receipt of packets which have been received by the first network entity in association with the request that the first network entity store context information; the stored context information of the one mobile compressor may be updated to account for the feedback; and the updated context information or information representative of the context information of a last received packet used by the first network entity to obtain the context information may be transmitted to the second network entity. The decompression context information transmitted from the first network entity to the second network entity may comprise a context information component which is time related and the context information component which is time related may include elements related to at least one of a time stamp and an arrival time of at least one previous packet, may be a current timer value and may consist of a current timer value.

A method of transmission of packets having compressed headers in accordance with the invention includes transmitting at least one packet having a compressed header which is compressed with compression context information stored at a first node in a packet network and the compression context information to a second node in the packet data network; storing the compression context information at the second node; and transmitting the at least one packet having a compressed header from the second node to a third node in the packet network. The second node may transmit a notification to the first node that the second node has received the compression context information. The method may further include, after transmission of the at least one packet having a compressed header, the first node transmits to the second node at least one additional packet having a compressed header compressed by the compression context information stored at the first node with each additional packet being paired with a corresponding header which is not compressed; compressing the at least one corresponding header which is not compressed at the second node using the compression context information stored at the second node to produce at least one new packet having a compressed header; and transmitting the at least one new packet having a compressed header produced from the compression context stored at the second node from the second node to the third node. After the first node receives the notification, the first node may stop transmitting headers compressed by the compression context information stored at the first node. After the first node stops sending headers compressed by the compression context information stored at the first node, the first node may transmit at least one uncompressed header to the second node; the second node may compress the at least one uncompressed header received from the first node with the compression context information stored at the second node; and the second node may transmit the at least one header compressed at the second node to the third node. The method may further include, after the first node stops transmitting headers compressed by the context information stored at the first node, at least one additional packet having an uncompressed header which is received by the second node from a source other than the first node; and the second node compresses the at least one additional packet having an uncompressed header received by the second node from a source other than the first node with the compression context information stored at the second node to produce a new at least one additional packet having a compressed header; and the second node transmits the new at least one additional packet having a compressed head to the third node. The first and second nodes may be network entities in the packet network and the third node may be a mobile terminal. Performing a radio handoff from the first network entity to the second network entity may occur before transmitting the at least one packet having a compressed header which is compressed with the compression context information stored at the first node. The compression context information may be transmitted as part of the transmission of the at least one packet having a compressed header which is compressed with the compression context information stored at the first node. The compression context information may be received by the second node before the second node receives the at least one additional packet having a compressed header compressed by the compression context information stored at the first node and the corresponding header which is not compressed. Feedback may be transmitted from the third node to the second node which updates the compression context information stored by the second node based upon the feedback. The compressed headers may be headers having a first or second order of compression. The compression context information may be marked with an identification of which compressed header the compression context information is based; and the second network entity may use the identification to identify a packet upon which the compression context information is based. The second node may receive feedback from the third node of the decompression context information used to decompress headers received at the third node. When the feedback is received by the second node before the compression context information, the feedback may be used to update the compression context information stored at the second node only if the feedback is not older than a time duration of a round trip delay between the first and second nodes and is newer than a packet identified by the identification. The context information transmitted from the first node to the third node may comprise a context information component which is time related and the context information component which is time related may include elements related to a time stamp and an arrival time of at least one previous packet, may be a current timer value and may consist of a current timer value.

A method of transmission of packets having compressed headers in accordance with the invention includes transmitting at least one packet having a compressed header from a first node in a packet network to a second node in the packet network; transmitting the at least one packet having a compressed header from the second node to a third node in the packet network which stores decompression context information used by the third node to decompress the at least one packet having a compressed header; and in response to receiving the at least one packet having a compressed header at the third node transmitting decompression context information used by the third node to decompress the at least one packet having a compressed header to the second node. After the transmission of the at least one packet having a compressed header, the first node may transmit at least one additional packet having a compressed header to the second node. The second node may transmit at least one of the at least one packet having a compressed header to the third node. The second node may decompress at least one of the at least one additional packet having a compressed header received by the second node with the stored decompression context information; and the second node may transmit the decompressed at least one packet to the third node. All of the at least additional packets received by the second node after storage of the decompression context information may be decompressed at the second node with the stored context decompression information and transmitted to the third node. The second node may send feedback to the third node that the second node has stored the decompression context information. In response to the feedback, the third node may stop decompressing compressed headers received from the second node. The method further may include, in response to the third node receiving the at least one packet having a compressed header at the second node, the third node transmitting additional decompression context information based upon the third node decompressing the at least one additional packet having a compressed header; and the second node updates the stored decompression context information based upon the received additional decompression context information and decompresses at least one subsequently received packet having a compressed header received from the first node with the updated stored decompression context information. The first node may be a mobile terminal and the second and third nodes may be network entities. The compressed header of the at least one packet may comprise a first or second order compressed header. The decompression context information transmitted from the third node to the second node may comprise a context information component which is time related and the context information component which is time related may include elements related to at least one of a time stamp and an arrival time of at least one previous packet, may be a current timer value, and may consist of a current timer value.

A method of transferring context information used for compression of headers of data packets transmitted in a downlink traffic from one of a plurality of network entities to one of a plurality of mobile decompressors when one mobile decompressor is handed off from a first network entity to a second network entity in accordance with the invention includes storing at the first network entity compression context information to be used at a time at which the mobile decompressor is to be handed off from the first network entity to the second network entity for compression of headers of packets transmitted from the first network entity to the one mobile decompressor; transmitting from the first network entity to the second network entity the stored compression context information and an identifier of the compression context information which is stored by the second network entity, the compression context information stored by the second network entity being used to compress headers of packets transmitted from the second network entity to the one mobile decompressor; transmitting from the second network entity to the one mobile decompressor at least one packet having a header compressed with the compression context information stored at the second network entity and the identifier of the compression context information used to compress the at least one packet having a header compressed with the stored compression context information; and using the identifier at the one mobile decompressor to obtain decompression context information and using the stored decompression context information to decompress the at least one packet having a header compressed with the stored context compression information stored at the second network entity. The compressed headers may comprise first or second order compressed headers. Performing radio handoff of the one mobile decompressor from the first network entity to the second network entity may occur after the storing the compression context information by the first network entity and after the second network entity has stored the compression context information. A plurality of packets having a header compressed with the compression context information and a plurality of identifiers of the compression context information may be transmitted from the second network entity to the one mobile decompressor to maintain synchronization of transmissions from the second network entity to the one mobile decompressor. The second network entity, after transmission of the plurality of identifiers of the compression context information, may stop the transmission of any context identifier and continue transmitting headers compressed with the compression context information identifier. The mobile decompressor in response to reception of at least one identifier of the compression context information may transmit at least one feedback to the second network entity; and the second network entity in response to receiving the at least one feedback may stop the transmission of any identifiers and continues transmitting headers compressed with the compression context information. The at least one feedback may comprise at least one acknowledgment packet transmitted from the one mobile decompressor to the new network entity. The second network entity, in response to reception of the acknowledgment packet, may update the stored compression context information. The identifier may be a sequence number and the sequence number may be an identification number of a packet which last updated the compression context information stored by the second network entity or an identification of feedback from the one mobile decompressor to the second network entity which last updated the compression context information stored by the second network entity. The at least one packet having a header compressed with the compression context information stored at the second network entity may be produced from at least one packet having an uncompressed packet header received from the first network entity or may be produced from at least one packet having an uncompressed header received from a source other than the first network entity. The context information transmitted from the first network entity to the second network entity may comprise a context information component which is time related and the context information component which is time related may include elements related to at least one of a time stamp and an arrival time of at least one previous packet, may be a current timer value and may consist of a current timer value.

A method of transferring context information used for compression of headers of data packets transmitted in an uplink traffic from one of a plurality of mobile compressors to one of a plurality of network entities when one mobile compressor is handed off from a first network entity to a second network entity in accordance with the invention includes storing decompression context information at the first network entity to be used by the second network entity to decompress data packets having compressed headers transmitted from the one mobile compressor to the second network entity; transmitting the decompression context information to the second network entity which stores the decompression context information for decompression of headers of packets received from the one mobile compressor; transmitting a decompression context identifier which identifies the decompression context information to be used by the second network entity from the first network entity to the one mobile compressor; in response to receiving of the context identifier, the one mobile compressor deriving compression context information used for compressing headers of packets transmitted from the one mobile compressor to the second network entity; the one mobile compressor transmits at least one packet having a compressed header to the second network entity; and the second network entity uses the stored decompression context information to decompress at least one received packet having a compressed header. The identifier may be a sequence number and the sequence number may be an identification number of a packet which last updated the decompression context information stored by the second network entity or an identification of feedback from the one mobile compressor to the second network entity which last updated the decompression context information stored by the second network entity. The compressed headers may comprise first or second order compressed headers. A handoff command may be transmitted from the first network entity to the one mobile compressor after storing of the decompression context information at the first network entity which causes transfer of the one mobile compressor to the second network entity. The handoff command may be transmitted with the decompression context identifier to the one mobile compressor.

A method of transferring context information including a decompression context information component which is time related used for decompression of headers of packets transmitted in an uplink from one of a plurality of mobile compressors to one of a plurality of network entities before a relocation of a decompression function from a first network entity to a second network entity in accordance with the invention includes transmitting at least one compressed header from the one mobile compressor through second network entity to the first network entity; starting a timer at the second network entity which stores a time of reception of packets; decompressing the at least one compressed header at the first network entity; after the decompressing of the at least one compressed header at the first network entity transmitting a portion of the decompression context information component which is time related from the first network entity to the second network entity; storing the portion of the decompression context information component which is time related at the second network entity; storing a time of reception of at least one additional packet with a compressed header received from the one mobile compressor and transmitting the at least one additional packet to the first network entity which decompresses the at least one additional packet and obtains another portion of the decompression context information component which is time related; transmitting the another portion of the decompression context information component which is time related to the second network entity; and after storing of the time of reception of the at least one additional packet and the another portion of the decompression context information component which is time related storing a complete decompression context information component at the second network entity and decompressing at least one packet having a compressed header received at the second network entity using the stored complete decompression context information component. The portion may comprise non-time varying time related information including TSO and T_stride. The another portion may comprise a time stamp or other information of the at least one additional packet. An identifier may be transmitted with the at least one compressed header; the first network entity may return the identifier along with a time stamp; and the second network entity may use the identifier to correlate and determine which of the at least one compressed header with which the time stamp is associated. The identifier may be a sequence number.

A method of transferring context information including a compression context information component which is time related used for compression of headers of packets transmitted in a downlink from one of a plurality of network entities to one of a plurality of mobile decompressors before a relocation of a compression function from a first network entity to a second network entity in accordance with the invention includes starting a timer at the second network entity which stores a time of reception of packets; transmitting at least one packet having a compressed header from the first network entity to the second network entity including a portion of the compression context information component which is time related; storing the portion of the component of compression context information component which is time related at the second entity; storing a time of reception and a time stamp of the least one additional packet having a compressed header and a corresponding uncompressed header received or information elements from the corresponding uncompressed header from the first network entity at the second network entity; transmitting at least one additional packet containing the compressed header to the one mobile decompressor and decompressing the at least one additional packet at the one mobile decompressor; transmitting feedback to the second network entity that the one mobile decompressor has decompressed the at least one additional packet with a compressed header; and after reception of the feedback determining that the stored portion is sufficient to function as the compression context information component which is time related and starting compression of subsequent packets at the second network entity which are transmitted to the one mobile decompressor using the stored portion as the compression context information component which is time related. Feedback may be transmitted from the second network entity to the first network entity that the second network entity is starting compression of the subsequent packets; and the first network entity may, in response to the feedback, stopping transmission of packets having compressed headers to the second network entity. The portion of the compression context information component which is time related may comprise non-time varying time related information and may be TSO and T_stride. The feedback to the second network entity enables the second network entity to determine that the stored portion, a time stamp and a time of reception of at least one additional packet is sufficient to function as the compression context information component which is time related.

A method of transferring context information including a compression context information component which is time related used for compression of headers of packets transmitted in a downlink from one of a plurality of network entities to one of a plurality of mobile decompressors before a relocation of a compressor function from a first network entity to a second network entity in accordance with the invention includes starting a timer at the second network entity which stores a time of reception of packets; transmitting at least one packet having a compressed header from the first network entity to the second network entity including a portion of the compression context information component which is time related; storing the portion of the time related component of compression context information component which is time related at the second network entity; transmitting a plurality of additional packets having a compressed header and a corresponding uncompressed header from the first network entity to the one mobile decompressor via the second network entity; after reception of the plurality of additional packets at the second network entity having a compressed header and a corresponding uncompressed headers, storing at the second network entity a second portion of the compression context information which is time related component obtained from the plurality of additional packets; after the stored first and second portions of the compression context information components which are time related, obtaining and storing a complete compression context information component which is time related used for compression of headers at the second network entity; and using the stored complete compression context information component which is time related to compress at least one subsequent packet at the second network entity and transmitting the compressed at least one subsequent packet to the one mobile decompressor. The second portion may comprise a time stamp and time of reception of the plurality of additional packets. The at least one subsequent packet may be decompressed at the one mobile compressor. A number of the plurality of additional headers may be chosen to be sufficient to be probable that at least one of the plurality of additional headers transmitted to the one mobile decompressor is received by the one mobile decompressor.

A method of compressing headers of packets transmitted from a second entity to a third entity after the third entity has been handed off from a first entity to the second entity in accordance with the invention includes storing at the second entity original compression context information derived from a first plurality of packets; producing an additional plurality of compressed headers from uncompressed headers at the second entity using the original compression context information derived from a plurality of headers obtained by adding to the first plurality of headers new compressed headers which are transmitted to the third entity for decompression; and after transmitting the plurality of additional compressed headers, discarding the headers in the first plurality of headers and using compression context information derived from the plurality of additional compressed headers to compress at least one subsequent uncompressed header at the second entity which is transmitted as a compressed header to the third entity. The original and additional plurality of compressed headers may contain an identical number of packets. The original and additional plurality of compressed headers may be tracked by age; and after the original plurality of compressed headers are discarded, the additional plurality of compressed headers may be updated upon reception of each new header by adding each new header to the additional plurality of compressed headers and discarding an oldest compressed header in the additional plurality of compressed headers. The third entity may decompress headers of received packets using decompression context information in synchronism with an identifier contained in each received compressed packet and update decompression context information stored by the third entity from the decompressed headers. The compression context information may comprise time related information. The time related information may comprise a time stamp, a time of transmission of the packets, TSO and TS_stride. The identical number of packets may be chosen to have a probability that at least one packet is received by the third entity during a time interval required to transmit the identical number of packets. The transmission medium may be radio transmission medium. The decompression context information of the third entity may be updated with a first received packet containing a compressed header compressed by the second entity.

A method of compressing headers of packets transmitted from a third entity to a second entity after the third entity has been handed off from a first entity to the second entity in accordance with the invention includes storing at the third entity original compression context information derived from a first plurality of packets; producing an additional plurality of compressed headers from uncompressed headers at the third entity using the original compression context information derived from a plurality of headers obtained by adding to the first plurality of headers new compressed headers which are transmitted to the second entity for decompression; and after transmitting the plurality of additional compressed headers, discarding the headers in the first plurality of headers and using compression context information derived from the plurality of additional compressed headers to compress at least one subsequent uncompressed header at the third entity which is transmitted as a compressed header to the second entity. The original and additional plurality of compressed headers may contain an identical number of packets. The original and additional plurality of compressed headers may be tracked by age; and after the original plurality of compressed headers are discarded, the additional plurality of compressed headers may be updated upon reception of each new header by adding each new header to the additional plurality of compressed headers and discarding an oldest compressed header in the additional plurality of compressed headers. The second entity may decompress headers of received packets using decompression context information in synchronism with an identifier contained in each received compressed packet and update decompression context information stored by the second entity from the decompressed headers. The compression context information may comprise time related information. The time related information may comprise a time stamp, a time of transmission of the packets, TSO and TS_stride. The identical number of packets may be chosen to have a probability that at least one packet is received by the second entity. The transmission medium may be radio transmission medium. The decompression context information of the second entity may be updated with a first received packet containing a compressed header compressed by the third entity.

BRIEF DESCRIPTION OF THE DRAWINGS

FIG. 14 is a table illustrating the use of context information in accordance with the invention for downlink traffic.

FIG. 15 is a table illustrating the use of context information in accordance with the invention for uplink traffic.

FIG. 16 is a table illustrating the use of context information in accordance with the invention for downlink traffic.

FIG. 17 is a table illustrating the use of context information in accordance with the invention for uplink traffic.

FIG. 18 is a diagram illustrating the steps of calculating network jitter according to a first method.

FIG. 19 is a diagram illustrating the steps of calculating network jitter according to a second method which is option 1.

FIGS. 21–26 are tables summarizing uses of context information in accordance with the present invention.

FIGS. 27 and 28 summarize encoding FO and SO context informations respectively for compression and decompressor in accordance with the present invention.

FIGS. 35 and 36 illustrate embodiments of the invention respectively in a downlink and an uplink which contain plural types of context information.

DESCRIPTION OF THE PREFERRED EMBODIMENTS OF THE INVENTION

Figure 1:
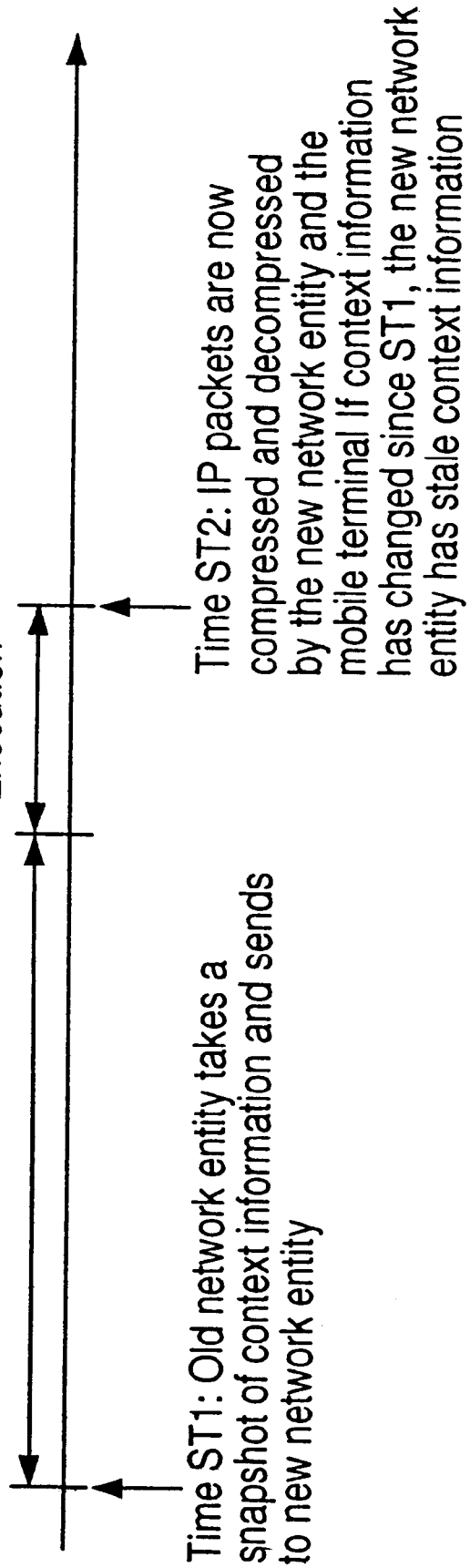
FIG. 1 illustrates the prior art problem of stale context information caused by context information update after a snapshot.
Figure 2:
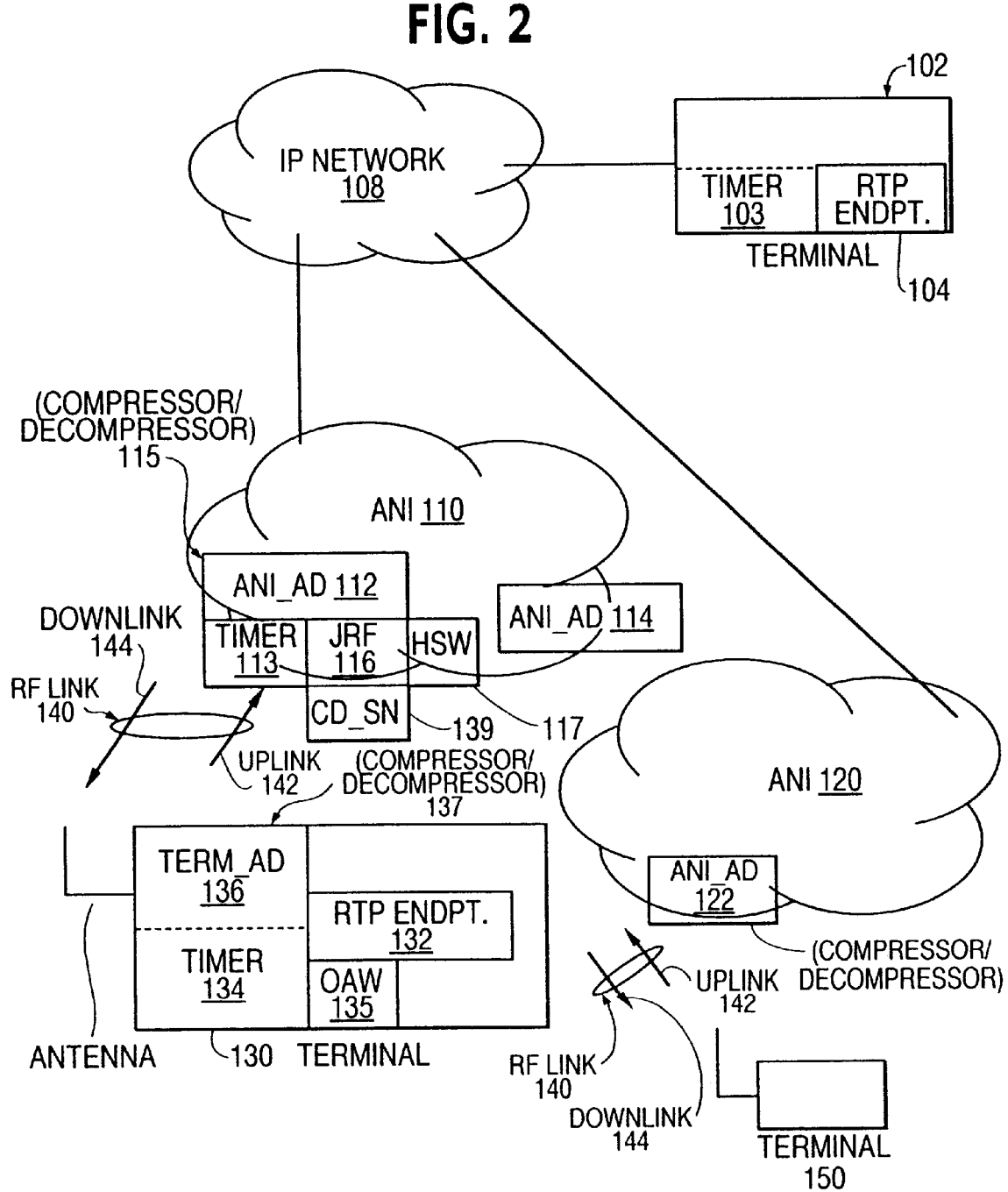
FIG. 2 illustrates an exemplary system in which the present invention may be practiced.

FIG. 2 illustrates an exemplary system in which the various embodiments of the present invention may be practiced. However, it should be understood that the present invention is not limited thereto with other system architectures being equally applicable to the practice of the invention. A terminal 102 is connected to a IP network 108. Terminal 102 may be, without limitation, a personal computer or the like running RTP/UDP/IP, and providing packetized voice samples in RTP packets for transmission over IP network 108. Terminal 102 includes a RTP endpoint 104 which identifies this terminal (e.g., including IP address, port number, etc.) as either a source and/or destination for RTP packets. While IP network 108 is provided as an example of a packet network, however, other types of packet switched networks or the like can be used in place thereof. Terminal 102 also includes a local timer 103 for generating a time stamp.

Access network infrastructures (ANI) 110 and 120, which may be resident in a base station subsystem (BSS), are connected to IP network 108. The ANI's are network entities and network nodes. A plurality of wireless mobile terminals which are network entities and network nodes and function as mobile compressors and mobile decompressors (two wireless terminals 130 and 150 are illustrated) are coupled via radio frequency (RF) links 140 to ANIs 110 and 120. When one of the mobile terminals 130 and/or 150 move, it is necessary for the terminal(s) from time to time, as a consequence of movement beyond radio connection with one ANI, to be handed off to another ANI. This process also requires, when header compression and decompression is used and located in the ANI, the transfer of compression and decompression context information from one ANI (old) to another ANI (new) to achieve seamlessness, e.g. if mobile terminals 130 and/or 150 move and are handed off from ANI 110 to ANI 120. The transfer, as discussed below, can happen at various times but to minimize disruption, it should be completed by the time the new ANI takes over the header compression/decompression role from the old ANI. The relocation of compression/decompression functions occur when the new network entity takes over at a point in time. On the other hand, the transfer of context information may be spread over a time material and precedes relocation. RF link 140 includes, as illustrated, an uplink traffic 142 (from mobile terminals 130 and 150 to ANI 110) and downlink traffic 144 (from ANI 110 to mobile terminals 130 and 150). The mobile terminals 130 and/or 150 are handed off from one ANI, such as ANI 110 when one or more of the mobile terminals move to another ANI, e.g. ANI 120. Each ANI interfaces with one or more of the wireless (or radio frequency) terminals (including terminal 130) in a region to IP network 108, including converting between wireline signals (provided from IP network 108) and wireless or RF signals (provided to or from terminals 130 and 150). Thus, each ANI allows packets, such as, but not limited to, RTP packets transmitted and received from IP network 108 to be sent over RF link 140 to at least one of wireless terminals 130 and 150, and allows transmission of packets, such as RTP packets but not limited to RTP packets, to be transmitted from terminals 130 and 150 to be transmitted by IP network 108 to another terminal, such as terminal 102.

Each ANI includes a plurality of entities. The more detailed depiction and explanation of ANI 110 is given to facilitate understanding of the architecture and operation of all of the ANI's in the network. All ANI's may be of the same architecture as ANI 110 but are not illustrated in the same degree of detail. ANI 110 includes one or more ANI adapters (ANI_LAD), such as ANI_AD 112 (illustrated in detail) and ANI_AD 114, each of which preferably includes a timer 113 to provide a time stamp. Each ANI_AD performs header compression (prior to downlink traffic) and decompression (after uplink traffic). Headers (one or more header fields, such as a time stamp and sequence number) for RTP packets received from IP network 108 are compressed by ANI_AD 112 prior to transmission to terminals 130 and 150 over downlink traffic 142, and packet headers received from mobile terminals 130 and 150 are decompressed by ANI_AD 112 before transmission to IP network 108. ANI_AD 110 functions as a transmitter/receiver (transceiver) and specifically as a compressor/decompressor 115 with the compressor compressing data packets prior to transmission and the decompressor decompressing data packets after reception. ANI_AD 110 interfaces with terminals located in a specific or different area within the region to IP network 108. ANI_AD 112 includes a timer 113 for implementing a timer-based decompression technique. ANI_AD 112 also includes a jitter reduction function (JRF) 116 which operates to measure the jitter on packets (or headers) received over the network 108 and discard any packets/headers which have excessive jitter.

Each terminal includes a plurality of entities. The more detailed explanation of the mobile terminal 130 is given to facilitate understanding of the design and operation of all mobile terminals 130 and 150 in the network which are of a similar design and operation. Each of the mobile terminals may also function as a compressor/decompressor in communications beyond ANI's 110 and 120 and specifically, with other networks. Mobile terminal 130 includes an RTP endpoint 132 which is a source (transmitter) and/or destination (receiver) for RTP packets and identifies the terminal's IP address, port number, etc. Mobile terminal 130 includes a terminal adapter (MS_AD) 136 which performs header compression (packets to be transmitted over uplink traffic 142) and decompression (packets received over downlink traffic 144). Thus, terminal adapter (MS_AD) 136 may be considered to be a header compressor/decompressor (transceiver) 137, similar to the ANI_AD compressor/decompressor. The terminology MS_AD has the same meaning as AD.

The MS_AD 136 also includes a timer 134 (a receiver timer) for calculating an approximation (or estimate) of a RTP time stamp of a current header and to measure elapsed time between successively received packets to locate loss of packets during transmission to the terminal by wireless degradation such as fading. The MS_AD 136 may use additional information in the RTP header to refine or correct the time stamp approximation as described in copending patent application Ser. No. 09/377,913, filed on Aug. 20, 1999, and assigned to the same assignee, which application is incorporated herein by reference in its entirety. The time stamp approximation may be corrected or adjusted based upon a compressed time stamp provided in the RTP header. In this manner, a local timer and a compressed time stamp may be used to regenerate the correct time stamp for each RTP header.

RTP packets, including packets with compressed and uncompressed headers, are transmitted in the network such as, but not limited to, the exemplary network of FIG. 2 over a data link (such as wireless link 140) where bandwidth is at a premium and errors are not uncommon. The present invention is not limited to a wireless link, but is applicable to a wide variety of links (including wireline links, etc.).

Figure 3:
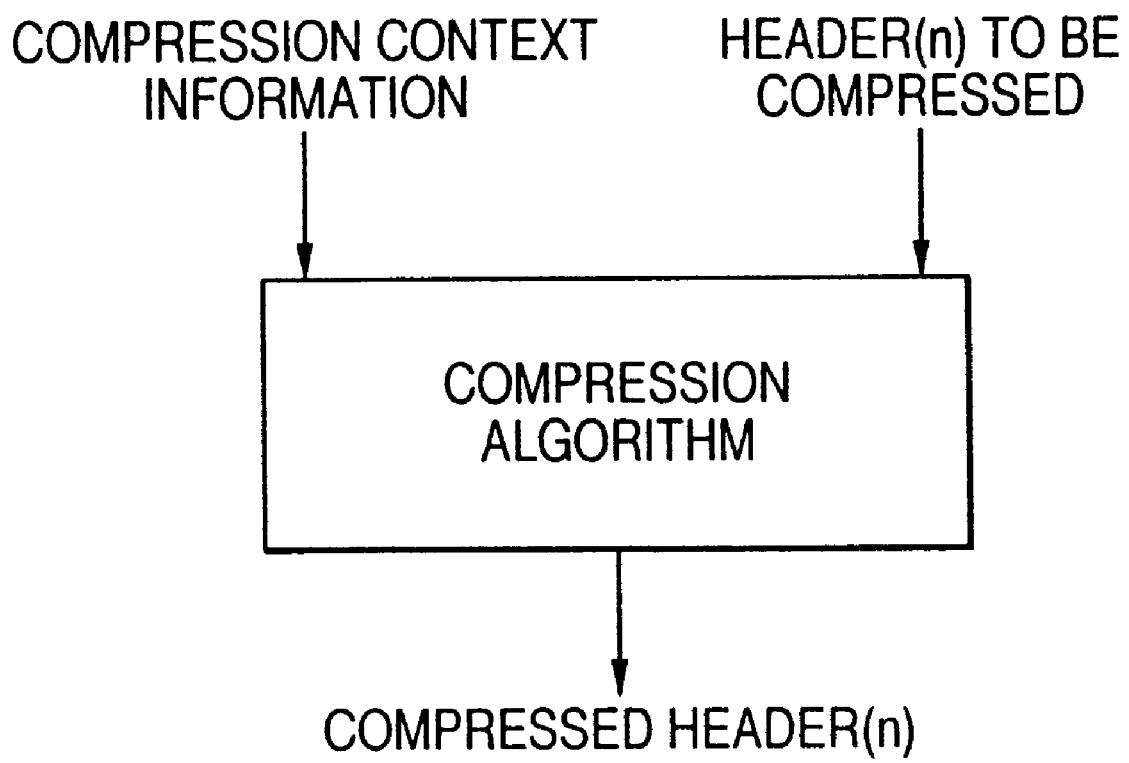
FIG. 3 conceptually illustrates compression context information.

FIG. 3 illustrates conceptually compression context information and examples. Compression context information is a set, subset or representation of a subset of information which may be of any type in a header used by the compressor as an input to the compression algorithm to produce a compressed header and may be transmitted from one entity to another entity. The other input is from the header source of the headers to be compressed.

Figure 4:
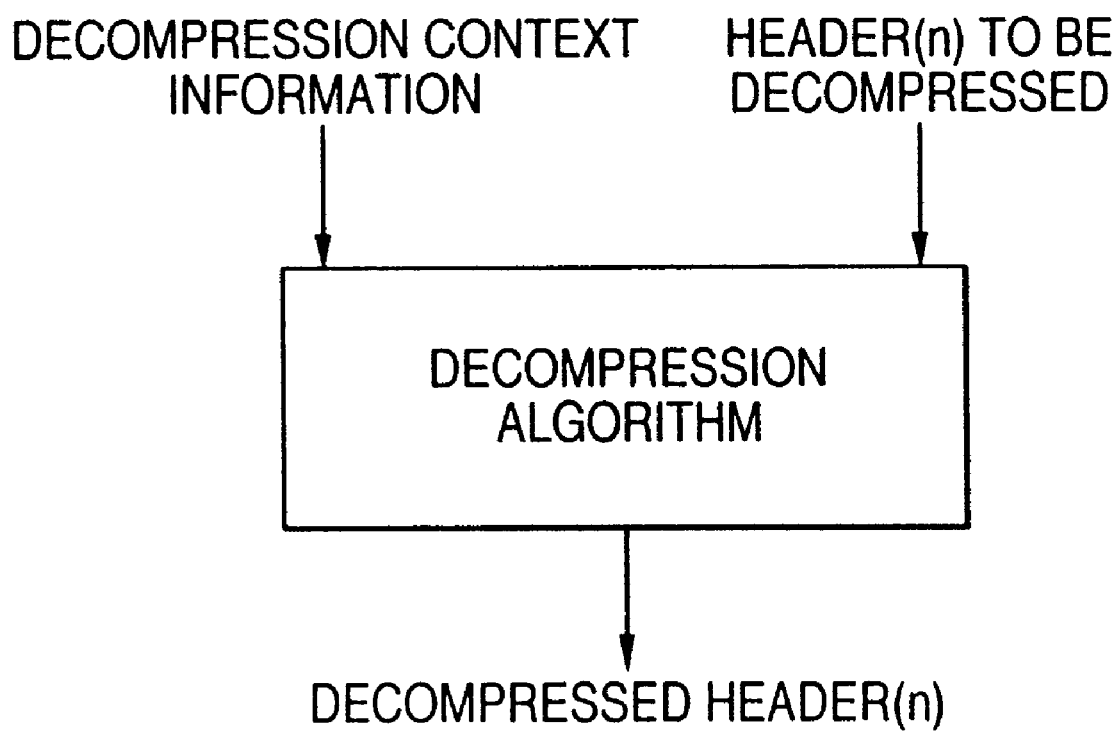
FIG. 4 conceptually illustrates decompression context information.

FIG. 4 illustrates conceptually decompression context information and examples. Decompression context information is a set, subset or representation of a subset of information which may be of any type in a header used by the decompression as an input to the decompression algorithm to produce a decompressed header and may be transmitted from one entity to another entity. The other input is from the header source of the headers to be decompressed.

Both the compression and decompression context informations are dynamic, that is, they may be updated by the compressor and decompressor respectively. The frequency of updates depends on the header compression scheme. Events that may result in an update of the compression context information at the compressor include the compression of an incoming header, or the receipt of feedback from the decompressor. Events that may result in an update of the decompression context information at the decompressor include the decompression of an incoming header.

The following notations are used in the description of the embodiments of the invention:

S_u: Compression context information used by the MS_AD for header compression in the uplink traffic direction.

S_d: Compression context information used by the ANI_AD for header compression in the downlink traffic direction.

R_u: Decompression context information used by the ANI_AD for header decompression in the uplink traffic direction.

R_d: Decompression context information used by the MS_AD for decompression in the downlink traffic direction.

A compressor within a network entity or node, such as ANI's 110 and 120 or mobile terminals 130 and 140, uses compression context information to compress the current header. In the case of IP/UDP/RTP header compression, the compression context information may consist of an SO and FO compression context informations. Similarly, the decompression context information may consist of SO and FO decompression context informations. Notations which are used: S_FO_u and S_SO_u are FO and SO compression context informations of S_u respectively, S_u, S_SO_d and S_FO_d are FO and SO compression context information of S_d, R_SO_u, R_FO_u, R_SO_d and R_FO_d. FO compression context information can always be used, but may result in less optimal compression in some cases in view of its lesser state of compression. The use of SO compression context information results in a more optimal compression, but SO can be used only if the current header fits the pattern specified in SO.

The compressor within a network entity or node may update the FO compression context information as a result of the incoming headers and/or feedback from the decompressor as described below with reference to various embodiments of the invention. The compressor updates the SO compression context information based on the pattern observed in the header and also feedback from the decompressor.

The decompressor within a network entity or node, such as ANI's 110 and 120, or network entities or nodes, such as mobile terminals 130 and 140, uses FO and SO decompression context information to decompress a header compressed by FO and SO decompression context information respectively. The decision to update the compression context information is taken by the compressor. When the compressor updates FO or SO compression context information, it has to somehow implicitly or explicitly inform the decompressor so the decompressor can update its FO or SO decompression context information to maintain synchronization. Due to the time latency as described above with reference to the prior art, there may be a short time window during which the two context informations are not in synchronization. However, a header compression and decompression scheme is required to operate such that the decompressor and compressor has consistent decompression and compression context information by the time of decompressing a header.

Figure 5:
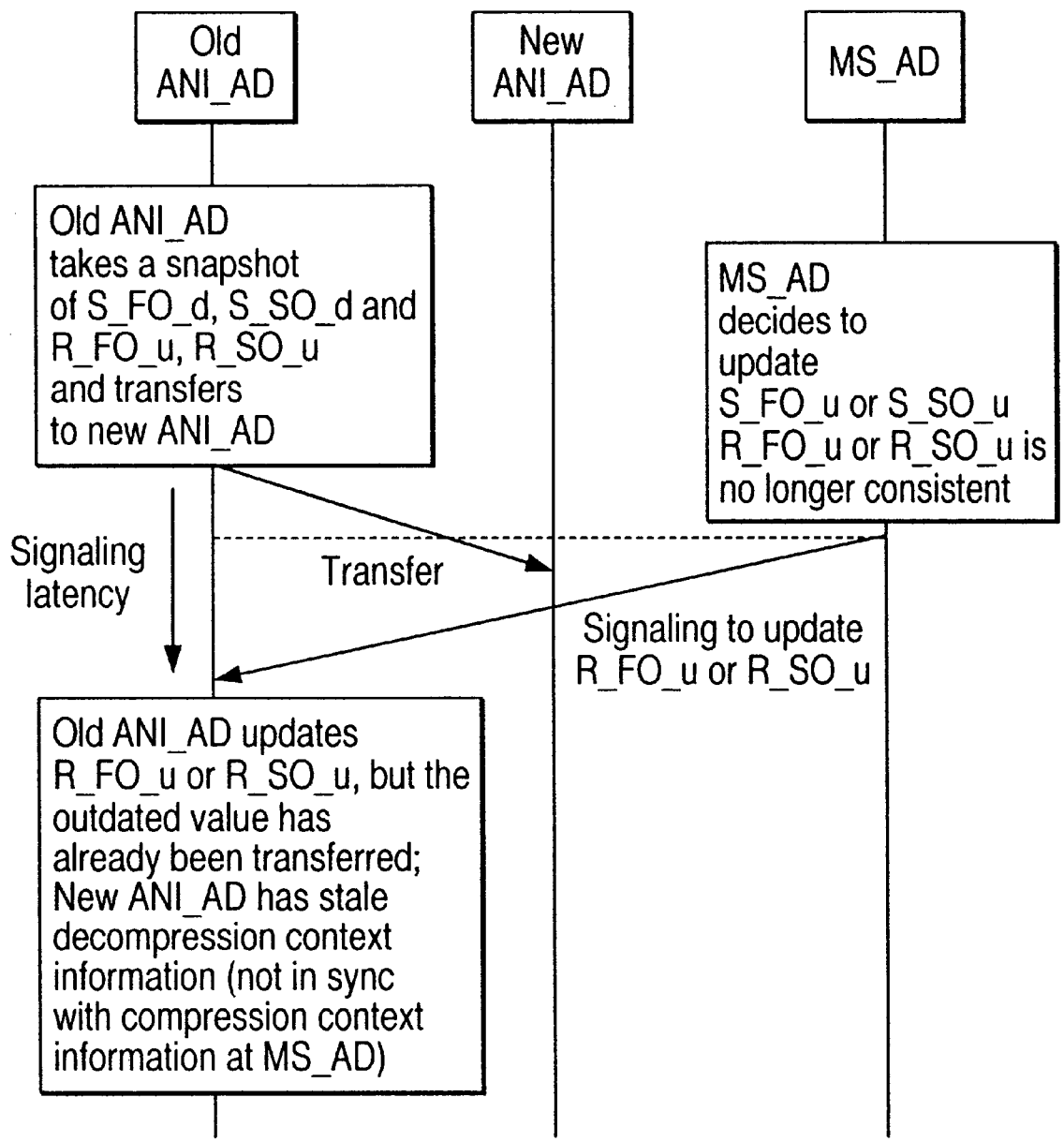
FIG. 5 illustrates the problem of stale context information caused by signalling latency.

An efficient and correct procedure to transfer the context compression and decompression context information at handoff addresses the following problems:

Problem 1—The old ANI_AD must be able to correctly store S_d and R_u and transfer them to the new ANI_AD; the problem is that due to the time signaling latency, they may be inconsistent with the compressor's view at the time of storage as described below with reference to, for example, FIGS. 5, 6 and 7. Storage values are denoted with a star, e.g. R_u*.

Figure 6:
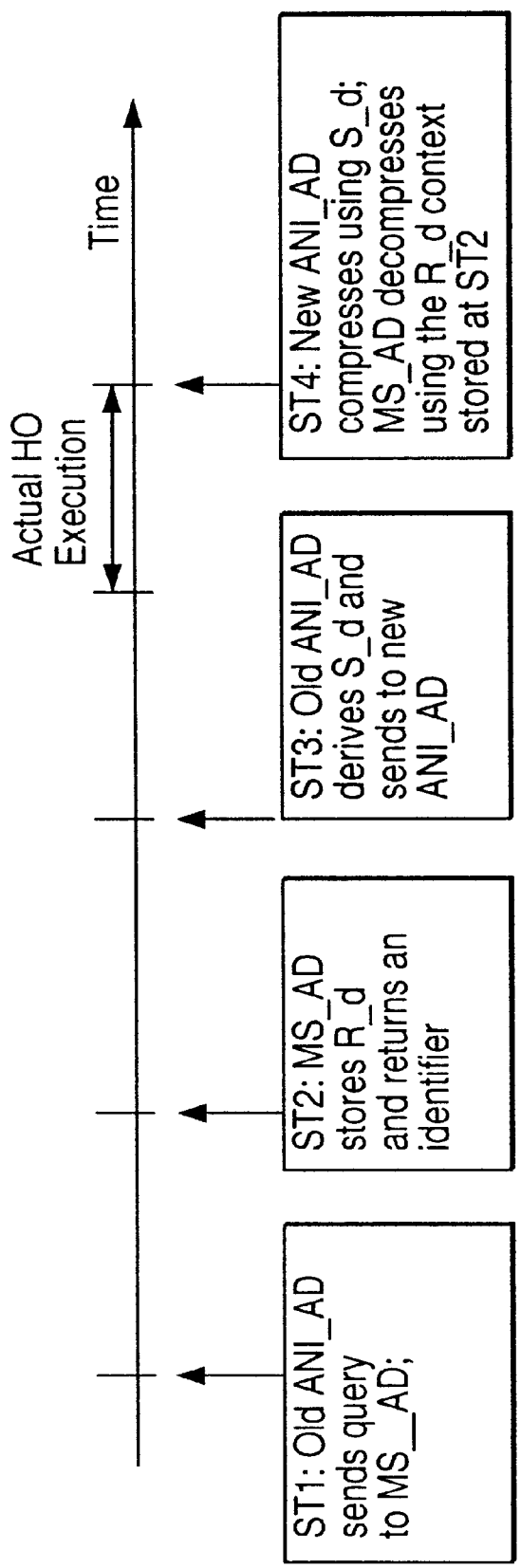
FIG. 6 illustrates operation of an embodiment of the present invention in downlink traffic.
Figure 7:
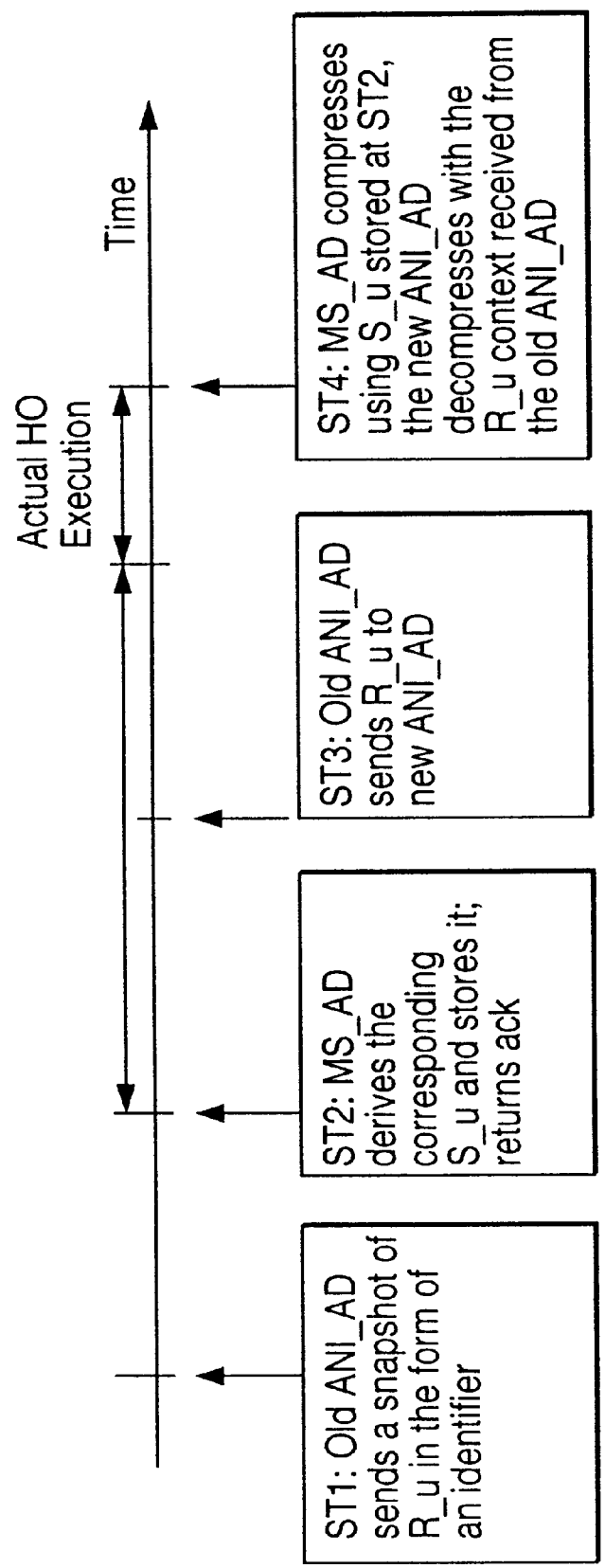
FIG. 7 illustrates operation of the an embodiment of the present invention in uplink traffic.

Problem 2—If relocation of context information is concurrent with radio handoff once a correct storage has been made, there must be a way to cope with the R_u, S_d, R_d and S-u, being updated between times ST1 and ST2 of FIGS. 6 and 7, etc. by the old ANI_AD and MS_AD respectively Problem 3—Signaling on the air interface before and after handoff should be minimized (for spectrum efficiency)

Figure 8:
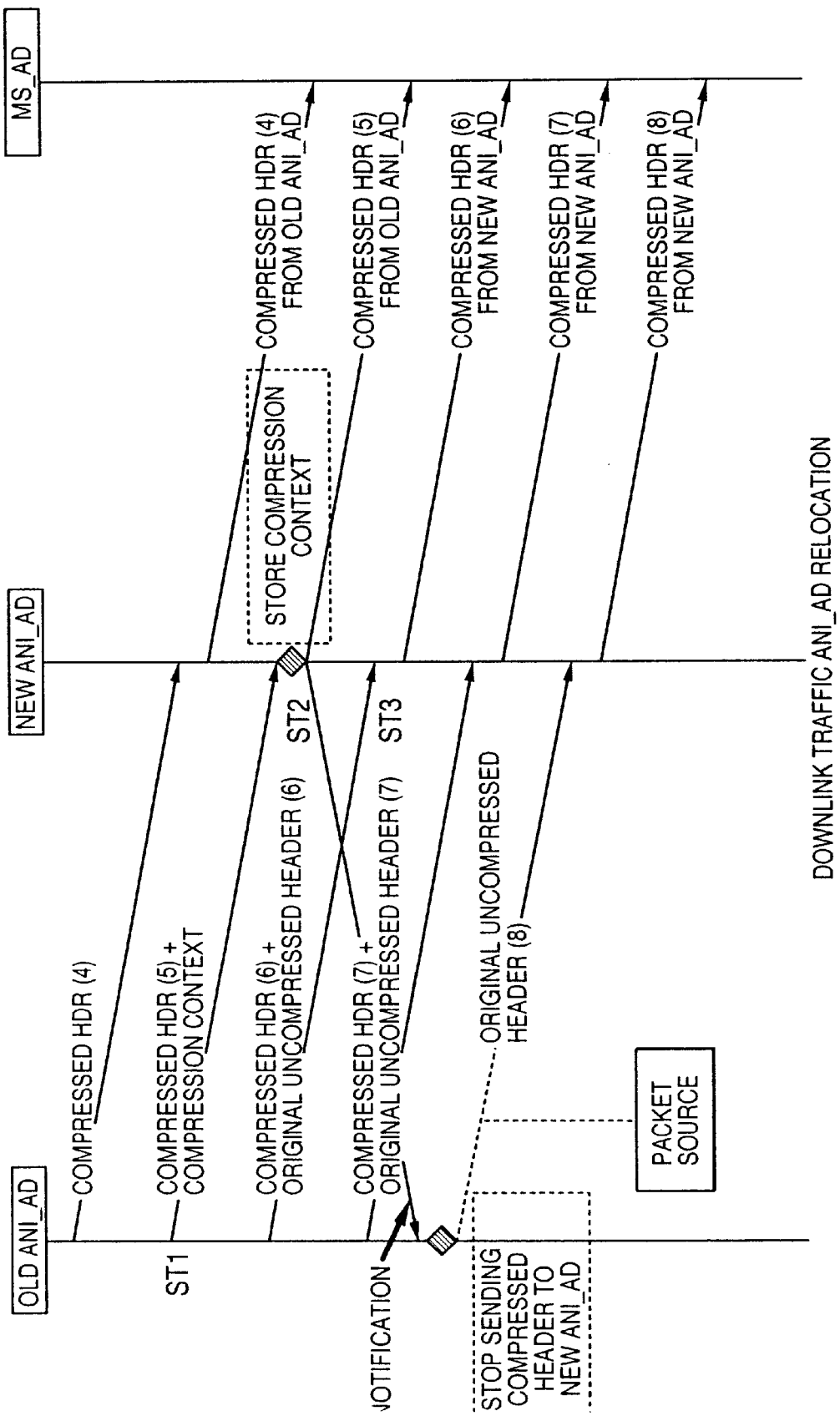
FIG. 8 illustrates operation of an embodiment of the invention in downlink traffic.
Figure 9:
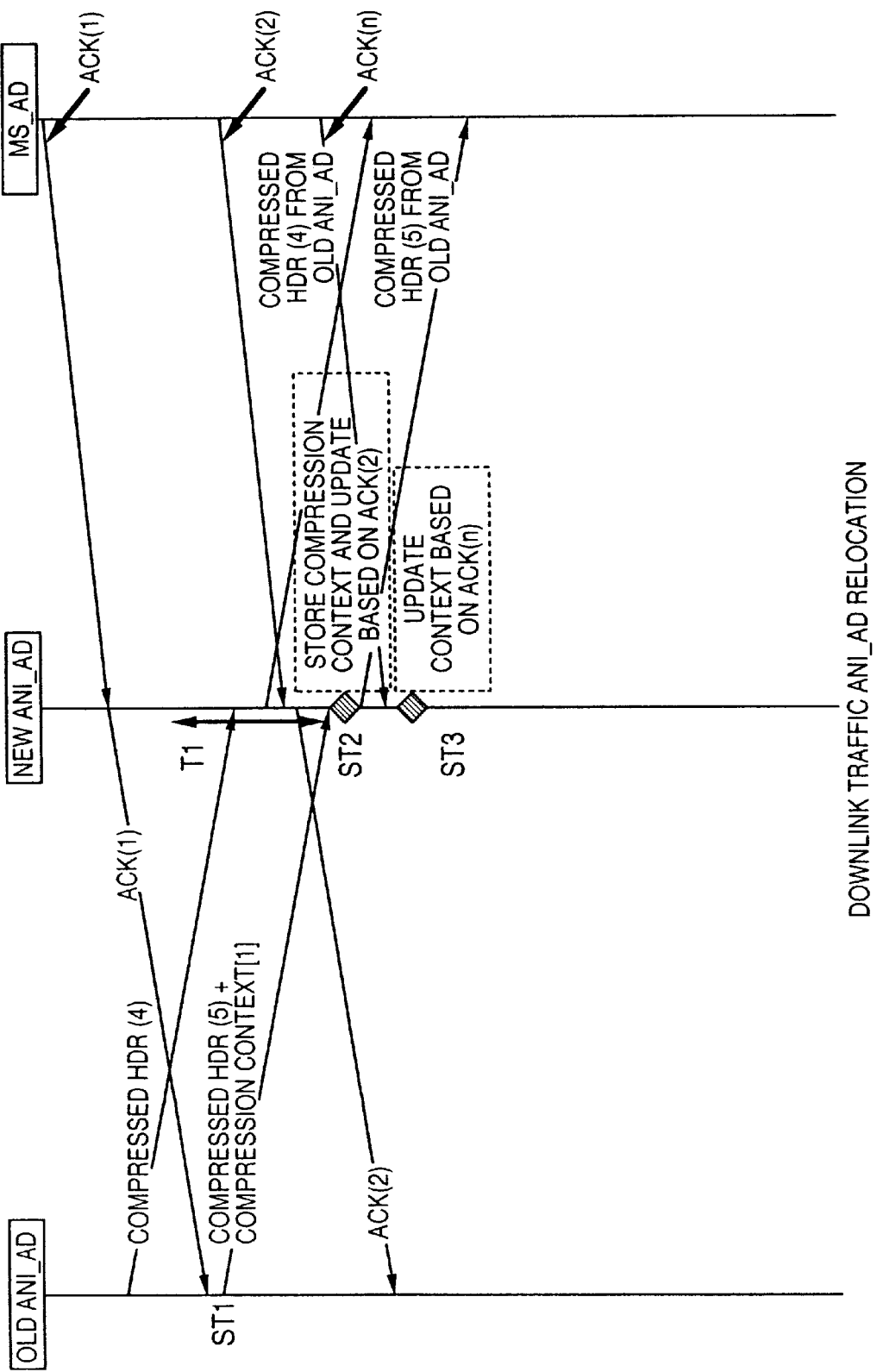
FIG. 9 illustrates operation of an embodiment of the invention for downlink traffic when feedback occurs from the mobile decompressor.

Problem 4—Compression and decompression context information transfer between the old ANI_AD and the new ANI_AD is desirably completed (but the invention is not limited thereto) before relocation time ST4 illustrated, for example, in FIGS. 8 and 9;

Problem 5—If air interface, signaling or compression and decompression context information transmission cannot be carried out before relocation ST4 of, for example, FIGS. 8 and 9 (e.g. due to the error condition of the radio link, congestion on the signaling network between the ANI_Ads, or due to the speed of handoff execution), there must be a backup procedure to allow the new ANI_AD to resume compression/decompression even with partial or no information transferred. This problem is solved in the case where radio handoff has occurred by deferring relocation until after context information transfer is completed.

For the downlink traffic relative to problems 1 and 2 as illustrated, for example, in FIG. 6, the process is driven by three significant times: ST1, ST2 and ST3.

AT ST1, the old ANI_AD queries the MS_AD for its decompression context information. AT ST2, the MS_AD stores its decompression context information and returns a context identifier. At ST3, the old ANI_AD derives the corresponding compression context information and sends it to the new ANI_AD.

For the uplink traffic as illustrated, for example, in FIG. 7, the process is also driven by three significant times. At time ST1, the old ANI_AD takes a snapshot of its decompression context information, and sends it to the MS_AD as an identifier. At ST2, the MS_AD derives the corresponding compression context information, stores it and returns an acknowledgment. At ST3, the old ANI_AD sends the snapshot decompression context information to the new ANI_AD.

The downlink traffic and uplink traffic procedures may be combined into a single procedure.

Relative to problem 3 above, signaling on the air interface before and after handoff should be minimized (for spectrum efficiency). The information sent over the air interface comprises (1) query sent from the ANI_AD to the MS, (2) context information, and (3) context information acknowledgment. The query and context information acknowledgment are short messages. Context informations are preferably encoded in short form, e.g. as numerical indices to conserve radio bandwidth and identify at the decompressor context information to be used at the decompressor.

Relative to problems 4 and 5 above, the compression and decompression context information to be transferred is kept to a minimum and high speed links are assumed between the two ANI_Ads. For the downlink traffic (respectively uplink traffic), because the compression and decompression context information is transferred to the new ANI_AD only if the handshake with the MS_AD is successful, when the new ANI_AD has the compression and decompression context information, it can safely assume that the MS_AD has the corresponding decompression context information to decompress (respectively compress). The only case of failure is when the new ANI_AD, for some reason, did not get the context information from the old ANI_AD. In that case, the header compression/decompression process is restarted with full headers.

As an example of an application of a handoff, consider feedback, e.g. acknowledgment based header compression embodiment as follows:

Three Operation States of the Compressor
Transition to FO and SO State Using Acknowledgments An acknowledgment (ACK) packet normally contains context identity CID and a sequence number CD_SN to identify the correctly received/decompressed header, though other optional information could also be carried.

When a new session starts, the compressor operates in FH state until receiving an acknowledgment (ACK) from the decompressor, indicating that at least one FH packet has been received. It is the responsibility of the decompressor to ACK an FH packet as soon as it receives it, so that the compressor can transit from FH state to FO state.

In FO state, the compressor sends FO packets and the decompressor is expected to acknowledge received FO packets (not necessarily every FO packet). If the compressor determines (based on the acknowledgments) that the decompressor has established an FOD, and that FOD is same as the FOD between the current header being transmitted and the last transmitted header, the compressor then advances to SO state and starts sending SO packets. A sequence of consecutive headers that can be compressed with SO is called a string.

Due to the reasons discussed above, the compressor may have to fallback from SO state to FO state. However, the compressor will never transit back to FH state unless some exceptional events happen, such as when the decompressor loses its decompression context information because of a system crash. Whenever the compressor is in FO state, it will try to advance to SO state as described above.

Periodic Acknowledgments to Detect Long Loss

To address the wrap-around/long loss problem, the decompressor sends an acknowledgment at regular intervals, spaced closely enough so that normally the compressor receives an acknowledgment at least once every seq_cycle headers, where seq_cycle=$2^k$.

To account for the round trip delay, the decompressor anticipates when to send a periodic acknowledgment. The decompressor sends a periodic acknowledgment early enough so the compressor normally receives acknowledgment at least once every seq_cycle. Taking into account the round trip time, the decompressor has to send acknowledgments at least once every (seq_cycle-N_RT) headers wherein N_RT is the estimated number of headers being transmitted by the compressor during a round trip time (RTT).

If the compressor does not receive an acknowledgment within a seq_cycle, it uses l_extended>k bits to carry the sequence number. The value of l_extended bits is chosen so that it will not wrap-round even the RTT reaches its upper bound. Note that a more general approach is to use variable length encoding (VLE) for the sequence number as discussed below in which a multi-level encoding is used instead of two-level encoding. The number of levels should be chosen carefully because the length field in a VLE encoded value could cost more bits.

An Acknowledgment Based Embodiment with Delta Encoding

The encoding methods for each changing field in an FO header can use either delta encoding or variable length encoding (VLE), or any other suitable methods.

With delta encoding, a value v to be compressed is sent as (v−v_ref), where v_ref is the value in a reference header that has been acknowledged. Decompression uses the same reference header. In that case:

S_FO_u maps to S_RFH_u (S_RFH_u is a header that has been acknowledged by the ANI_AD; it is used by the MS_AD as a reference header to compress into a FO header)

S_SO_u maps to S_DFOD (FOD used by the MS_AD to compress into an SO header)

R_FO_u maps to R_RFH_u (R_RFH_u has the same content as S_RFH_u; and it is used by the ANI_AD as a reference header to decompress a FO header)

R_SO_u maps to R_DFOD (FOD used by the ANI_AD to decompress a SO header)

S_FO_d maps to S_RFH_d (S_RFH_d is a header that has been acknowledged by the MS_AD and it is used by the ANI_AD as a reference header to compress into a FO header)

S_SO_d maps to S_DFOD (FOD used by the ANI_AD to compress into a SO header)

R_FO_d maps to R_RFH_d (R_RFH_d has the same content as S_RFH_d and is used by the MS_AD as a reference header to decompress a FO header)

R_SO_d maps to R_DFOD (FOD used by the MS_AD to decompress a SO header)

For efficiency, all context compression and decompression context information which is not being received by a network entity for the first time, e.g. a new network entity, such as a new ANI which has previously not stored any compression or decompression context information is preferably exchanged between the MS_AD and the old ANI_AD over the air interface as a representation of the compression or decompression context information, such as without limitation, numerical indices which may be a sequence number in a string of compressed headers. S_FO_u or S_FO_d essentially contains the same fields as a full header. It is preferably encoded as a numerical index (the RTP or shortened sequence number corresponding to the full header that has been acknowledged). S_SO_u or S_SO_d is a vector whose components specify a pattern to which all headers belonging to the current or most recent string conform. A string is a sequence of consecutive headers that can be compressed as SO. It is encoded as a numerical index (the RTP or shortened sequence number corresponding to a header belonging to the string, that has been acknowledged). The old ANI_AD sends the compression or decompression context information to the new ANI_AD as full vectors.

Acknowledgment Based Embodiments with VLE

If VLE is used, the value v to be compressed is sent as its k least significant bits. To encode fields of FO packets in the aforementioned header compression scheme, the acknowledgments can be utilized to reduce the value of k and the size of a variable sliding window (VSW) of headers maintained by the compressor. Basically, upon receiving such an acknowledgment, the compressor takes actions as following:

When receiving an acknowledgment for a particular v from the decompressor, the compressor deletes any value in the VSW that is older than v, and then updates v_min and v_max.

VLE can be used to encode some fields of a FO header. VLE compresses a field F of header(n), denoted v(n), by sending v(n)_k, the k least significant bits of v(n). The number of bits k is chosen by the compressor as a function of a window VSW of values: v(m), v(m+1), . . . , v(n−1), previously compressed and sent by the compressor.

Let v_max and v_min be the maximum and minimum values over the window. For a given value v to be compressed, let r=max(|v−v_max|, |v−v_min|). The compressor chooses k as ceiling(log 2(2*r+1)). The compressor adds v into the VSW and updates the v_min and v_max. Here, for a given number in the format of x.y, ceiling(x.y)=x, if y=0; ceiling(x.y)=x+1, if y≠0.

The decompressor chooses as the decompressed value the one that is closest to v_ref and whose k LSB equals the compressed value that has been received.

In this case, with the fields of the context compression and decompression information encoded with VLE (referred to as VLE fields), for each such field F:

S_FO_u comprises the (v_min, v_max) pair maintained by the MS_AD; however, the stored value S_FO_u* is the field value v in the header acknowledged at time ST1 of uplink traffic procedure as illustrated, for example, in FIG. 7; after handoff the MS_AD uses v=v_min=v_max for compression; the new ANI_AD uses the same value v (R_FO_u*) as reference for decompression S_SO_u maps to S_DFOD (FOD used by the MS_AD to compress into SO header).

R_FO_u comprises the most recently received value v at the ANI_AD;

R_FO_u* is equal to S_FO_u*

R_SO_u maps to R_DFOD (FOD used by the ANI_AD to decompress a SO header).

S_FO_d comprises the (v_min, v_max) pair maintained by the ANI_AD;

S_FO_d* is the field value v in the last acknowledged header; after handoff the new ANI_AD resumes compression using v=v_min=v_max; and the MS_AD decompresses using that same v as the reference (R_FO_d*).

S_SO_d maps to S_DFOD (FOD used by the ANI_AD to compress into an SO).

R_FO_d comprises the most recently received value v at the MS_AD;

R_FO_d* is equal to S_FO_d*

R_SO_d maps to R_DFOD (FOD used by the MS_AD to decompress an SO)

For efficiency, it is preferable, like with delta coding, all compression and/or decompression context information exchanged between the MS_AD and ANI_AD over the air interface are coded as numerical indices. These contexts are R_SO_d, R_FO-d, R_SO_u and R_FO_u. They essentially contain the same fields as a full header and can be encoded as a numerical index (the RTP or shortened sequence number corresponding to the full header that has been acknowledged).

The old ANI_AD sends the contexts to the new ANI_AD as full vectors.

The embodiments of the present invention provide for the seamless relocation of the network entity doing compression and decompression concurrent with or after radio handoff is complete.

In the mode of operation, when the relocation is deferred after radio handoff, there is a transition period during which the flow of downlink traffic and uplink traffic pass through an old network entity (ANI_AD) to a new network entity (ANI_AD) occurs. Generally, in this mode, the handoff procedure involves first radio handoff in which an MS_AD moves to another radio cell, but the old ANI_AD still does header compression/decompression. Thereafter, the compression context and decompression context information is transferred from the old ANI_AD to the new ANI_AD. Finally, after the transfer of the compression and decompression context information is completed, the new ANI_AD starts compression/decompression, i.e. relocation takes place.

After relocation, the network may be reconfigured so that the packets containing headers to be compressed are sent directly to the new ANI_AD. In the deferred mode embodiment, the new ANI_AD performs the function of relaying data packets having compressed headers between the old ANI_AD and the MS_AD while the context information which is ultimately used to compress headers with data packets which are transmitted from the new ANI_AD to the MS_AD is gradually transferred from the old ANI_AD to the new ANI_AD.

FIG. 8 illustrates the sequence of events for radio downlink traffic in which the compression context information is transmitted from the old ANI_AD to the new ANI_AD after radio handoff. As illustrated, an initial compressed header (4) is transmitted from the old ANI_AD through the new ANI_AD to the MS_AD which receives the compressed header (4) in a form as compressed by the old ANI_AD. At time ST1, the old ANI_AD transmits a compressed header (5) plus compression context information to the new ANI_AD which receives the combination of the compressed header (5) and the compression context information at time ST2. It should be noted that, the transmission at time ST1 is the combination of the compressed header (5) and the compression context information. However, alternatively, in accordance with this embodiment, the compression context information may be received by the new ANI_AD at any time up to the point of the reception of the compressed header (6) and the original uncompressed header (6) as illustrated. At time ST2, new ANI_AD sends a notification back to the old ANI_AD that the compression context information has been received. Sometime after reception of the notification, the old ANI_AD stops sending compressed headers to the new ANI_AD. However, as illustrated, the old ANI_AD may continue to function as a header source to relay uncompressed headers to the new ANI_AD which performs the header compression function or a packet source other than the old ANI_AD may provide the packets whose headers are to be compressed. At time ST2 the new ANI_AD stores the compression context information which permits the new ANI_AD to sometime later undertake the function of compressing headers and forwards the compressed header (4) from the old ANI_AD to the MS_AD. Thereafter, there may be additional packets containing a compressed header (as illustrated, compressed headers (6) and (7) and original uncompressed headers (6) and (7) is transmitted from the old ANI_AD to the new ANI_AD. The dual transmission of both a compressed header and the original uncompressed header permits the new ANI_AD to, at any point in time, to have sufficient information so that it may undertake the compression function of uncompressed headers independent (asynchronously) of when the old ANI_AD ceases sending compressed headers. As illustrated, the compressed headers (6) and (7) are compressed at the new ANI_AD and are transmitted from the new ANI_AD to the MS_AD. Finally, as stated above, after the new ANI_AD has assumed the function of compressing headers, the new ANI_AD compresses original uncompressed headers (6), (7) and (8) from any source which, as illustrated, is the old ANI_AD for uncompressed headers (6) and (7) and may be the old ANI_AD or the packet source for the uncompressed header (8).

If, for some reason, the initiation of the transfer of compression context information beginning at time ST1 is ineffective as evidenced by the old ANI_AD not receiving the notification generated at time ST2, the old ANI_AD may reattempt one or more times the transfer of compression context information, as explained above. The new attempts occur after a time interval has expired as evidenced by no notification having been received from the new ANI_AD.

It should be understood that the compression context information transmitted from the old ANI_AD may change in view of the continuing flow of incoming headers which necessitates an updating of the compression context information relayed with compressed header (5) at time ST1. However, because after header (5) the new ANI_AD sees the uncompressed headers from the old ANI_AD, the new ANI_AD is able to perform the update on the received compression context information.

A tag may be attached to the compression context information indicating the time at which it was taken, e.g. from compressed header (5). As a result, the new ANI_AD updates the received context with any header that follows header (5). Values of the original uncompressed headers may be used to provide updated compression context information.

Depending upon the header compression mechanism which is used, the timeliness requirement of informing the new ANI_AD upon which compressed header the compression context information is based requires the new ANI_AD to receive the compression context information before receiving any header following the header on which the compression context information is associated, such as compressed header (5). In this circumstance, the new ANI_AD sends notification only if it received the compression context information before header (6). One way of accomplishing this is to attach to the header (5) the compression context information and to transmit the whole body of information as a single transmission with a high bandwidth. However, other approaches are possible which split the time at which the compressed header and the associated compression context information are transmitted.

For other header compression schemes, the new ANI_AD may retroactively apply updates to the received compression context information even if it is received later than the example above regarding header (6) where the compression context is transmitted in association with compressed header (5) but may be as late as the transmission header (6). In this case, the new ANI_AD maintains in a memory therein the most recently received original uncompressed headers and retrieves appropriate headers to update the compression context information. It should be noted that the header number, as illustrated in FIG. 8, is independent of the RTP sequence numbers and the numbering of headers is a function performed by the old ANI_AD.

FIG. 9 illustrates the use of feedback for downlink traffic, as discussed above with reference to FIG. 8, from the MS_AD to the old ANI_AD as part of the compression embodiment. The first feedback in the form of an acknowledgment (ACK (1)) occurs between the MS_AD and the old ANI_AD which is received before time ST1. Previous to this time, a packet having a fourth compressed header (4) is transmitted to a new ANI_AD which relays that packet to the MS_AD. The receipt of the acknowledgment ACK (1) provides the old ANI_AD with information informing it of the status of the receipt of compressed headers received by the MS_AD. At time ST1, the old ANI_AD transmits a compressed header (5) and the compression context information which is similar to the same transmission as discussed above with respect to FIG. 8 but includes additionally a compression context identifier [1]. The identifier [1] indicates to the new ANI_AD that the compression context takes into account ACK (1) but no younger acknowledgment. At time ST2 the new ANI_AD stores the compression context. However, unlike the communication sequence in FIG. 8, feedback from the MS_AD in the form of a second acknowledgment (ACK (2)) is received by the new ANI_AD which permits the new ANI_AD to update its compression context information based upon the consideration of identifier [1] associated with the compression context information associated with compressed header (5) in comparison to the information received in the second feedback (ACK (2)). The old ANI_AD generates the compression context identifier from the sequence number of the last feedback received (Ack (1)) from the MS_AD. Only the last feedback is used because it provides the most up to date information about the last header which is decompressed by the MS_AD. Therefore, at time ST2, the new ANI_AD stores the context along with the last received feedback (ACK (2)). The new ANI_AD also checks if it has received any other feedback prior to time ST2 which is less than T1 seconds old which is defined as the roundtrip time for transmission of communications between the old ANI_AD and the new ANI_AD but other time values are possible. When the new ANI_AD has received any feedback prior to time ST2, which is less than T1 seconds old, it checks to see if the feedback as received is younger than the reference feedback e.g., the first feedback (Ack (1)). If the feedback is newer, the stored compression context at the new ANI_AD is updated with that feedback. The updates are applied in the order of the received feedback. After time ST2, the new ANI_AD continuously updates the compression context with any feedback received from the MS_AD identified as (ACK (n)). The remainder of the signal flows illustrated in FIG. 9 are identical to those of FIG. 8 but have been deleted for purposes of simplification of the illustration.

Figure 10:
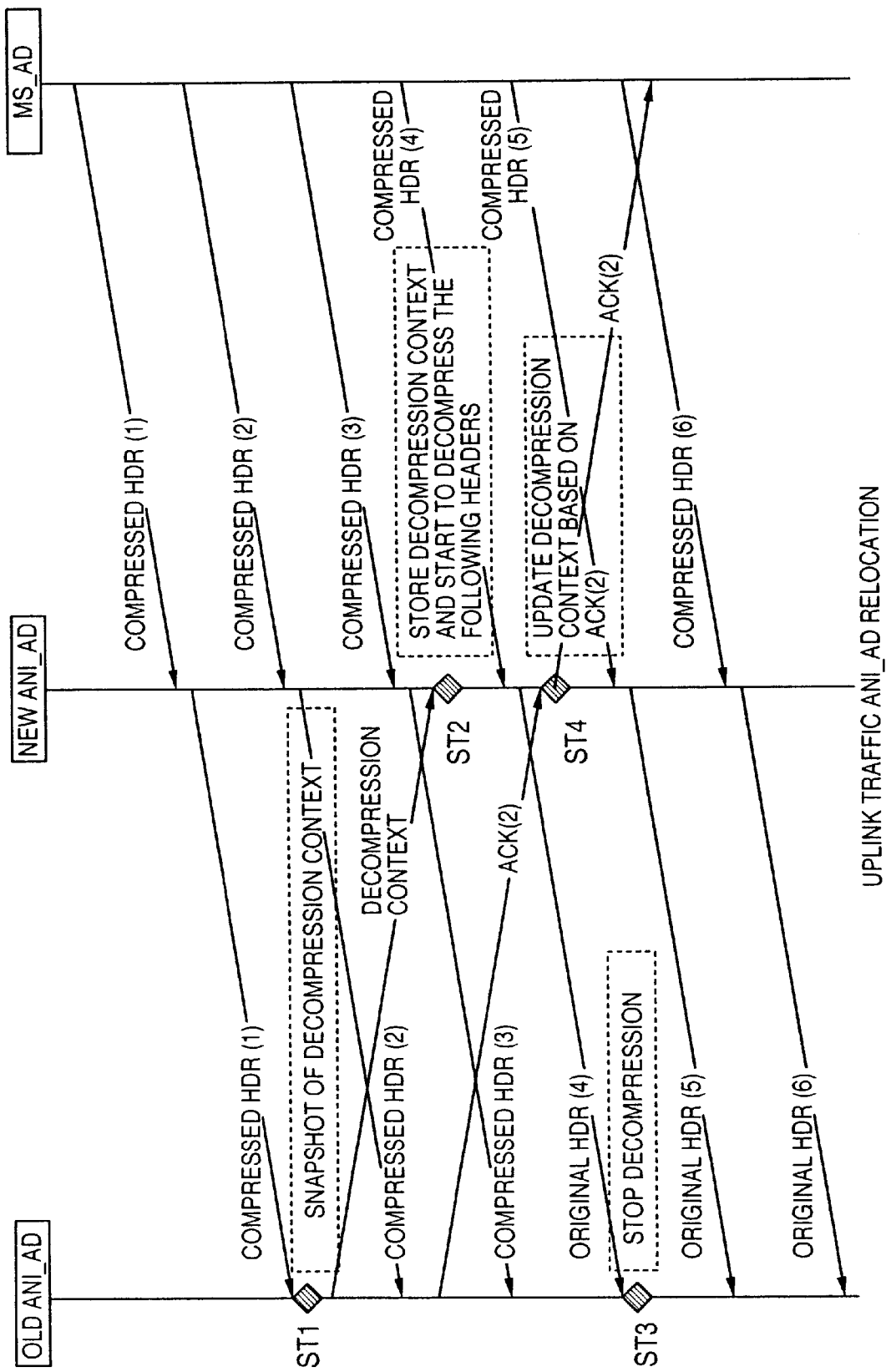
FIG. 10 illustrates operation of an embodiment of the invention in uplink traffic.

FIG. 10 illustrates uplink traffic operation when radio handoff has occurred prior to the transferring of decompression context information from the old ANI to the new ANI. The MS_AD transmits at least one compressed header through the new ANI_AD which is relayed to the old ANI_AD. The first compressed header (1) is transferred from the new ANI_AD to the old ANI_AD. At time ST1, the old ANI_AD takes a snapshot of its decompression context information for purposes of transmission to the new ANI_AD. At time ST2 the new ANI_AD receives and stores the decompression context information. Thereafter, the new ANI_AD decompresses any following headers (4), (5) and (6) which are received from the MS_AD. In the transmission sequence the first three headers (1), (2) and (3) are transmitted from the MS_AD through the new ANI_AD without any decompression thereof occurring therein. However, as a consequence of the storage at time ST2 of the decompression context information, the subsequently received headers are decompressed and transmitted to the old ANI_AD at time ST3. Receipt of a decompressed header causes the old ANI_AD to stop decompressing headers received from the new ANI_AD. If the header compression scheme is feedback based, the old ANI_AD may send a feedback to the MS_AD. In that case, the new ANI_AD relays the feedback to the MS_AD and also updates its decompression context based on the feedback (Ack (2) in FIG. 10).

The context identifier used optionally in the various embodiments is a collection of identifiers of context components (the identifiers do not have to be repeated if they are common to multiple context components).

Figure 11:
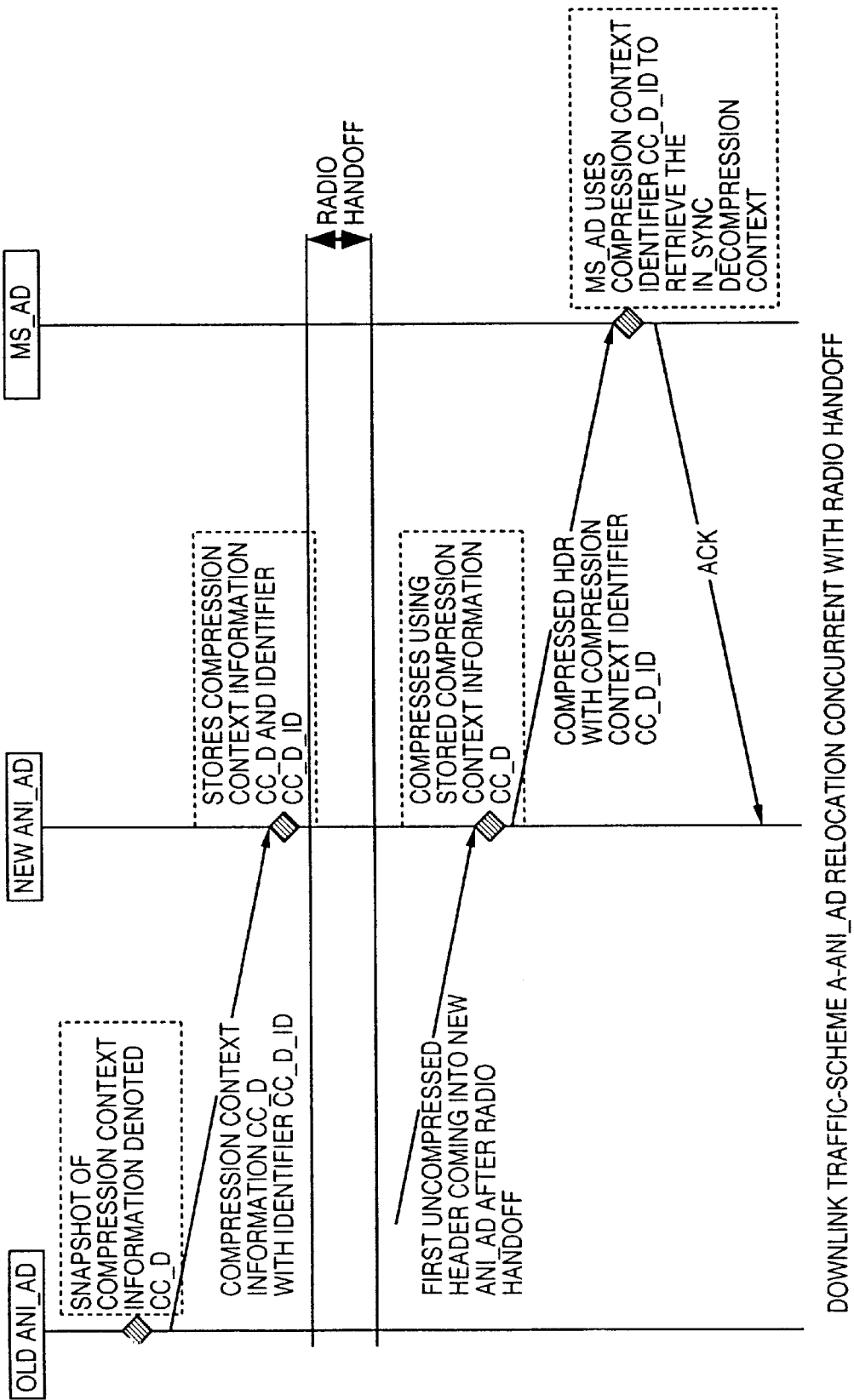
FIG. 11 illustrates operation of an embodiment of the invention for downlink traffic.
Figure 12:
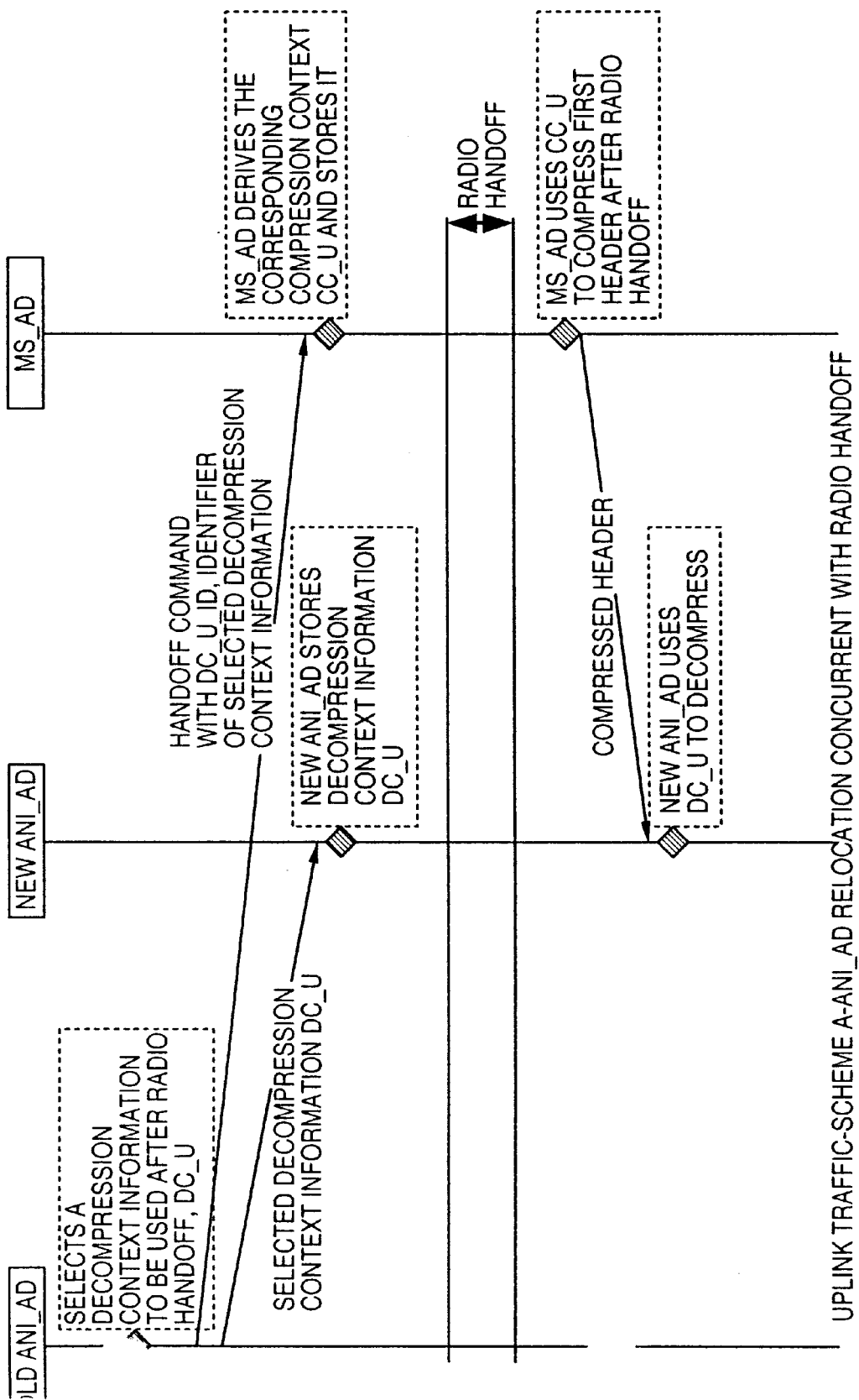
FIG. 12 illustrates operation of an embodiment for uplink traffic.

FIGS. 11 and 12 respectively illustrate the relocation of compression (downlink traffic) and decompression (uplink traffic) functions from an old ANI_AD to a new ANI_AD concurrent with radio handoff. This embodiment is based upon the old ANI_AD capturing the compression or decompression context information and transmitting it to the new ANI_AD without requiring information to be transferred to/from the MS_AD but with the compressor/decompressor function of the MS_AD being advised of handoff in view of its communications with a new ANI_AD.

As illustrated in FIG. 11 the old ANI_AD stores the compression context information denoted CC_D and sends the compression context information CC_D with an identifier CC_D_ID to the new ANI_AD. The new ANI_AD stores the compression context information CC_D and the identifier CC_D_ID. Right after radio handoff, when the new ANI_AD starts to use the stored compression context information, it includes an identifier of the compression context CC_D in the compressed header and transmits the compressed header and the context identifier CC_D_ID to the MS_AD which is stored therein. The identifier CC_D_ID permits the MS_AD to retrieve the correct decompression context corresponding to the compression context used by the new ANI_AD to decompress the received header. In a feedback (e.g. acknowledgment) based header compression embodiment, an acknowledgment (ACK) is transmitted from the MS_AD to the new ANI_AD of the decompression context information of the MS_AD. Once feedback is received, the CC_D ID no longer needs to be included in the compressed headers transmitted to the MS_AD but, depending upon the header compression scheme, it may still be included. The CC_D ID may be a sequence number of a string of packets.

FIG. 12 illustrates relocation of the decompression function from an old ANI_AD in uplink traffic to a new ANI_AD concurrent with radio handoff. The old ANI_AD chooses a decompression context DC_u and a DC_u_ID identifier of the decompression context to be sent to the new ANI_AD. The new ANI_AD stores the decompression context DC_u. The old ANI_AD, as illustrated, transmits the handover command to the MS_AD with the decompression context identifier DC_u_ID. The MS_AD uses the identifier to derive the corresponding compression context CC_u and stores it, but the invention is not limited to the joint transmission of the handover command and the DC_u_ID. After radio handoff, the MS_AD immediately uses the CC_u for decompression. The new ANI_AD uses the DC_u to perform decompression. It should be noted that the handover command is a message that is required for handoff to occur. Therefore, since the quantity DC_u_ID is piggybacked on the handoff command, no new message is needed.

Compression and decompression context identifiers are encoded efficiently in view of their being based upon numerical indices such as sequence numbers.

Figure 13:
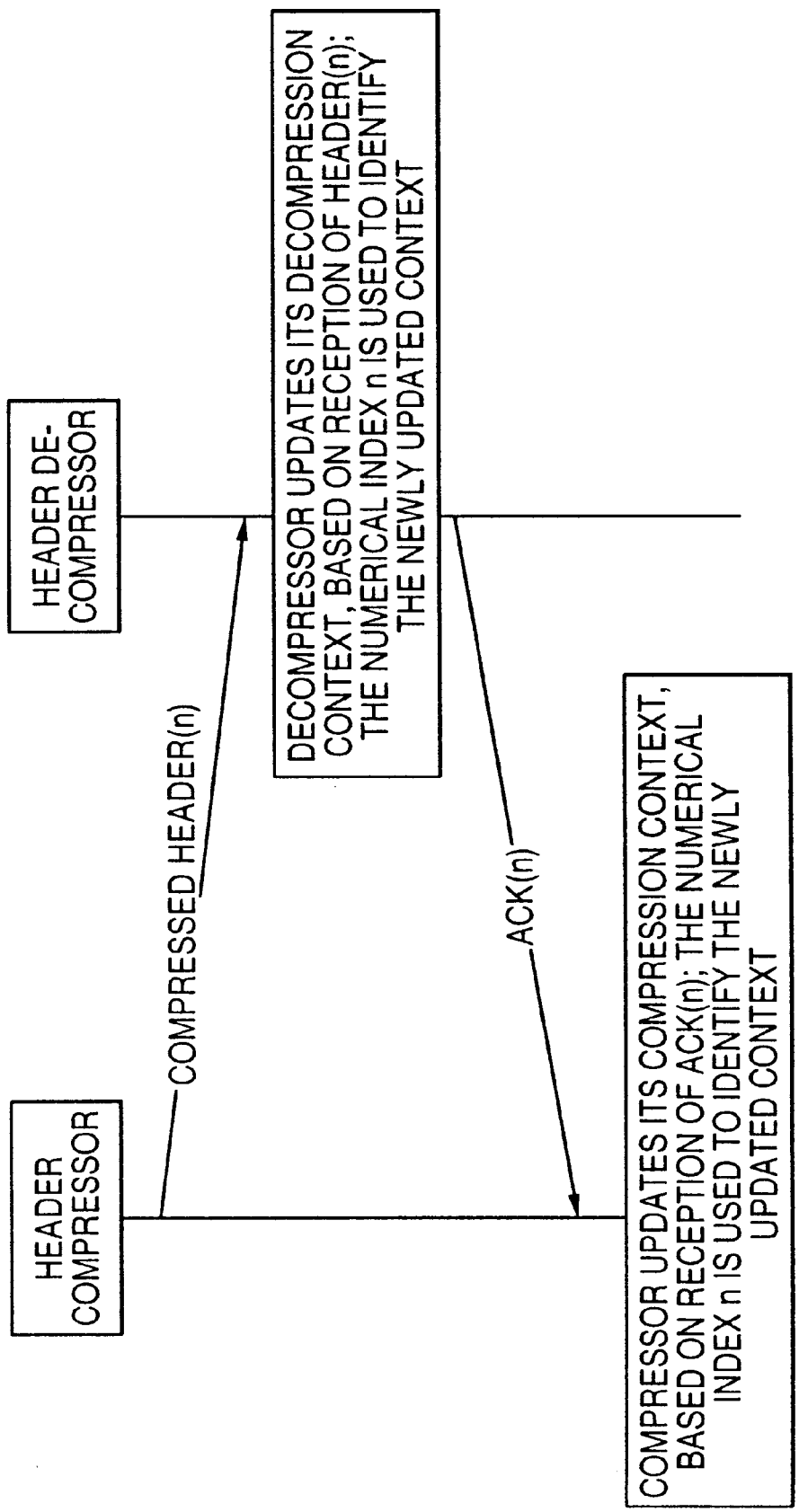
FIG. 13 illustrates an example of how numerical indices can be used to identify context information.

FIG. 13 illustrates an example of a decompressor updating its decompression context based upon reception of a header (n). The numerical index can be the RTP sequence number of the header or some other sequence number. It is used to identify the context information. The new compressor transmits a compressed header (n) to the header decompressor which updates its decompression context based on reception of the header (n). The numerical index n is used as a representation of the updated decompression context. Thereafter the header decompressor sends feedback in the form of an acknowledgment (ACK (n)) which causes the compressor to update its compression context based on the reception of the particular acknowledgment with the numerical index n being used as a representation of the newly updated context.

The amount of information required to efficiently update a state of compression and/or decompression which is transmitted between the old ANI_AD and the MS_AD, may be reduced by sending a representation of the compression and/or decompression information, e.g. a compression or decompression context identifier instead of the full compression or decompression information. The representation may be the aforementioned context identifier described above.

A complete IP/UDP/RTP header compression embodiment compresses each and every field of the original header, e.g. RTP TS, RTP SN, etc. Depending on the header field to be compressed, various compression techniques can be used. Thus complete header compression can be a combination of different individual compression techniques. For example, header compression scheme may use the VLE compression technique to compress the RTP SN field and an implicit encoding technique to compress the IP address field. For each technique, the compressor requires some information to do the compression. Similarly, the decompressor also requires some information to do the decompression. This information is referred to as the compression context component and decompression context component respectively. The compression (respectively decompression) context is then the collection of the individual compression (resp. decompression) context components. The context identifier is the collection of the identifiers of context components (the identifiers do not have to be repeated if they are common to multiple context components). Using the same example as above, the compression context may include a compression context component for compressing the RTP SN according to the VLE technique and a compression context component for compressing the IP address according to the implicit encoding technique.

The implicit encoding technique applies to static fields, i.e. fields which do not change from one header to the next. No data needs to be sent as compressed value. The compression context component consists of the static value. The decompression context component is identical to the compression context component.

With delta encoding, for a given field the compressor sends as a compressed value the difference of the value in the original uncompressed header with respect to the corresponding value in a reference header. For example, if the RTP time stamp of an original uncompressed header equals 500, and the RTP time stamp of the reference header equals 450, the compressed RTP time stamp equals 50. The decompressor decompresses by adding the RTP time stamp of the reference header (450) to the received decompressed value (50). In this case, the compression and decompression context components are identical and equal to the content of the RTP time stamp in a reference header. The context component identifier can be the RTP sequence number of the reference header, or some short form of it.

For VLE, the compressor keeps track of the range V min, V max, of the original uncompressed values that have been compressed and belong to window W. In VLE with the feedback, the window W consists of the values that have been compressed in uncompressed form since the last acknowledged value. In VLE without feedback, the window consists of the L most recently compressed values, where L is a parameter. The compressor sends as the compressed value the k least significant bits of the original uncompressed value. The value k is calculated as a function of V_min and V_max. The decompressor maintains the value last decompressed, V_last. By design, V_min is equal to or less than V_last and V_max. The decompressor uses V_last to decompress headers with the decompressed value being the one closest to V_last, whose k least significant bits match the compressed value. The compression context component differs from the decompression context component, since the compression context component is the pair of values (V_min, V_max), while the decompression context component is the single value_V last. In this case, the decompression context component can be derived from the compression context component by choosing (V_min, V_max), with V_min=V_max=V_last.

FIGS. 14–17 are tables summarizing the use of encoding techniques in conjunction with compression and decompression context information and identifiers.

Timer and Reference Based Embodiment

A. Overview

The timer and reference based embodiment is based on the observations that (1) RTP time stamps when generated at the RTP source are correlated with a linear function of elapsed time between packets, and (2) RTP TS are of the form TSO+index*TS_stride, where TSO and TS_stride are constants, and index is an integer (hereinafter the index will be referred to as the packed RTP TS). Therefore, in normal operation, the RTP time stamps received at the decompressor are also correlated with continually incrementing timer, with a distortion created only by the cumulative jitter between the source and the decompressor. Since the cumulative jitter includes "network" jitter (jitter between the source and the compressor) and "radio" jitter (jitter between the compressor and decompressor), the compressor can calculate an upper bound of the cumulative jitter by adding to the observed network jitter an upper bound of the radio jitter. The compressor then just sends as compressed RTP TS the "k" least significant bits of the packed RTP TS. The decompressor decompresses RTP TS by first calculating an approximation, and then refining the approximation with the information in the compressed RTP TS to determine the exact value. The approximation is obtained by adding to the RTP TS of the previously decompressed header a value proportional to the time elapsed since the previously decompressed header was received. The exact value of RTP TS is determined as the one closest to the approximation, whose k least significant bits of the corresponding packed RTP TS match the compressed RTP TS. The compressor chooses a value k as the smallest value permitted that would allow the decompressor to decompress correctly, based on the upper bound of the cumulative jitter.

B. Case of Voice

First, the timer and reference based embodiment is described with respect to voice. As an example, if the time interval between consecutive speech samples is 20 msec, then RTP time stamp of header n (generated at time n*20 msec)=RTP time stamp of header 0 (generated at time 0)+TS_stride*n, where TS_stride is a constant dependent on the voice codec and is the RTP TS increment every Tmsec. Consequently, the RTP TS in headers coming into the decompressor also follows a linear pattern as a function of time, but less closely, due to delay jitter between the source and the decompressor. In normal operation (absence of crashes or failures), the delay jitter is bounded, to meet the requirements of conversational real-time traffic.

In this embodiment, the decompressor uses a timer to obtain an approximation of the RTP TS of the current header (the one to be decompressed), then refines the approximation with the additional information received in the compressed header.

For example, assuming the following:

The Last_header is the last successfully decompressed header, where TS_last is the last RTP TS, and p_TS_last is the last packed RTP TS (at the decompressor);

T is the normal time spacing between two consecutive speech samples;

TS_stride is the RTP TS increment every T msec;

The current_header is the header of a current packet to be decompressed, where TS_current is the current RTP TS, and p_TS_current is the current packed RTP TS;

RFH is the sequence number of a header whose acknowledgment was received by the compressor, where TS_RFH is the RTP TS, and p_TS_RFH is the packed RTP TS;

The timer is a timer incremented every T msec, where both the compressor and decompressor each maintain their a Timer, denoted S_timer and R_timer respectively which may be the timers 113 and 134;

T_RFH is the value of the Timer when RFH has been received, and T_current is the value of the same Timer when the Current_header has been received; and N_jitter(n, m) is the observed network jitter of header n relative to header m (header n is received subsequently to header m), where N_jitter (n,m) is calculated by the compressor as follows:

N_Jitter(n,m)=Timer(n,m)-(packed RTP TS of header n-packed RTP TS of header m), where Timer(n,m) is the time elapsed from header m to header n, expressed in units of T msec. N_Jitter(n, m) can be positive or negative. N_Jitter at the compressor is the network jitter, quantized in units of T msec.

R_Jitter(n,m) is the radio jitter of header n relative to header m, predicted by the compressor. R_Jitter depends only on the characteristics of the compressor-decompressor channel (CD-CC). R_Jitter does not have to be calculated precisely, a good upper bound for R_jitter is sufficient. For example, an upper bound can be Max-radio_jitter, the maximum jitter on the CD-CC, if it is known.

Thus, according to the above, cumulative jitter for a packet is calculated as the sum of network jitter and radio jitter:

$$Jitter(n, m) = N\_Jitter(n,m) + R\_Jitter(n,m)$$

Further, RTP TS is calculated as follows:

$$RTP\ TS = TSO + index * TS\_stride,$$

where TSO<TS_stride and index is an integer.

Thus TS_last=TSO+index_last*TS_stride, and TS_current=TSO+index_current*TS_stride.

1. Compressor

The compressor sends in the compressed header, k least significant bits of p_TS_current.

The compressor runs the following algorithm to determine k:

Calculate Max_network_jitter;

Calculate $J1 = Max\_network\_jitter + Max\_radio\_jitter + J,$ where J=2 is a factor to account for the quantization error caused by the Timers at the compressor and decompressor, which can be +1 or −1; and Find the smallest integer k that satisfies a condition of:

$$(2*J1+1) < 2^k.$$

Figure 20:
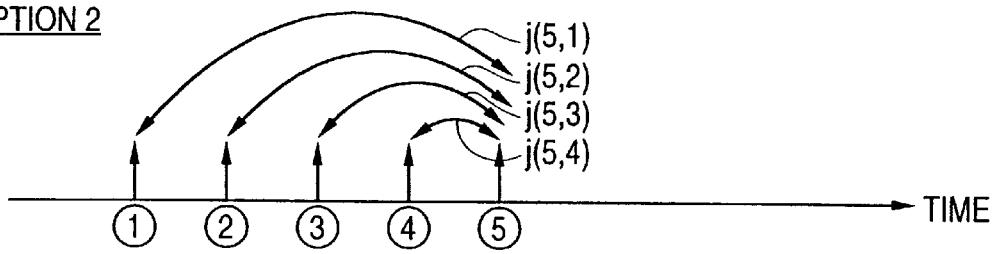
FIG. 20 is a diagram illustrating the steps of calculating network jitter according to a third method which is option 2.

Network jitter at the compressor can be calculated according three different methods, namely a first method illustrated in FIG. 18 a second method illustrated in FIG. 19 and a third method illustrated in FIG. 20. The second and third methods are described below as Option 1 and Option 2 respectively. The first method is adequate for calculating network jitter. However, the preferred methods for calculating network jitter at the compressor are the second and third methods described as Option 1 and Option 2 respectively below.

As illustrated in FIG. 18, according to the first method network jitter for a particular packet at the compressor is calculated using information with respect to the immediately preceding packet. Thus, for example, network jitter for packet 2 (j2) is calculated using information with respect to packet 1, network jitter for packet 3 (j3) is calculated using information with respect to packet 2, network jitter for packet 4 (j4) is calculated using information with respect to packet 3, and network jitter for packet 5 (j5) is calculated using information with respect to packet 4.

Thus, according to FIG. 18, network jitter for packet 2 equals the calculated jitter j2, network jitter for packet 3 equal the calculated jitter j3, network jitter for packet 4 equals the calculated jitter j4, and network jitter for packet 5 equals the calculated jitter j5.

Option 1

The steps used to calculate network jitter for the second method of Option 1 are illustrated in FIG. 19. In Option 1 network jitter for a particular packet is calculated using information with respect to a reference packet. Thus, assuming packet 2 is the reference packet as illustrated in FIG. 19, jitter j3 of packet 3 is calculated using information with respect to the reference packet 2, jitter j4 of packet 4 is calculated using information with respect to the reference packet 2, and jitter j5 of packet 5 is calculated using information with respect to the reference packet 2.

According to the second method of Option 1 as illustrated in FIG. 19, if it is assumed that jitter j3=2, jitter j4=3 and jitter j5=−1, then prior to packet 5 N_jitter_min=2 and N_jitter_max=3, whereas at packet 5 N_jitter_min=−1 and N_jitter_max=3. Thus, maximum (Max) network jitter at packet 5=N_jitter_max −N_jitter_min=4. Accordingly, the network jitter for packet 5 is 4. The equations for calculating network jitter according to the method of Option 1 and a description thereof are set forth below.

The network jitter of a current packet is calculated according to the method of Option 1 as follows:

$$N\_jitter(Current\_header, RFH) = (T\_current - T\_RFH) - (p\_TS\_current - p\_TS\_RFH);$$

Update N_jitter_max and N_jitter_min, where N_jitter_max is defined as Max {N_(j, RFH)}, for all headers j sent since RFH and including RFH. N_jitter_min is defined as Min {N_jitter(j, RFH)}, for all headers j sent since RFH and including RFH; and Calculate Max_network_jitter=(N_jitter$_{max}$)−(N_jitter_min).

It should be noted that N_jitter_max and N_jitter_min can be positive or negative, but (N_jitter_max)−(N_jitter_min) is positive.

Option 2

The steps used to calculate network jitter for the third method of Option 2 are illustrated in FIG. 20. In Option 2, network jitter at a particular packet is calculated using jitter calculations between the packet of interest and each of a predetermined number of preceding packets. The predetermined number of preceding packets is defined as a window and such window can be of any value. In the example illustrated in FIG. 20, the window has a value of 4 preceding packets. The window could be set at any other value such as, for example, 7 packets. Further, the window could, for example, be set to be a value equal to the number of packets since the last reference packet.

As illustrated in FIG. 20, network jitter for packet 5 is calculated using information with respect to packet 1 j(5, 1), packet 2, j(5, 2), packet 3 j(5, 3) and packet 4, j(5, 4). As illustrated in FIG. 20, if the network jitter calculated for packet 5 with respect to each of packet 1 is j(5,1)=−2, packet 2 is j(5,2)=3, packet 3 is j(5,3)=4, and packet 4 is j(5,4)=7, then the max_network_jitter=7. The equations for calculating network jitter according to the third method of Option 2 and a description thereof are set forth below.

The network jitter of a current packet is calculated according to the method of Option 2 as follows:

Calculated N_jitter(Current_header, j)=(T_current−T_j)−(p_TS_current−p_TS_j) for all headers j sent before the current header, and belonging to a window W, where T_j is the timer value when header j was received, and p_TS_j is the packed RTP TS of header j; and Calculate Max_network_jitter=|Max N_jitter(Current_header, j)|over all j in the window W.

In the case where a feedback from the decompressor is available, the window W includes headers sent since the last header (known to be correctly received (e.g. acknowledged). In the case of no feedback, the window W includes the last L headers sent, where L is a parameter.

2. Decompressor

To decompress RTP TS of Current_header, the decompressor calculates the time elapsed since the Last_ header was received, in units of T msec. That time, Timer (Current_header, Last_header) is added to p_TS_last, to give an approximation of p_TS_current. The decompressor then determines the exact value of p_TS_current by choosing the value closest to the approximation, whose k least significant bits match the compressed RTP TS. TS_current is then calculated as TSO+(p_TS_current)*TS−stride.

Timer(Current_header, Last_header) can be calculated as (T_current−T_last), where T_current and T_last are the values of R_Timer when Current_header and Last-header were received respectively.

3. Proof of Correctness

In order to prove correctness of the timer and reference based embodiment the following is assumed:

Approx_TS is the approximation of p_TS_current, calculated by the decompressor as p_TS_last+Timer (Current_header, Last_header); and Exact_TS is the exact value of p_TS_current. Based on the above then:

|Approx_$TS$-Exact_$TS$|<=|Jitter(Current_header, Last_header)|;

Due to the definition of Max_network_jitter at the compressor:

|Jitter(Current_header, Last_header)|≦J1,

Where

J1=Max_network_jitter+Max_radio_jitter+J.

J is a factor added to account for the quantization error caused by the Timers at the compressor and decompressor, which can be +1 or −1. Therefore, J=2 is sufficient.

Thus, it follows that:

|Approx_$TS$-Exact_$TS$|≦J1

To calculate the Exact_TS without ambiguity, it is sufficient to choose k such that the condition of $(2*J1+1) < 2_k$ is satisfied.

4. Case of Packet Misordering Before the Compressor

Packet Misordering can be detected by a decreasing RTP sequence number (RTP SN). When that happens, the compressor can encode the packed RTP TS using a different scheme, for example, VLE. The decompressor is notified of the different encoding by appropriate indicator bits in the compressed header.

Another option is to apply the normal Timer and Reference Based Scheme algorithm—Misordering will likely result in a larger value of k.

5. Uplink

In wireless systems, for the uplink direction, the network jitter is zero (since both the RTP source and the compressor are located in the wireless terminal), and the radio jitter is normally bounded and controlled to remain very small. Therefore, the expected k will be very small and constant, which minimizes the header size fluctuation. This is a very significant advantage for bandwidth management, since for the uplink, the terminal usually has to request for increased bandwidth from the network. Furthermore, there is no packet misordering. Consequently, the timer based scheme is extremely well suited for the uplink.

6. Downlink

For the downlink direction, the network jitter is not zero, but the overall jitter is normally small to meet the real-time requirements. The expected k will still be small and usually constant. There may be more fluctuation in k, but the bandwidth management is less of an issue, since the network controls the bandwidth allocation.

7. Handoff

In cellular systems, there is a MS-to-network radio link and network-to-MS radio link, denoted uplink and downlink respectively. When compression/decompression is applied to cellular links, there is an MS-based function, MS_AD (MS adaptor), which does compression and decompression for the uplink and downlink respectively. There is a network-based entity, called ANI_AD (access network infrastructure adaptor) that does decompression and compression for uplink and downlink respectively.

The specific case of handoff to consider is inter-ANI_AD handoff, where there may be a disruption caused by switching from the old ANI_AD to a new ANI_AD. The issue is how to maintain continuity of information through the handoff so that after handoff, the compression/decompression at MS_AD and the new ANI_AD continue without disruption.

There are two alternative methods for handoff, described below:

a. First Method

The first method uses the aforementioned snapshot of context information exchanged between the ANI_AD and MS_AD, with the handshake method. For the RTP TS, the context information contains the full RTP TS of a reference header. Right after handoff, the compressors (MS_AD for uplink and ANI_AD for downlink) temporarily discontinue using the timer-based scheme and send a compressed RTP TS with respect to the reference value. Once an acknowledgment has been received, the compressor uses the acknowledged value as the RFH, and switches back to the timer-based scheme.

b. Second Method

The second method keeps using the timer-based embodiment across the handoff.

i. Downlink

There is no discontinuity on the receiver side, which is the MS. The compressor's role is transferred from one ANI-AD to another. After handoff, the headers are routed on a new path going through the new ANI_AD instead of the old ANI_AD.

Compressor

The old ANI_AD transfers to the new ANI_AD a snapshot of the following information: T_RFH, p_TS_RFH, current value of S_Timer, TSO, and TS_stride, using the handshake method. (The snapshot values are denoted with a star as described above, e.g., T_RFH*). The new ANI_AD initializes its S_Timer with the current value of S-timer received from the old ANI_AD and starts incrementing that timer every T msec. Initialization of the S_timer with the current S_timer value of the old ANI_AD is a conceptual description. If there is a single S_timer shared by multiple flows, the actual S_timer is not reinitialized. Rather, the offset between that S_timer and the value from the old ANI_AD is recorded. The offset is taken into account in future calculations. To compress the very first header after handoff, the new ANI_AD sends the k least significant bits of p_TS_current. The new ANI_AD determines k, the number of bits to be used, as follows:

J2=Upper bound of N_jitter(Current_header, $RFH^*$)+Max_radio_jitter+J.

Where k is selected to satisfy a condition of $(2*J2+1)<2^k$.

In the above, Max_radio_jitter is the maximum jitter on the segment between the new ANI_AD and the MS-AD.

An Upper bound of N_jitter(Current_header, RFH*) is calculated as follows:

|Timer(Current_header, *RFH**)−(*p_TS*_current−*p_TS_RFH**)|+ T_transfer, where Timer(Current_header, *RFH**) is (*T*_current−*T_RFH**);

T_current is the value of S_Timer at the new ANI_AD when Current_header was received;

T-RFH* is the value received from the old ANI_AD;

T_transfer is an upper bound of the time to transfer the context information from old ANI_AD to new ANI_AD, expressed in units of T msec; and

J=2.

Decompressor

To decompress RTP TS of Current_header, the decompressor calculates the time elapsed since RFH was received, in units of T msec. That time, Timer(Current_header, RFH), is added to p_TS_RFH, to give an approximation of p_TS_current. The decompressor then determines the exact value of p_TS_current by choosing the value closest to the approximation, whose k least significant bits match the compressed RTP TS. TS_current is then calculated as TSO+(p_TS_current)*TS_stride.

The time elapsed since RFH was received can be calculated as (T_current−T_RFH).

i. Failure Case

When the context information cannot be transferred to the new ANI_AD in a timely manner, the new ANI_AD sends the ful RTP TS until an acknowledgment is received.

ii. Uplink

The decompressor role is transferred from one ANI_AD to another. The compressor stays anchored at the MS.

Decompressor

The old ANI_AD transfers to the new ANI_AD a snapshot of the following information: T_RFH*, p_TS_RFH*, current value of R_Timer*, TSO, and TS_stride, using the handshake method. The new ANI_AD initializes its R_Timer with current value of R_Timer received from the old ANI_AD$^2$ and starts incrementing that timer every T msec. Initialization of the R_timer with the current R_timer value of the old ANI_AD is just a conceptual description. If there is a single R_timer shared by multiple flows, the actual R_timer is not reinitialized. Rather, the offset between that R_timer and the value from the old ANI_AD is recorded. That offset is taken into account in future calculations. To decompress the very first header after handoff, the new ANI_AD calculates Timer(Current_header, RFH) adds it to p_TS_RFH*, to give an approximation of p-TS-current. The decompressor then determines the exact value to p_TS_current by choosing the value closest to the approximation, whose k least significant bits match the compressed RTP TS. TS_current is then calculated as TSO+(p_TS_current)* TS_stride.

Timer(Current_header, RFH) can be estimated as (T_current−T_RFH*). T_current is the value of R_Timer when Current_header was received.

Compressor

The MS_AD sends the k least significant bits of p-TS_current. It determines k, the number of bits to be used, as follows:

Calculate *J*2=Upper bound of *N*_jitter(Current_header, *RFH**)+ Max_radio_jitter+*J*, When k is selected to satisfy a condition of (2*J2+1)<2$^k$. Here Max_radio_jitter is the maximum jitter on the segment between the new ANI_AD and the MS_AD.

Upper bound of N_jitter(Current_header, RFH*) is calculated as

|Timer(Current_header, *RFH**)−(*p_TS*_current_header−*p_RFH**)|+*T*_transfer, where Timer(Current_header, RFH*) is (T_current−T_RFH*);

T_current is the value of S_Timer at the new ANI_AD when Current header was received;

T_RFH* is the value received from the old ANI_AD;

T_transfer is an upper bound of the time to transfer the context information from old ANI_AD to new ANI_AD, expressed in units of T msec and

J=2

Failure Case

When the context information cannot be transferred to the new ANI_AD in a timely manner, the new ANI_AD notifies the MS_AD, which sends the full RTP TS until an acknowledgment is received.

8. Performance

Due to the conversational real-time requirements, the cumulative jitter in normal operation is expected to be at most only a few times T msec. Therefore, a value of k around 4 or 5 is sufficient, as a jitter of up to 16 to 32 speech samples can be corrected.

The advantages of this embodiment are as follows:

The size of the compressed header is constant and small. The compressed header typically includes a message type, which indicates the type of message (k1 bits), a bit mask which indicates which field are changing, and a field that contains the k least significant bits of index_current (k bits). Assuming that 4-bit MSTI bit mask is used, and k1=4, the size of compressed header when only the RTP TS changes (this case is by far the most frequent) is 1.5 bytes. Furthermore, the size does not change as a function of the length of interval of silence.

No synchronization is required between the timer process and the decompressor process.

Robustness to errors, as the partial RTP TS information in the compressed header is self contained and only needs to be combined with the decompression timer to yield the full RTP TS value. Loss or corruption of a header will not invalidate subsequent compressed headers.

The compressor needs to maintain little memory information:

T_RFH, p-TS_RFH, N_Jitter_max, N_jitter_min, TSO, and TS_stride in Option 1 and

{T-j, p-TS-j}, for all j in window W, TSO, and TS-stride in Option 2.

C. Jitter Reduction

Due to the conversational real-time requirements, one can reasonably expect that the various jitters described above are on the order of a few T msec's in normal operation. However, one cannot rule out cases where the jitter is larger and would therefore require a larger k. For example, there can be abnormal conditions on the path from the RTP source to the receiver (failures, etc.), during which jitters become excessive. Also, there may be cases where a constant value of k is desired or desirable. To deal with these cases, a jitter reduction function can be implemented as a front end to the compressor to filter out packets with excessive jitter (i.e., jitter exceeding some threshold value).

In the stationary case (no handoff), the jitter is calculated as J1 and compared to a stationary threshold as follows:

*J*1=(*n*_jitter_max−*N*_jitter_min)+Max_radio_jitter+*J*.

In the handoff case, the jitter is calculated as J2 and compared to a handoff threshold as follows:

$$J2=|\text{Timer}(\text{Current\_header}, RFH^*)-(p\_TS\text{-current}-p\_TS\_RFH^*)|+T\_\text{transfer}+\text{Max\_radio\_jitter}+J.$$

The main difference with respect to the stationary no-handoff case, is the addition of T_transfer. In practice, to be able to execute handoff in 100 msec, T_transfer must be bounded by about 100 msec, so T_transfer=about 5 or 6 in units of T msec (T=20 msec). A value of k=5 is sufficient.

The stationary and handoff thresholds may or may not be the same.

D. Case of Video

In the case of an RTP video source, it is not necessarily true that there is a constant time spacing between packets, and furthermore, the RTP TS does not necessarily increment by a constant stride from one packet to the next. However, the RTP TS and time spacing between packets are discrete. Thus, as follows:

RTP time stamp of packet m=RTP time stamp of packet 0 (generated at time 0)+TS_stride*[index+adjust(m)], where TS_stride is a constant dependent on the codec, and adjust(m) is an integer that depends on m and reflects the differences with respect to a linear behavior like in voice; and the time spacing between two consecutive packets is an integer multiple of T msec.

In what follows, that behavior at the RTP source is referred to as adjusted linear behavior. Using the same notation as for voice, TS_last=TS0+TS+stride*[index_last+adjust (index_last)], and TS_current=TS0+TS_stride*[index_current)+adjust (index-current]. The Adjust parameter can be positive or negative. Thus, the main difference compared to voice is the additional term Adjust.

The RTP TS is headers coming into the decompressor also follow an adjusted linear pattern as a function of time, but less closely, due to the delay jitter between the source and the decompressor. In normal operation (absence of crashes or failures), the delay jitter is bounded, to meet the requirements of conversational real-time traffic.

As above it is assumed that the packed RTP TS of Current_header=index_current+adjust(index_current). The same notation will be used with respect to p_TS_current, for example, Compressor The compressor sends in the compressed header the k least significant bits of p_TS_current. The algorithm to determine k is the same as for voice.

Decompressor

The algorithm to be used is the same as for voice.

1. Handoff

The two alternative methods for handoff described for voice, apply as well to video.

2. Value of k

For voice, it was shown that k=4 or 5 is sufficient ($2^k$=16 or 32). In the case of video, a larger value of k is required due to Adjust. Since the video is structured in 30 frames per second, |Adjust|<30. Therefore, k=7 or 8 bits should be sufficient in normal operation.

Application of Handoff Embodiments to a Timer-Based Compression Embodiment

The following description describes how the various handoff embodiment are applied when the timer-based embodiment is used to compress RTP TS.

The various handoff embodiments are:

handoff with handshake, downlink and uplink traffic (FIGS. 8 and 9)

handoff without handshake, downlink and uplink traffic (FIGS. 10 and 12)

handoff without handshake, downlink and uplink traffic (FIGS. 6 and 7)

The timer-based embodiment has three options as follows:

Option 1

Max_network_jitter is calculated as=(N_jitter_max)−(N_jitter_min), where N_jitter_max and N_jitter_min are respectively the maximum and minimum of jitter of header j relative to a reference header, for all headers j in a window W. Window W consists of the headers transmitted since the reference header, including the reference header. The reference header is a header that has been acknowledged.

Option 2

Max_network_jitter is calculated as the maximum of jitter of a current header relative to header j, for all headers j belonging to a window W. There are 2 suboptions, depending on whether there is feedback or not.

Option 2a There is a feedback from the decompressor. W consists of the headers transmitted since and including the last acknowledged header.

Option 2b There is no feedback from the decompressor. W consists of the last L headers, where L is a parameter.

FIGS. 21–26 in table form illustrate operation of embodiments of the invention.

As an example, consider a header compression embodiment using:

Implicit encoding technique to compress the static fields

VLE with feedback compression technique to compress RTP SN and IP-ID

Timer-based option 2a compression technique to compress RTP TS

Direct encoding technique for the other fields (i.e. the other fields are not compressed, but transmitted as is)

The compression context information is FO context information and SO context information. In turn, each compression technique uses a compression context component. The same is true for the decompression context information.

FIGS. 27–28 provide a summary of the FO and SO context informations and context information components respectively for compression and decompression context information.

Context Transfer Optimization

Figure 29:
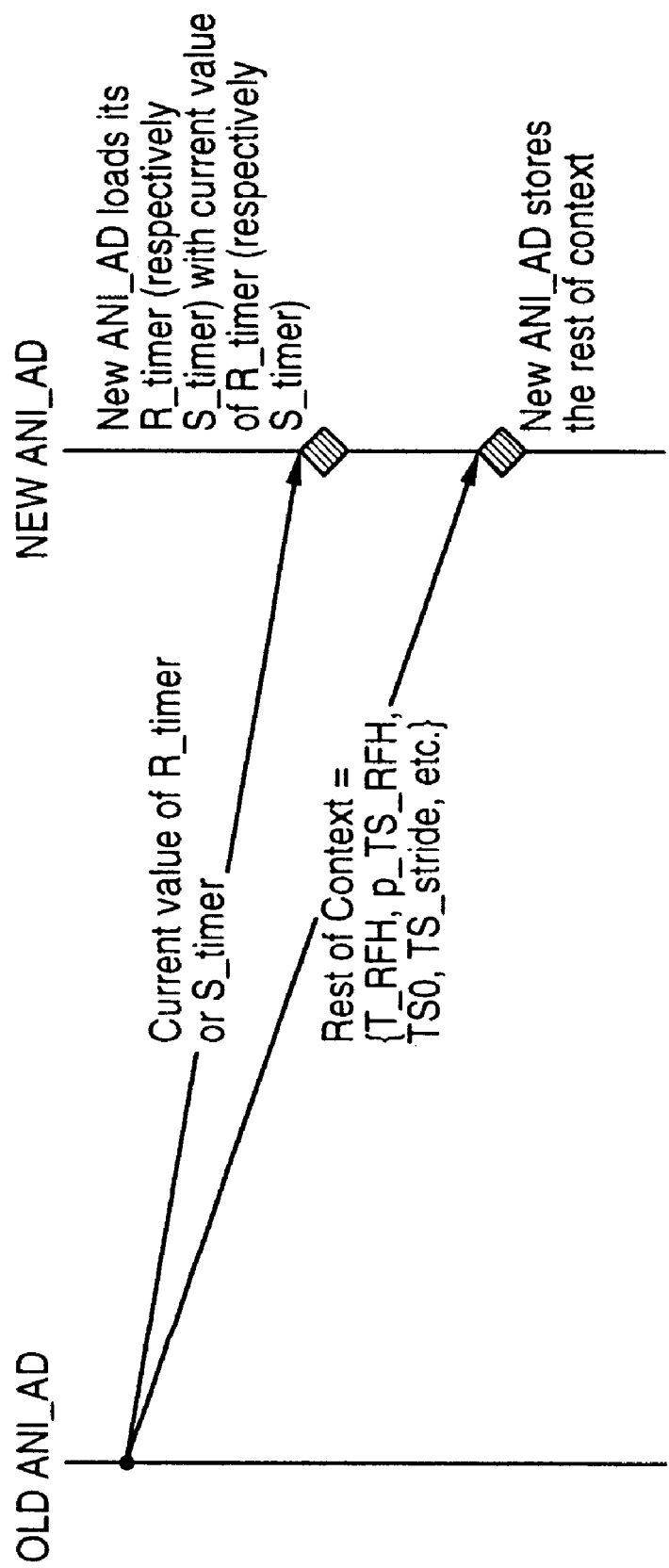
FIG. 29 illustrates context transfer optimization in accordance with the present invention.

An embodiment of context transfer optimization in accordance with the invention is illustrated in FIG. 29. The context information illustrated in FIG. 29 is time related with only the value of the R and S timers being variable with time. The current value of the R_timer or S_timer, when included in the context information, should be transferred in as little time as possible from the old ANI_AD to the new ANI_AD to minimize any skew between the timer at the new ANI_AD and the one at the old ANI_AD. In this embodiment, the current value of R_timer or S_timer is transmitted separately from the rest of the context, so it can be transferred faster than if it were sent together with the other context information. The remainder of the time related context information is T_RFH, p_TS_RFH, TSO and TS_stride. It should be understood that this embodiment may also be practiced with, in addition to time related context information, non-time related context information being transmitted from the old ANI_AD to the new ANI_AD.

Wait-for-Acknowledgment from-Old-ANI-AD

Figure 30:
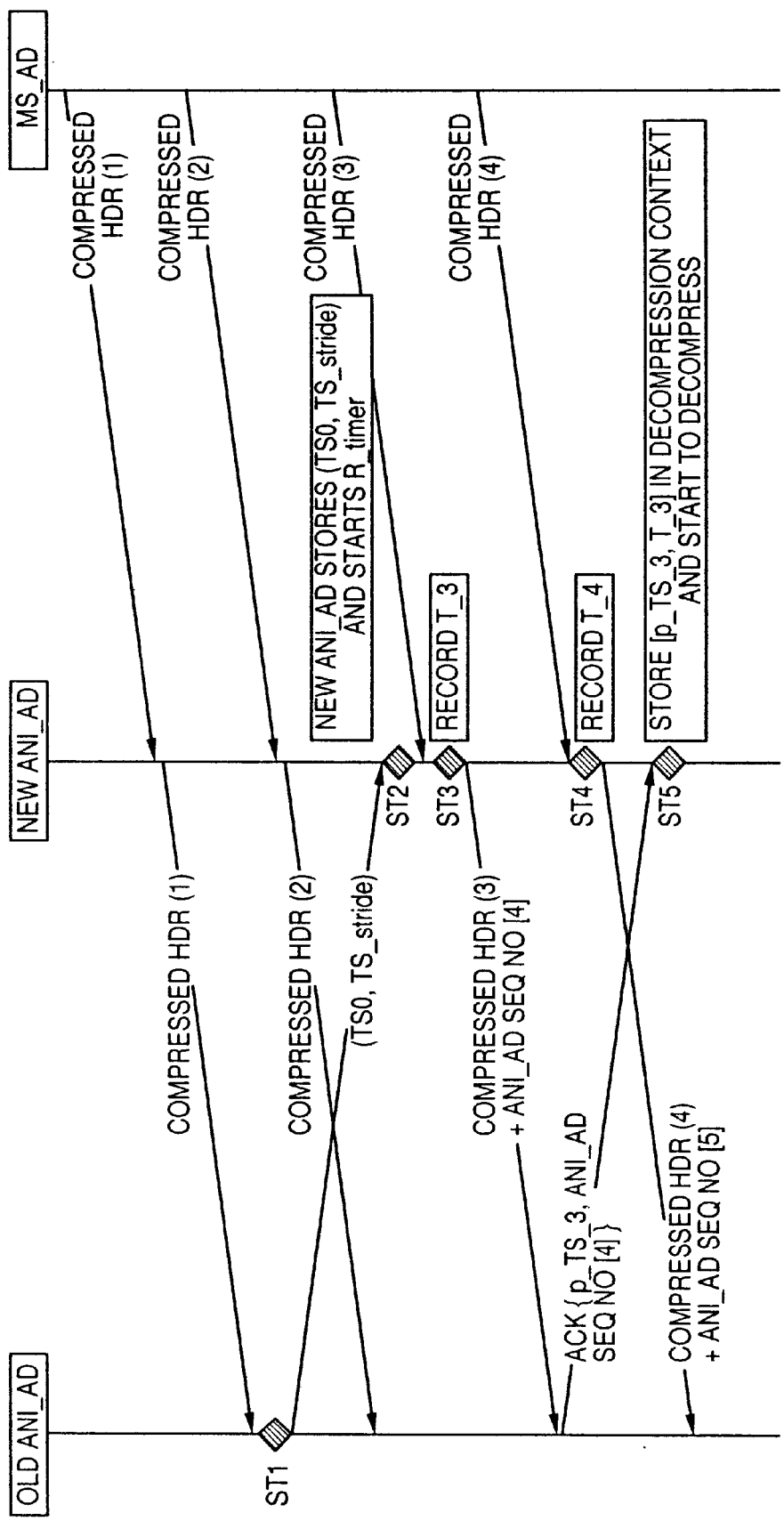
FIG. 30 illustrates an embodiment of the invention which waits for an acknowledgment from an old ANI.

Another embodiment of the invention illustrated in FIG. 30 represents the case of relocation defined after radio handoff for the uplink traffic. At least one compressed header (1) is transmitted from the MS-AD through the new ANI_AD to the old ANI_AD. At ST1, the old ANI_AD sends a first portion of the decompression context component which is time related containing TSO and TS_stride to the new ANI_AD. The first portion is a subset of the decompression context component. The first portion of decompression context component is static time related information which may be sent without consideration of the time at which transmission is initiated or the time required for transmission which is a consideration of the embodiment described above with reference to FIG. 29. At ST2 the new ANI_AD starts its R_timer and records the timer values for all subsequent compressed headers relayed to the old ANI_AD (the timer value of a header is the value of the R_timer when the header is received). Each relayed header is associated with a ANI_AD sequence number [4] and [5] assigned by new ANI_AD, and sent to the old ANI_AD. A plurality of compressed headers (3) and (4) are transmitted from the MS_AD to the new ANI_AD which have their arrival timer values recorded (T-3 and T-4) at ST3 and ST4. In response to compressed header (3) and the sequence number (4) (which is not the RTP sequence number), the old ANI_AD decompresses the compressed header (3) and sends feedback in the form of an acknowledgment containing the packed time stamp p_TS_3 and the sequence number (4) to the new ANI_AD. At ST5, the new ANI_AD uses the sequence number (4) to correlate the packet time stamp with the header, and associates the packet time stamp value with the timer value, thus creating a second portion and subset of the decompression context information component to obtain the complete decompression context information component. Decompression of compressed headers received after ST5 is performed by the new ANI_AD using the complete stored decompression context component which is time related as obtained above.

This embodiment has several advantages. The relocation of the context information from the old ANI_AD to the new ANI_AD is seamless. The timer value (the current value of the R_timer or the S timer) does not have to be transmitted. This embodiment works in all cases regardless of whether the header compression scheme is acknowledgment based or not. In option 2b, the new ANI_AD may relay the acknowledgment to the MS_AD, after stripping it of the ANI_AD sequence number and time stamp.

In Options 1 and 2a, the new ANI_AD strips the acknowledgments of their ANI_AD sequence number and packet RTP TS and relays the result to the MS_AD.

Wait-for Acknowledgment-from-MS-AD

Figure 31:
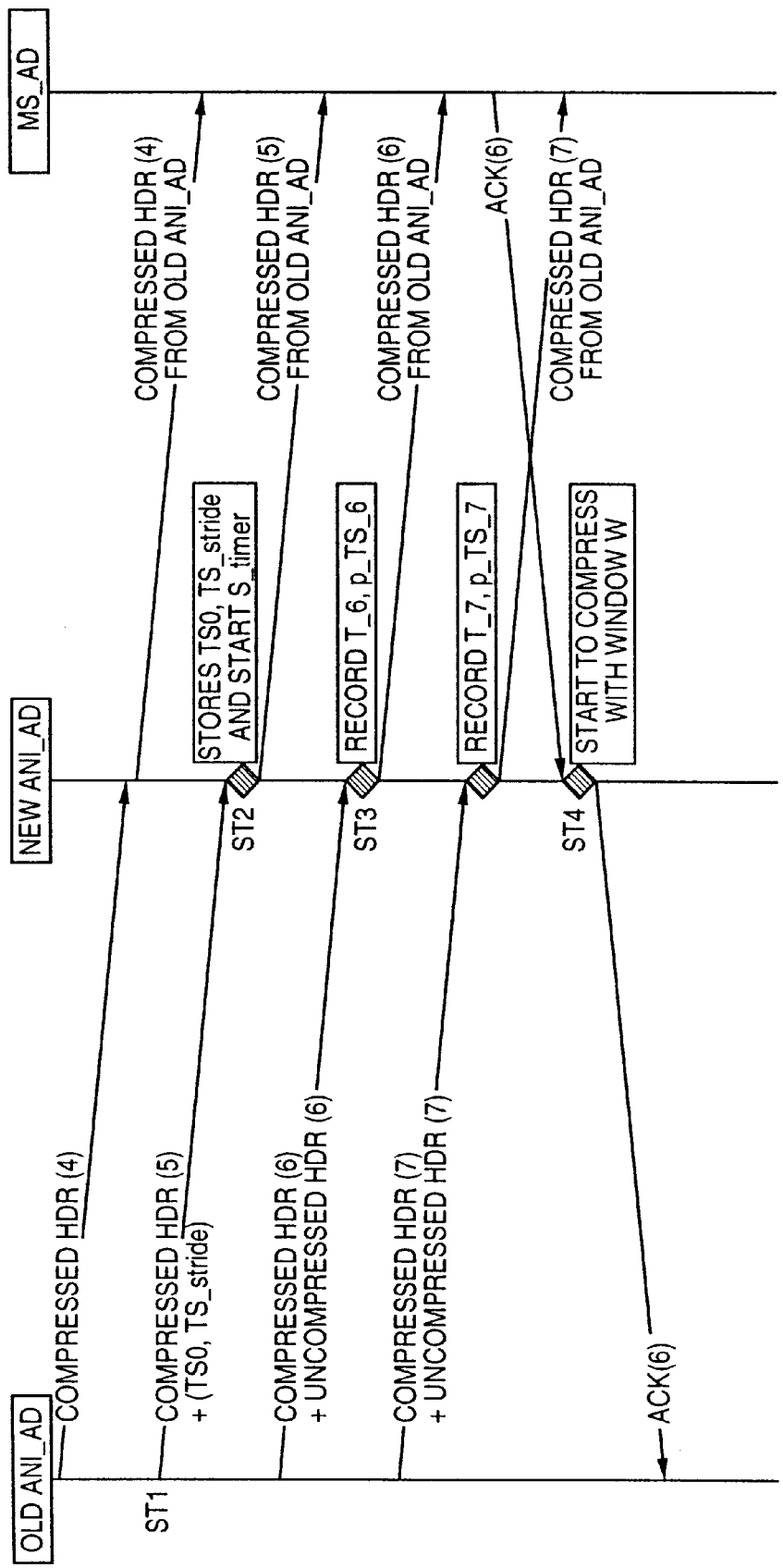
FIG. 31 illustrates an embodiment of the invention which waits for an acknowledgment from a MS.

The wait for acknowledgment-from-MS embodiment is illustrated in FIG. 31. At ST1, a compression context information component comprised of TSO and TS_stride is transmitted. The new ANI_AD at ST2 starts its S_timer and records the timer values and RTP TS for all the compressed headers relayed to the MS_AD (a timer value of a header is the value of S_timer when the header is received). The quantities RTP TS and RTP SN are extracted by the MS_AD from the original uncompressed header. Subsequently, when the new ANI_AD receives an acknowledgment (6) from the MS_AD, and the acknowledgment (6) relates to a header that has been relayed by the new ANI_AD, the new ANI_AD at ST4 relays the acknowledgment (6) and starts to compress with a window of the headers relayed since the RFH. RFH is the acknowledged header. In option 1, the context information component which is time related contains is (p_TS_RFH, T_RFH, N_jitter_max, N_jitter_min, TSO, TS_stride). In option 2, the context information component which is time related component contains {(p_TS_j, T_j) for all headers j in window W, TSO, TS_stride}. The quantity p_TS_J and T_j are the packet RTP TS and timer values for header j.

Wait for Window Full

Figure 32:
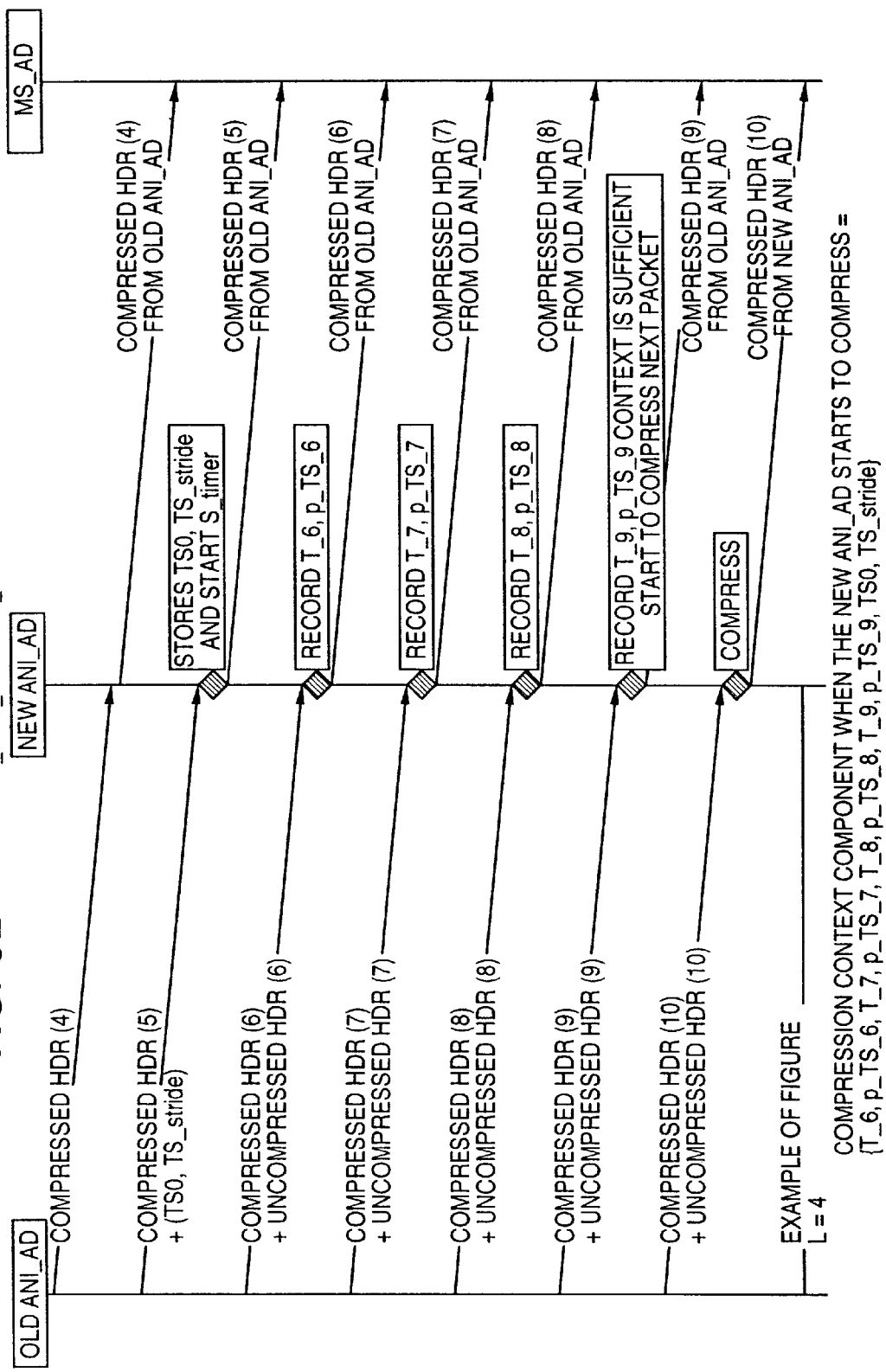
FIG. 32 illustrates a wait for window full embodiment.

The embodiment of FIG. 32 is the same as wait-for-acknowledgment-from-MS_AD embodiment of FIG. 31, except that the new ANI_AD waits for L relayed headers before it can start to compress (rather than waiting for acknowledgment). The window W is gradually built up as the new ANI_AD relays the headers (6), (7), (8) and (9) and records the RTP TS packet values p_TS_6, p_TS_7, p_TS_8 and p_TS_9 and timer values T_6, T_7, T_8 and T_9. The context information compression, which is time related component, contains {(p_TS_j, T_j) for all headers j in window W, TSO, TS_stride}. The quantities p_TS_j and T_j are the packet RTP TS and timer values for header j. This embodiment has the same advantages as above and works when header compression is not acknowledgment based.

Window Management

Figure 33:
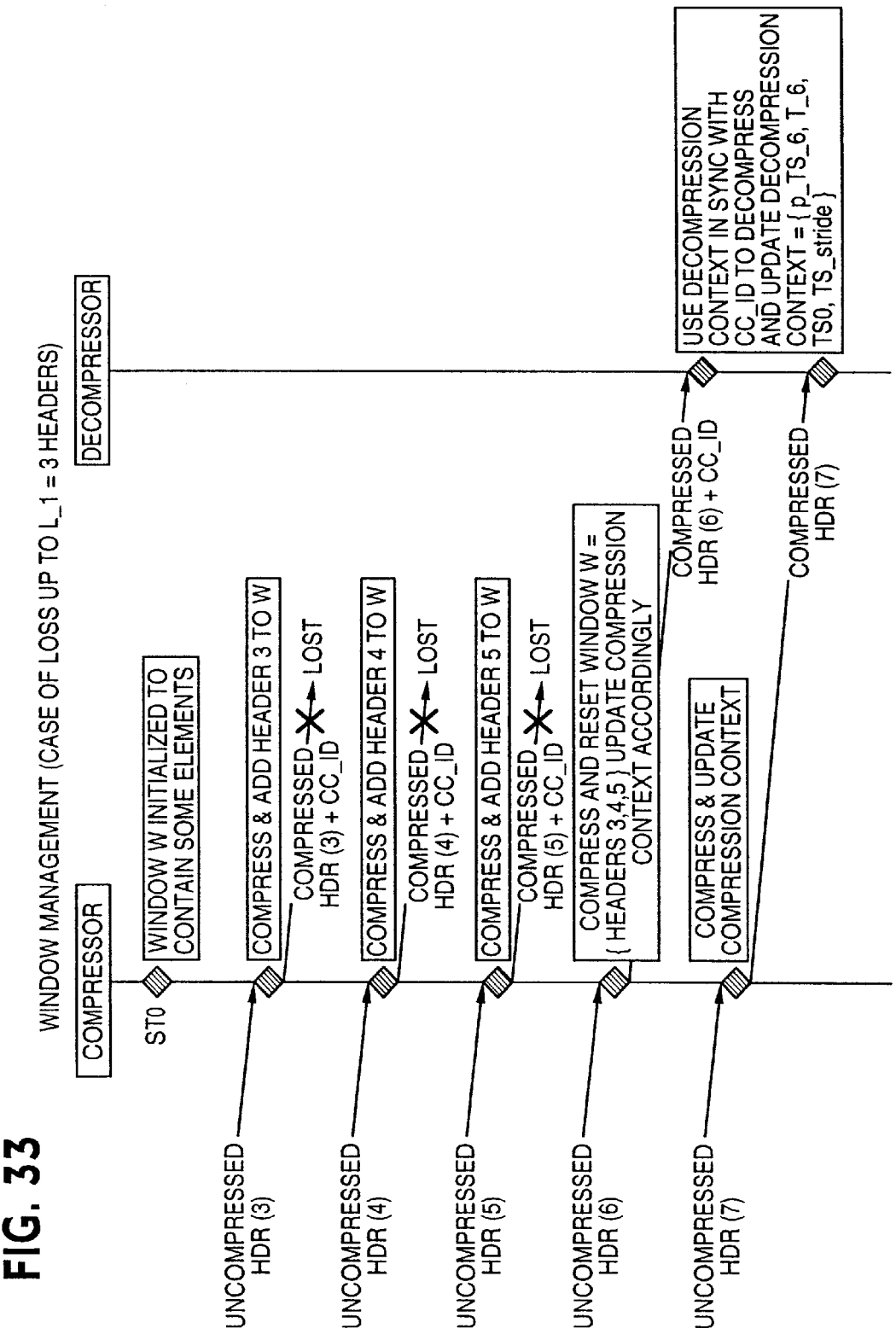
FIGS. 33 and 34 illustrate an embodiment of the invention which uses window management.
Figure 34:
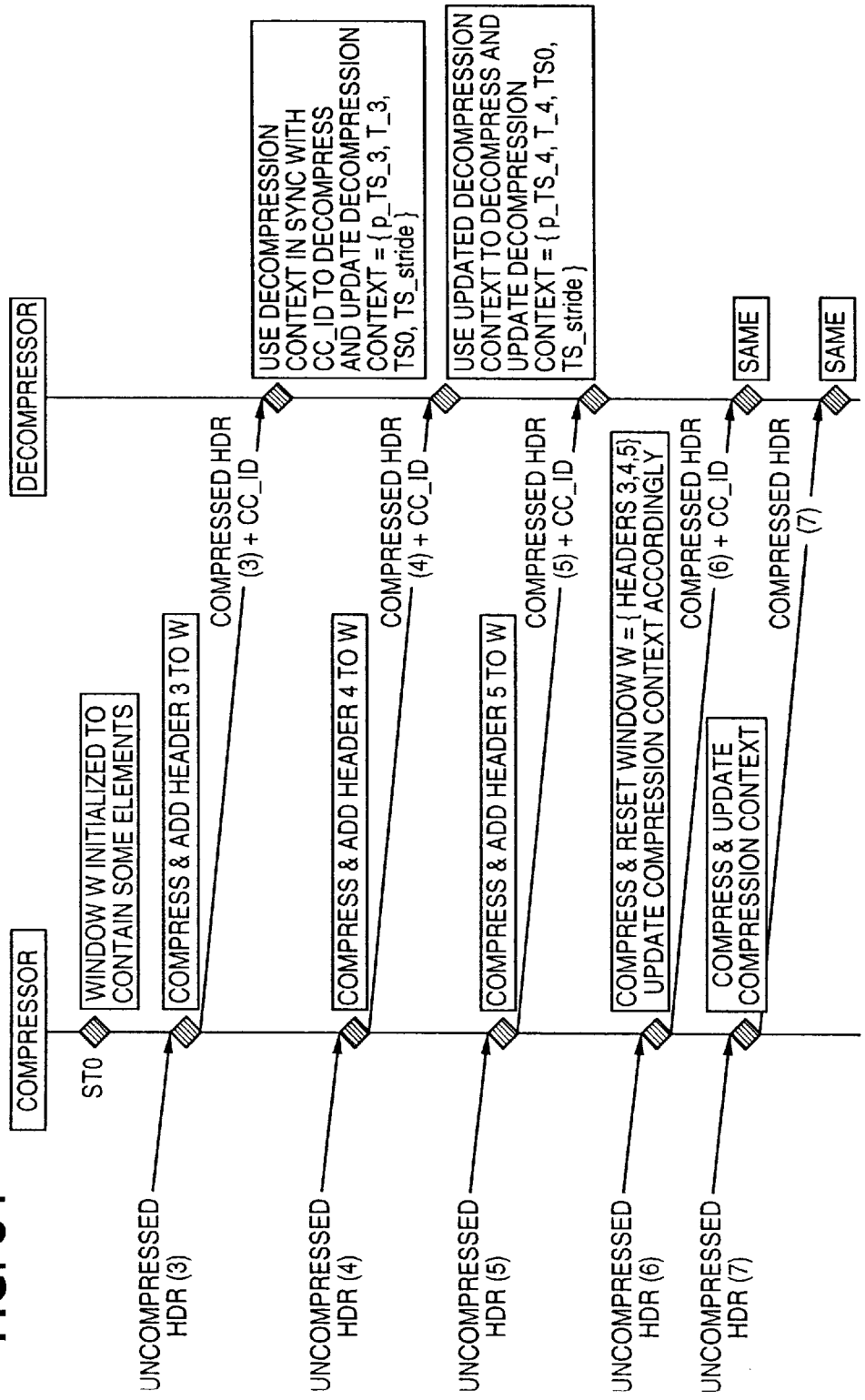

FIGS. 33 and 34 illustrate an embodiment using window management which is applicable to the downlink and the uplink. This embodiment operates the new compressor right after radio handoff. The radio link is assumed to operate in a manner in which one or more packets are lost during transmission from time to time. The new compressor starts with a window initialized with some elements. Each newly compressed header is added to the window, and sent with a CC_d_Id, until L headers are sent. The size of the window is chosen so that if L radio packets is transmitted, at least one will be received insuring that the decompressor will, upon reception of that packet, be able to update its time related decompression context information. The window is reset to include only the L most recent headers sent, and the CC_d_ID are no longer sent. Thereafter, the compressor updates its compression context information with each subsequently transmitted packet. This embodiment works without feedback.

Figure 35:
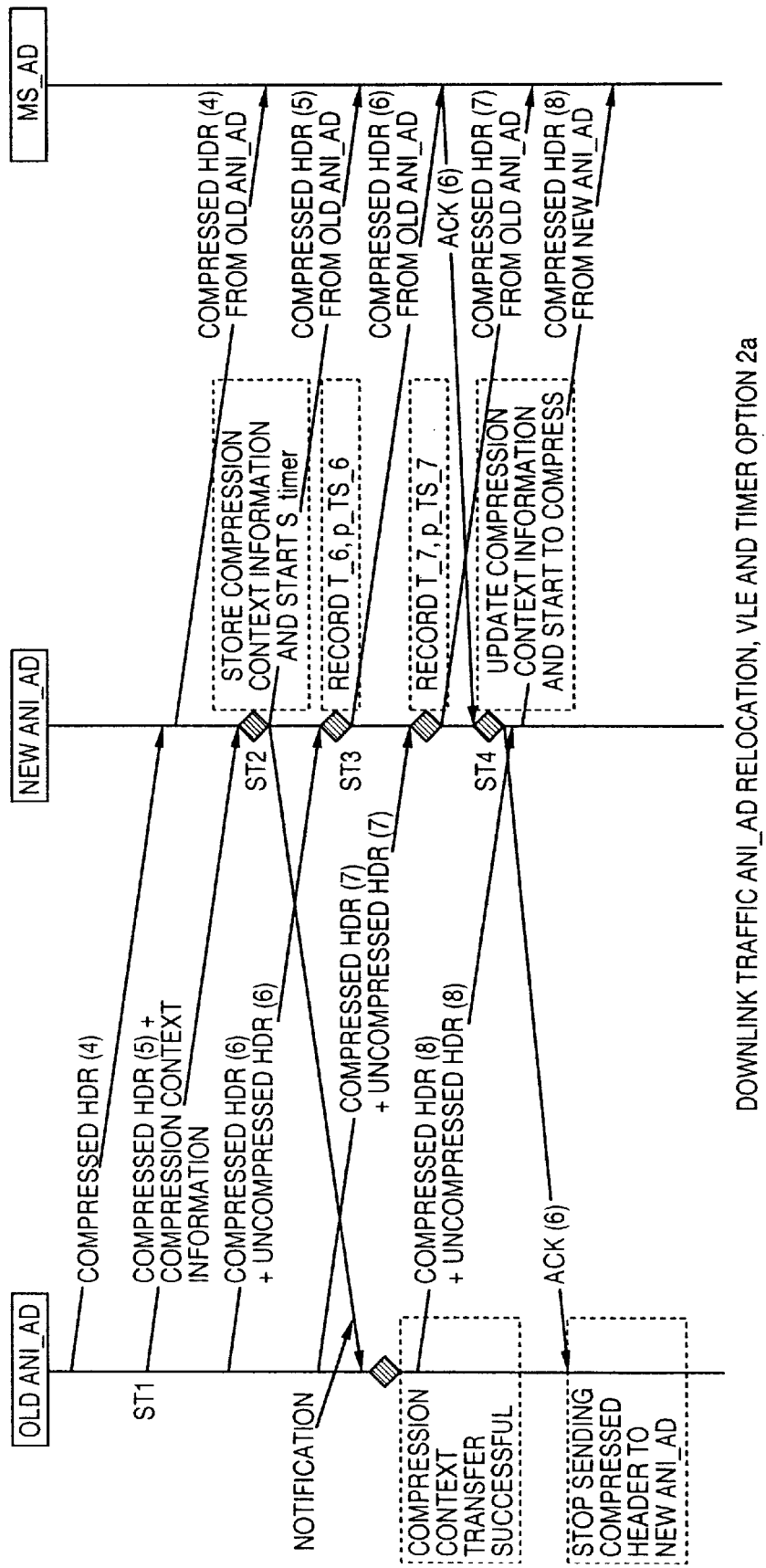

FIG. 35 illustrates an embodiment of the invention which comprises VLE and time related compression of headers. FIG. 35 is a combination of FIGS. 8 and 31.

At time ST1, the compression context sent by the old ANI_AD is a subset of the SO compression context information, and (TSO, TS_stride). At time ST4, the compression context information component for VLE is established as V_min=V_max_Value of RTP SN of header (6), and V_min=V_max=Value of IP-ID of header (6). The compression context information component for the timer is established as (p_TS_6, T_6, TSO, TS_stride, value of S_timer).

FIG. 36 illustrates an embodiment of the invention which combines VLE and time related decompression of headers. FIG. 36 illustrates a combination of FIGS. 10 and 30. At time ST1, the decompression context information sent by the old ANI_AD is a subset of the SO decompression context information, the decompression context information component for VLE, and (TSO, TS_stride). At time ST4, the old ANI_AD sends another subset of the decompression context information (p_TS_3) in the form of an acknowledgment. The new ANI_AD adds (p_TS 3, T_3) to the decompression context information component for the timer. It possibly strips the acknowledgment of the ANI_AD sequence number and relays it to the MS_AD.

The time at which the old ANI_AD stops sending compressed headers may be at the time of e.g. ST2 or after receiving a communication, e.g. notification from the new ANI_AD. Moreover, the new ANI_AD may begin decompression at any time after transfer of decompression context information, e.g. ST2.

In the uplink and downlink, many possible variants are possible. In particular:

Decompression context information does not necessarily have to come directly from the old ANI_AD; it could come from any entity which holds the information; additionally, even if the context came from the old ANI_AD, it may transit through other nodes/entities.

The transfer of (TSO, TS_stride) from the old ANI_AD to the new ANI_AD does not necessarily have to occur at ST1; it can occur any time, provided the information gets received by the new ANI_AD before it starts decompression.

The information transferred does not have to be (TSO, TS_stride). Some information equivalent to the packed TS can be used, in particular the original RTP TS or some function of it. This information is referred to as "time stamp equivalent information". If something different from packed RTP TS is used, some other information may be sent at ST1, rather than (TSO, TS_stride). The information sent at ST1 is used to convert between the original RTP TS and the time stamp equivalent information.

In only the circumstance of downlink, the ANI_AD sequence number sent at ST3 by the new ANI_AD along with the compressed header and the acknowledgment returned by the old ANI_AD is just an example mechanism to enable the new ANI_AD to correlate the time stamp equivalent information with the header. Other mechanisms are possible.

While the invention has been described with reference to its preferred embodiments, it should be understood that numerous modifications may be made thereto without departing from the spirit and scope of the invention. For example, while the invention has been described with reference to the context information being of a general information content, time related or non-time related, it should be understood that the embodiments of the invention as described are not limited to the transfer of any particular type of context information. The transfer of (TSO, TS_stride) is not required if original RTP TS is used rather than packed RTP TS. It is intended that all such modifications fall within the scope of the appended claims.

What is claimed is:

1. A method of communication in a packet network which transmits packets having compressed headers comprising:
   establishing a connection between a first network node and a second network node including storing context information used with compression and decompression of the headers of the packets at the first and second nodes; and
   changing the connection between the first network node and the second network node to a connection between the second network node and a third network node including transferring the context information stored by the first node to the third network node which is stored by the third node as the context information of the third node and using the stored context information at the second and third nodes for compression and decompression of the headers of the packets at the second and third nodes.

2. A method in accordance with claim 1 wherein:
   the stored context information is used for compressing and decompressing first and second order compressed headers.

3. A method in accordance with claim 1 wherein the stored context information comprises:
   at least one type of information used for compressing headers of the packets and at least one type of information used for decompressing headers of the packets.

4. A method in accordance with claim 1 wherein:
   the third network node is a network entity which is a transmitter of packets in a downlink to a mobile decompressor which is the second node and the stored context information is used by the third node to compress the headers of the packets transmitted in the downlink.

5. A method in accordance with claim 4 wherein:
   the stored context information is information used for compressing the headers of the packets to a first order of compression.

6. A method in accordance with claim 4 wherein:
   the stored context information is information and for compressing the headers of the packets to a second order of compression.

7. A method in accordance with claim 1 wherein:
   the second node is a mobile compressor which is a transmitter of packets in an uplink to the third node which is a network entity and the stored context information is used by the mobile compressor to compress the headers of packets transmitted in the uplink.

8. A method in accordance with claim 7 wherein:
   the stored context information is information used for compressing the headers of the packets to a first order of compression.

9. A method in accordance with claim 7 wherein:
   the stored context information is information used for compressing the headers of the packets to a second order of compression.

10. A method in accordance with claim 1 wherein:
    the third network node is a network entity which is a receiver of packets in an uplink from the second node which is a mobile decompressor and the stored context information is used by the third network node to decompress the headers of the packets transmitted in the uplink.

11. A method in accordance with claim 10 wherein:
    the stored context information is information used for compressing the headers of the packets to a first order of compression.

12. A method in accordance with claim 11 wherein:
    the stored context information is information used for compressing the headers of the packets to a second order of compression.

13. A method in accordance with claim 1 wherein:
    the second node is a mobile terminal which is a receiver of packets in a downlink from the third node which is a network entity and the stored context information is used by the mobile decompressor to decompress the packets transmitted in the downlink.

14. A method in accordance with claim 13 wherein:
    the stored context information is information used for compressing the headers of the packets to a first order of compression.

15. A method in accordance with claim 13 wherein:
    the stored context information is information used for compressing the headers of the packets to a second order of compression.

16. A method in accordance with claim 10 wherein:
    the second node stores context information used to compress the headers of packets which are transmitted to the third node and the context information stored by the third node is derived from the context information stored by the second node.

17. A method in accordance with claim 16 wherein:

the context information stored by the third node is identical to the context information stored by the second node.

18. A method in accordance with claim 13 wherein:

the third node stores context information used to compress the packets which are transmitted to the second node and the context information stored by the second node is derived from the context information stored by the third node.

19. A method in accordance with claim 18 wherein:

the context information stored by the second node is identical to the context information stored by the third node.

20. A method in accordance with claim 1 wherein:

the first network node is a network entity which is a transmitter of packets in a downlink to a mobile decompressor which is the second node and the stored context information of the first network node is used by the first node to compress the headers of the packets transmitted in the downlink.

21. A method in accordance with claim 20 wherein:

the stored context information of the first network node is information used prior to changing the connection for compressing the headers of the packets to a first order of compression.

22. A method in accordance with claim 20 wherein:

the stored context information of the first network node is information used prior to changing the connection for compressing the headers of the packets to a second order of compression.

23. A method in accordance with claim 1 wherein:

the second node is a mobile compressor which is a transmitter of packets in an uplink, prior to changing the connection, to the first node which is a network entity and the stored context information is used by the mobile compressor to compress the headers of packets transmitted in the uplink.

24. A method in accordance with claim 23 wherein:

the stored context information of the mobile compressor is information used for compressing the headers of the packets to a first order of compression.

25. A method in accordance with claim 23 wherein:

the stored context information of the mobile compressor is information used for compressing the headers of packets to a second order of compression.

26. A method of transferring context information used for compression of headers of packets transmitted in a downlink from one of a plurality of network entities to one of a plurality of mobile decompressors when one mobile decompressor is handed off from a first network entity to a second network entity comprising:

storing at the first network entity context information at a time at which the mobile decompressor is to be handed off to the second network entity which is used for compression of packets transmitted from the first network entity to the one mobile decompressor;

transmitting from the first network entity the stored context information to the one mobile decompressor or information representative of the context information stored at the first network entity which is used by the one mobile decompressor to obtain the stored context information of the one mobile decompressor to the one mobile decompressor;

transmitting feedback from the one mobile decompressor to the first network entity that the stored context information or information representative of the context information has been received by the one mobile decompressor; and after receiving the feedback, transmitting the context information from the first network entity to the second network entity which stores the received context information.

27. A method in accordance with claim 26 wherein:

the second network entity uses the stored context information to compress the headers of packets which are transmitted to the one mobile decompressor.

28. A method in accordance with claim 27 wherein:

the stored context information used by the second network entity to compress the headers of the packets provides a first order of compression of the headers.

29. A method in accordance with claim 27 wherein:

the stored context information used by the second network entity to compress the headers of the packets provides a second order of compression of the headers.

30. A method in accordance with claim 26 wherein:

the one mobile decompressor decompresses the headers of the compressed packets transmitted from the second network entity.

31. A method in accordance with claim 30 wherein:

the stored context information used to decompress the headers of the packets transmitted from the second network entity provides a decompression of headers having a first order of compression.

32. A method in accordance with claim 30 wherein:

the stored context information used to decompress the headers of the packets transmitted from the second network entity provides a decompression of headers having a second order of decompression.

33. A method of transferring context information used for compression of headers of packets transmitted in an uplink from one of a plurality of mobile compressors to one of a plurality of network entities when one mobile compressor is handed off from a first network entity to a second network entity comprising:

sending a request to the one mobile compressor that the one mobile compressor store context information used by the one mobile compressor in the compression of the headers of packets transmitted from the one mobile terminal to the first network entity;

after the request, storing the context information at the one mobile terminal and transmitting the stored context information or information representative of the stored context information to the first network entity; and deriving decompression context information at the first network entity from the context information received from the one mobile compressor or information representative of the stored context information received from the one mobile compressor and transmitting the decompression context information to the second network entity which stores the decompression context information.

34. A method in accordance with claim 33 wherein:

after storage of the decompression context information by the second network entity handing off the one mobile compressor to the second network entity; and using the stored compression context information at the one mobile compressor to compress the headers of data packets transmitted to the second network entity.

35. A method in accordance with claim 33 further comprising:
the first network entity transmits feedback of decompression context information of the first network entity to the one mobile compressor before transmission of the decompression context information to the second network entity.

36. A method in accordance with claim 34 further comprising:
the first network entity transmits feedback of decompression context information of the first network entity to the one mobile compressor before transmission of the decompression context information to the second network entity.

37. A method in accordance with claim 35 wherein:
the feedback is transmitted to the one mobile compressor with the request.

38. A method in accordance with claim 35 wherein:
the feedback is transmitted to the one mobile compressor with the request.

39. A method in accordance with claim 33 wherein:
the stored compression context information used by the one mobile compressor to compress the headers of the packets provides a first order of compression of the headers.

40. A method in accordance with claim 33 wherein:
the stored compression context information used by the one mobile compressor to compress the headers of the data packets provides a second order of compression of the headers.

41. A method in accordance with claim 33 wherein:
after handoff the one mobile compressor compresses the headers of data packets transmitted to the second network entity and the second network entity uses the stored decompression context information to decompress the headers of data packets received from the one mobile compressor.

42. A method in accordance with claim 34 wherein:
after handoff the one mobile compressor compresses the headers of data packets transmitted to the second network entity and the second network entity uses the stored decompression context information to decompress the headers of data packets received from the one mobile compressor.

43. A method in accordance with claim 35 wherein:
after handoff the one mobile compressor compresses the headers of data packets transmitted to the second network entity and the second network entity uses the stored decompression context information to decompress the headers of data packets received from the one mobile compressor.

44. A method in accordance with claim 36 wherein:
after handoff the one mobile compressor compresses the headers of data packets transmitted to the second network entity and the second network entity uses the stored decompression context information to decompress the headers of data packets received from the one mobile compressor.

45. A method in accordance with claim 37 wherein:
after handoff the one mobile compressor compresses the headers of data packets transmitted to the second network entity and the second network entity uses the stored decompression context information to decompress the headers of data packets received from the one mobile compressor.

46. A method in accordance with claim 38 wherein:
after handoff the one mobile compressor compresses the headers of data packets transmitted to the second network entity and the second network entity uses the stored decompression context information to decompress the headers of data packets received from the one mobile compressor.

47. A method in accordance with claim 39 wherein:
after handoff the one mobile compressor compresses the headers of data packets transmitted to the second network entity and the second network entity uses the stored decompression context information to decompress the headers of data packets received from the one mobile compressor.

48. A method in accordance with claim 40 wherein:
after handoff the one mobile compressor compresses the headers of data packets transmitted to the second network entity and the second network entity uses the stored decompression context information to decompress the headers of data packets received from the one mobile compressor.

49. A method in accordance with claim 41 wherein:
the one mobile compressor stores compression context information used to compress headers of data packets transmitted to the second network entity and the stored decompression context information used by the second network entity to decompress the packets is derived from the compression context information stored by the one mobile compressor.

50. A method in accordance with claim 49 wherein:
the stored decompression context information used by the second network entity to decompress the data packets is identical to the compression context information stored by the one mobile compressor.

51. A method in accordance with claim 26 wherein:
the information representative of the context information comprises a numerical index.

52. A method in accordance with claim 51 wherein:
the numerical index is a sequence number of a packet.

53. A method in accordance with claim 33 wherein:
the information representative of the context information comprises a numerical index.

54. A method in accordance with claim 53 wherein:
the numerical index is a sequence number of a packet.

55. A method in accordance with claim 33 wherein:
the first network entity transmits to the one mobile compressor feedback of receipt of packets which have been received by the first network entity in association with the request that the first network entity store context information;
the stored context information of the one mobile terminal is updated to account for the feedback; and
the updated context information or information representative of the context information of a last received packet used by the first network entity to obtain the context information is transmitted to the second network entity.

56. A method of transmission of packets having compressed headers comprising:
transmitting at least one packet having a compressed header which is compressed with compression context information stored at a first node in a packet network and the compression context information to a second node in the packet data network;
storing the compression context information at the second node; and transmitting the at least one packet having a compressed header from the second node to a third node in the packet network.

57. A method in accordance with claim 56 wherein:

the second node transmits a notification to the first node that the second node has received the compression context information.

58. A method in accordance with claim 56 wherein:

after transmission of the at least one packet having a compressed header, the first node transmits to the second node at least one additional packet having a compressed header compressed by the compression context information stored at the first node with each additional packet being paired with a corresponding header which is not compressed;

compressing the at least one corresponding header which is not compressed at the second node using the compression context information stored at the second node to produce at least one new packet having a compressed header; and transmitting the at least one new packet having a compressed header produced from the compression context stored at the second node from the second node to the third node.

59. A method in accordance with claim 57 wherein:

after transmission of the at least one packet having a compressed header, the first node transmits to the second node at least one additional packet having a compressed header compressed by the compression context information stored at the first node with each additional packet being paired with a corresponding header which is not compressed;

compressing the at least one corresponding header which is not compressed at the second node using the compression context information stored at the second node to produce at least one new packet having a compressed header; and transmitting the at least one new packet having a compressed header produced from the compression context stored at the second node from the second node to the third node.

60. A method in accordance with claim 57 wherein:

after the first node receives the notification, the first node stops transmitting headers compressed by the compression context information stored at the first node.

61. A method in accordance with claim 60 wherein:

after the first node stops sending headers compressed by the compression context information stored at the first node, the first node transmits at least one uncompressed header to the second node, the second node compresses the at least one uncompressed header received from the first node with the compression context information stored at the second node; and the second node transmits the at least one header compressed at the second node to the third node.

62. A method in accordance with claim 59 wherein:

after the first node receives the notification, the first node stops transmitting headers compressed by the compression context information stored at the first node.

63. A method in accordance with claim 62 wherein:

after the first node stops sending headers compressed by the compression context information stored at the first node, the first node transmits at least one uncompressed header to the second node;

the second node compresses the at least one uncompressed header received from the first node with the compression context information stored at the second node; and the second node transmits the at least one header compressed at the second node to the third node.

64. A method in accordance with claim 60 wherein:

after the first node stops transmitting headers compressed by the context information stored at the first node, at least one additional packet having an uncompressed header is received by the second node from a source other than the first node; and the second node compresses the at least one additional packet having an uncompressed header received by the second node from a source other than the first node with the compression context information stored at the second node to produce a new at least one additional packet having a compressed header; and the second node transmits the new at least one additional packet having a compressed head to the third node.

65. A method in accordance with claim 62 wherein:

after the first node stops sending headers compressed by the context information stored at the first node, at least one additional packet having an uncompressed header is received by the second node from a source other than the first node; and the second node compresses the at least one additional packet having an uncompressed header received by the second node from a source other than the first node with the compression context information stored at the second node to produce a new at least one additional packet having a compressed header; and the second node transmits the new at least one additional packet having a compressed head to the third node.

66. A method in accordance with claim 56 wherein:

the first and second nodes are network entities in the packet network and the third node is a mobile decompressor.

67. A method in accordance with claim 57 wherein:

the first and second nodes are network entities in the packet network and the third node is a mobile decompressor.

68. A method in accordance with claim 58 wherein:

the first and second nodes are network entities in the packet network and the third node is a mobile decompressor.

69. A method in accordance with claim 59 wherein:

the first and second nodes are network entities in the packet network and the third node is a mobile decompressor.

70. A method in accordance with claim 80 wherein:

the first and second nodes are network entities in the packet network and the third node is a mobile decompressor.

71. A method in accordance with claim 61 wherein:

the first and second nodes are network entities in the packet network and the third node is a mobile decompressor.

72. A method in accordance with claim 62 wherein:

the first and second nodes are network entities in the packet network and the third node is a mobile decompressor.

73. A method in accordance with claim 63 wherein:

the first and second nodes are network entities in the packet network and the third node is a mobile decompressor.

74. A method in accordance with claim 64 wherein:
the first and second nodes are network entities in the packet network and the third node is a mobile decompressor.

75. A method in accordance with claim 65 wherein:
the first and second nodes are network entities in the packet network and the third node is a mobile decompressor.

76. A method in accordance with claim 66 further comprising:
performing a radio handoff from the first network entity to the second network entity before transmitting the at least one packet having a compressed header which is compressed with the compression context information stored at the first node.

77. A method in accordance with claim 67 further comprising:
performing a radio handoff from the first network entity to the second network entity before transmitting the at least one packet having a compressed header which is compressed with the compression context information stored at the first node.

78. A method in accordance with claim 68 further comprising:
performing a radio handoff from the first network entity to the second network entity before transmitting the at least one packet having a compressed header which is compressed with the compression context information stored at the first node.

79. A method in accordance with claim 69 further comprising:
performing a radio handoff from the first network entity to the second network entity before transmitting the at least one packet having a compressed header which is compressed with the compression context information stored at the first node.

80. A method in accordance with claim 70 further comprising:
performing a radio handoff from the first network entity to the second network entity before transmitting the at least one packet having a compressed header which is compressed with the compression context information stored at the first node.

81. A method in accordance with claim 71 further comprising:
performing a radio handoff from the first network entity to the second network entity before transmitting the at least one packet having a compressed header which is compressed with the compression context information stored at the first node.

82. A method in accordance with claim 72 further comprising:
performing a radio handoff from the first network entity to the second network entity before transmitting the at least one packet having a compressed header which is compressed with the compression context information stored at the first node.

83. A method in accordance with claim 73 further comprising:
performing a radio handoff from the first network entity to the second network entity before transmitting the at least one packet having a compressed header which is compressed with the compression context information stored at the first node.

84. A method in accordance with claim 74 further comprising:
performing a radio handoff from the first network entity to the second network entity before transmitting the at least one packet having a compressed header which is compressed with the compression context information stored at the first node.

85. A method in accordance with claim 75 further comprising:
performing a radio handoff from the first network entity to the second network entity before transmitting the at least one packet having a compressed header which is compressed with the compression context information stored at the first node.

86. A method in accordance with claim 58 wherein:
the compression context information is transmitted as part of the transmission of the at least one packet having a compressed header which is compressed with the compression context information stored at the first node.

87. A method in accordance with claim 58 wherein:
the compression context information is received by the second node before the second node receives the at least one additional packet having a compressed header compressed by the compression context information stored at the first node and the corresponding header which is not compressed.

88. A method in accordance with claim 59 wherein:
the compression context information is transmitted as part of the transmission of the at least one packet having a compressed header which is compressed with the compression context information stored at the first node.

89. A method in accordance with claim 59 wherein:
the compression context information is received by the second node before the second node receives the at least one additional packet having a compressed header compressed by the compression context information stored at the first node and the corresponding header which is not compressed.

90. A method in accordance with claim 68 wherein:
the compression context information is transmitted as part of the transmission of the at least one packet having a compressed header which is compressed with the compression context information stored at the first node.

91. A method in accordance with claim 68 wherein:
the compression context information is received by the second node before the second node receives the at least one additional packet having a compressed header compressed by the compression context information stored at the first node and the corresponding header which is not compressed.

92. A method in accordance with claim 78 wherein:
the compression context information is transmitted as part of the transmission of the at least one packet having a compressed header which is compressed with the compression context information stored at the first node.

93. A method in accordance with claim 78 wherein:
the compression context information is received by the second node before the second node receives the at least one additional packet having a compressed header compressed by the compression context information stored at the first node and the corresponding header which is not compressed.

94. A method in accordance with claim 56 further comprising:
transmitting feedback from the third node to the second node which updates the compression context information stored by the second node based upon the feedback.

95. A method in accordance with claim 57 further comprising:
transmitting feedback from the third node to the second node which updates the compression context information stored by the second node based upon the feedback.

96. A method in accordance with claim 58 further comprising:
transmitting feedback from the third node to the second node which updates the compression context information stored by the second node based upon the feedback.

97. A method in accordance with claim 60 further comprising:
transmitting feedback from the third node to the second node which updates the compression context information stored by the second node based upon the feedback.

98. A method in accordance with claim 61 further comprising:
transmitting feedback from the third node to the second node which updates the compression context information stored by the second node based upon the feedback.

99. A method in accordance with claim 64 further comprising:
transmitting feedback from the third node to the second node which updates the compression context information stored by the second node based upon the feedback.

100. A method in accordance with claim 66 further comprising:
transmitting feedback from the third node to the second node which updates the compression context information stored by the second node based upon the feedback.

101. A method in accordance with claim 76 further comprising:
transmitting feedback from the third node to the second node which updates the compression context information stored by the second node based upon the feedback.

102. A method in accordance with claim 86 further comprising:
transmitting feedback from the third node to the second node which updates the compression context information stored by the second node based upon the feedback.

103. A method in accordance with claim 87 further comprising:
transmitting feedback from the third node to the second node which updates the compression context information stored by the second node based upon the feedback.

104. A method in accordance with claim 56 wherein:
the compressed headers are headers having a first order of compression.

105. A method in accordance with claim 56 wherein:
the compressed headers are headers having a second order of compression.

106. A method in accordance with claim 56 wherein:
the compression context information is marked with an identification of which compressed header the compression context information is based; and
the second network entity uses the identification to identify a packet upon which the compression context information is based.

107. A method in accordance with claim 106 wherein:
the second node receives feedback from the third node of the decompression context information used to decompress headers received at the third node.

108. A method in accordance with claim 107 wherein:
when the feedback is received by the second node before the compression context information, the feedback is used to update the compression context information stored at the second node only if the feedback is not older than a time duration of a round trip delay between the first and second nodes and is newer than a packet identified by the identification.

109. A method of transmission of packets having compressed headers comprising:
transmitting at least one packet having a compressed header from a first node in a packet network to a second node in the packet network;
transmitting the at least one packet having a compressed header from the second node to a third node in the packet network which stores decompression context information used by the third node to decompress the at least one packet having a compressed header; and
in response to receiving the at least one packet having a compressed header at the third node transmitting decompression context information used by the third node to decompress the at least one packet having a compressed header to the second node.

110. A method in accordance with claim 109 wherein:
after the transmission of the at least one packet having a compressed header, the first node transmits at least one additional packet having a compressed header to the second node.

111. A method in accordance with claim 110 wherein:
the second node transmits at least one of the at least one packet having a compressed header to the third node.

112. A method in accordance with claim 110 wherein:
the second node decompresses at least one of the at least one additional packet having a compressed header received by the second node with the stored decompression context information; and
the second node transmits the decompressed at least one packet to the third node.

113. A method in accordance with claim 112 wherein:
all of the at least additional packets received by the second node after storage of the decompression context information are decompressed at the second node with the stored context decompression information and transmitted to the third node.

114. A method in accordance with claim 109 wherein:
the second node sends feedback to the third node that the second node has stored the decompression context information.

115. A method in accordance with claim 114 wherein:
in response to the feedback, the third node stops decompressing compressed headers received from the second node.

116. A method in accordance with claim 110 wherein:
the second node sends feedback to the third node that the second node has stored the decompression context information.

117. A method in accordance with claim 116 wherein:
in response to the feedback, the third node stops decompressing compressed headers received from the second node.

118. A method in accordance with claim 111 wherein:

the second node sends feedback to the third node that the second node has stored the decompression context information.

119. A method in accordance with claim 118 wherein:
in response to the feedback, the third node stops decompressing compressed headers received from the second node.

120. A method in accordance with claim 112 wherein:
the second node sends feedback to the third node that the second node has stored the decompression context information.

121. A method in accordance with claim 120 wherein:
in response to the feedback, the third node stops decompressing compressed headers received from the second node.

122. A method in accordance with claim 113 wherein:
the second node sends feedback to the third node that the second node has stored the decompression context information.

123. A method in accordance with claim 122 wherein:
in response to the feedback, the third node stops decompressing compressed headers received from the second node.

124. A method in accordance with claim 111 wherein:
in response to the third node receiving the at least one packet having a compressed header at the second node, the third node transmits additional decompression context information based upon the third node decompressing the at least one additional packet having a compressed header; and
the second node updates the stored decompression context information based upon the received additional decompression context information and decompresses at least one subsequently received packet having a compressed header received from the first node with the updated stored decompression context information.

125. A method in accordance with claim 118 wherein:
in response to the third node receiving the at least one packet having a compressed header at the second node, the third node transmits additional decompression context information based upon the third node decompressing the at least one additional packet having a compressed header; and
the second node updates the stored decompression context information based upon the received additional decompression context information and decompresses at least one subsequently received packet having a compressed header received from the first node with the updated stored decompression context information.

126. A method in accordance with claim 119 wherein:
in response to the third node receiving the at least one packet having a compressed header at the second node, the third node transmits additional decompression context information based upon the third node decompressing the at least one additional packet having a compressed header; and
the second node updates the stored decompression context information based upon the received additional decompression context information and decompresses at least one subsequently received packet having a compressed header received from the first node with the updated stored decompression context information.

127. A method in accordance with claim 109 wherein:
the first node is a mobile compressor and the second and third nodes are network entities.

128. A method in accordance with claim 110 wherein:
the first node is a mobile compressor and the second and third nodes are network entities.

129. A method in accordance with claim 111 wherein:
the first node is a mobile compressor and the second and third nodes are network entities.

130. A method in accordance with claim 112 wherein:
the first node is a mobile compressor and the second and third nodes are network entities.

131. A method in accordance with claim 113 wherein:
the first node is a mobile compressor and the second and third nodes are network entities.

132. A method in accordance with claim 114 wherein:
the first node is a mobile compressor and the second and third nodes are network entities.

133. A method in accordance with claim 115 wherein:
the first node is a mobile compressor and the second and third nodes are network entities.

134. A method in accordance with claim 116 wherein:
the first node is a mobile compressor and the second and third nodes are network entities.

135. A method in accordance with claim 117 wherein:
the first node is a mobile compressor and the second and third nodes are network entities.

136. A method in accordance with claim 118 wherein:
the first node is a mobile compressor and the second and third nodes are network entities.

137. A method in accordance with claim 119 wherein:
the first node is a mobile compressor and the second and third nodes are network entities.

138. A method in accordance with claim 120 wherein:
the first node is a mobile compressor and the second and third nodes are network entities.

139. A method in accordance with claim 121 wherein:
the first node is a mobile compressor and the second and third nodes are network entities.

140. A method in accordance with claim 122 wherein:
the first node is a mobile compressor and the second and third nodes are network entities.

141. A method in accordance with claim 123 wherein:
the first node is a mobile compressor and the second and third nodes are network entities.

142. A method in accordance with claim 124 wherein:
the first node is a mobile compressor and the second and third nodes are network entities.

143. A method in accordance with claim 125 wherein:
the first node is a mobile compressor and the second and third nodes are network entities.

144. A method in accordance with claim 126 wherein:
the first node is a mobile compressor and the second and third nodes are network entities.

145. A method in accordance with claim 109 wherein:
the compressed header of the at least one packet comprises a first order compressed header.

146. A method in accordance with claim 109 wherein: the compressed header of the at least one packet comprises a second order compressed header.

147. A method of transferring context information used for compression of headers of data packets transmitted in a downlink from one of a plurality of network entities to one of a plurality of mobile decompressors when one mobile decompressor is handed off from a first network entity to a second network entity comprising:
storing at the first network entity compression context information to be used at a time at which the mobile decompressor is to be handed off from the first network entity to the second network entity for compression of headers of packets transmitted from the first network entity to the one mobile decompressor;

transmitting from the first network entity to the second network entity the stored compression context information and an identifier of the compression context information which is stored by the second network entity, the compression context information stored by the second network entity being used to compress headers of packets transmitted from the second network entity to the one mobile decompressor;

transmitting from the second network entity to the one mobile decompressor at least one packet having a header compressed with the compression context information stored at the second network entity and the identifier of the compression context information used to compress the at least one packet having a header compressed with the stored compression context information; and using the identifier at the one mobile decompressor to obtain decompression context information and using the stored decompression context information to decompress the at least one packet having a header compressed with the stored context compression information stored at the second network entity.

148. A method in accordance with claim 147 wherein:

the compressed headers comprise first order compressed headers.

149. A method in accordance with claim 147 wherein:

the compressed headers comprise second order compressed headers.

150. A method in accordance with claim 147 further comprising:

performing radio handoff of the one mobile decompressor from the first network entity to the second network entity after the storing the compression context information by the first network entity.

151. A method in accordance with claim 150 wherein:

the performing of radio handoff occurs after the second network entity has stored the compression context information.

152. A method in accordance with claim 148 further comprising:

performing radio handoff of the one mobile decompressor from the first network entity to the second network entity after the storing the compression context information by the first network entity.

153. A method in accordance with claim 152 wherein:

the performing of radio handoff occurs after the second network entity has stored the compression context information.

154. A method in accordance with claim 149 further comprising:

performing radio handoff of the one mobile decompressor from the first network entity to the second network entity after the storing the compression context information by the first network entity.

155. A method in accordance with claim 154 wherein:

the performing of radio handoff occurs after the second network entity has stored the compression context information.

156. A method in accordance with claim 147 wherein:

a plurality of packets having a header compressed with the compression context information and a plurality of identifiers of the compression context information are transmitted from the second network entity to the one mobile decompressor to maintain synchronization of transmissions from the second network entity to the one mobile decompressor.

157. A method in accordance with claim 156 wherein:

the second network entity, after transmission of the plurality of identifiers of the compression context information, stops the transmission of any context identifier and continues transmitting headers compressed with the compression context information identifier.

158. A method in accordance with claim 156 wherein:

the mobile decompressor in response to reception of at least one identifier of the compression context information transmits at least one feedback to the second network entity; and the second network entity in response to receiving the at least one feedback stops the transmission of any identifiers and continues transmitting headers compressed with the compression context information.

159. A method in accordance with claim 158 wherein:

the at least one feedback comprises at least one acknowledgment packet transmitted from the one mobile decompressor to the new network entity.

160. A method in accordance with claim 159 wherein;

the second network entity, in response to reception of the acknowledgment packet, updates the stored compression context information.

161. A method in accordance with claim 160 wherein:

a plurality of packets having a header compressed with the compression context information and a plurality of identifiers of the compression context information are transmitted from the second network entity to the one mobile decompressor to maintain synchronization of transmissions from the second network entity to the one mobile decompressor.

162. A method in accordance with claim 161 wherein:

the second network entity, after transmission of the plurality of identifiers of the compression context information, stops the transmission of any context identifier and continues transmitting headers compressed with the compression context information identifier.

163. A method in accordance with claim 161 wherein:

the mobile decompressor in response to reception of at least one identifier of the compression context information transmits at least one feedback to the second network entity; and the second network entity in response to receiving the at least one feedback stops the transmission of any identifiers and continues transmitting headers compressed with the compression context information.

164. A method in accordance with claim 163 wherein:

the at least one feedback comprises at least one acknowledgment packet transmitted from the one mobile decompressor to the new network entity.

165. A method in accordance with claim 164 wherein;

the second network entity, in response to reception of the acknowledgment packet, updates the stored compression context information.

166. A method in accordance with claim 151 wherein:

a plurality of packets having a header compressed with the compression context information and a plurality of identifiers of the compression context information are transmitted from the second network entity to the one mobile decompressor to maintain synchronization of transmissions from the second network entity to the one mobile decompressor.

167. A method in accordance with claim 166 wherein:

the second network entity, after transmission of the plurality of identifiers of the compression context information, stops the transmission of any context identifier and continues transmitting headers compressed with the compression context information.

168. A method in accordance with claim 166 wherein:

the mobile decompressor in response to reception of at least one identifier of the compression context information transmits at least one feedback to the second network entity; and the second network entity in response to receiving the at least one feedback stops the transmission of any identifiers and continues transmitting headers compressed with the compression context information.

169. A method in accordance with claim 168 wherein:

the at least one feedback comprises at least one acknowledgment packet transmitted from the one mobile decompressor to the new network entity.

170. A method in accordance with claim 169 wherein;

the second network entity, in response to reception of the acknowledgment packet, updates the stored compression context information.

171. A method in accordance with claim 147 wherein:

the identifier is a sequence number.

172. A method in accordance with claim 171 wherein:

the sequence number is an identification number of a packet which last updated the compression context information stored by the second network entity.

173. A method in accordance with claim 171 wherein:

the sequence number is an identification of feedback from the one mobile terminal to the second network entity which last updated the compression context information stored by the second network entity.

174. A method in accordance with claim 147 wherein:

the at least one packet having a header compressed with the compression context information stored at the second network entity is produced from at least one packet having an uncompressed packet header received from the first network entity.

175. A method in accordance with claim 147 wherein:

the at least one packet having a header compressed with the compression context information stored at the second network entity is produced from at least one packet having an uncompressed header received from a source other than the first network entity.

176. A method of transferring context information used for compression of headers of data packets transmitted in an uplink from one of a plurality of mobile compressors to one of a plurality of network entities when one mobile compressor is handed off from a first network entity to a second network entity comprising:

storing decompression context information at the first network entity to be used by the second network entity to decompress data packets having compressed headers transmitted from the one mobile compressor to the second network entity;

transmitting the decompression context information to the second network entity which stores the decompression context information for decompression of headers of packets received from the one mobile compressor;

transmitting a decompression context identifier which identifies the decompression context information to be used by the second network entity from the first network entity to the one mobile compressor;

in response to receiving of the context identifier, the one mobile terminal derives compression context information used for compressing headers of packets transmitted from the one mobile compressor to the second network entity;

the one mobile compressor transmits at least one packet having a compressed header to the second network entity; and the second network entity uses the stored decompression context information to decompress at least one received packet having a compressed header.

177. A method in accordance with claim 176 wherein:

the identifier is a sequence number.

178. A method in accordance with claim 177 wherein:

the sequence number is an identification number of a packet which last updated the decompression context information stored by the second network entity.

179. A method in accordance with claim 177 wherein:

the sequence number is an identification of feedback from the one mobile compressor to the second network entity which last updated the decompression context information stored by the second network entity.

180. A method in accordance with claim 176 wherein:

the compressed headers comprise first order compressed headers.

181. A method in accordance with claim 176 wherein:

the compressed headers combine second order compressed headers.

182. A method in accordance with claim 176 further comprising:

transmitting a handoff command from the first network entity to the one mobile compressor after storing of the decompression context information at the first network entity which causes transfer of the one mobile compressor to the second network entity.

183. A method in accordance with claim 182 wherein:

the handoff command is transmitted with the decompression context identifier to the one mobile compressor.

184. A method in accordance with claim 177 further comprising:

transmitting a handoff command from the first network entity to the one mobile compressor after storing of the decompression context information at the first network entity which causes transfer of the one mobile compressor to the second network entity.

185. A method in accordance with claim 184 wherein:

the handoff command is transmitted with the decompression context identifier to the one mobile compressor.

186. A method in accordance with claim 178 further comprising:

transmitting a handoff command from the first network entity to the one mobile compressor after storing of the decompression context information at the first network entity which causes transfer of the one mobile compressor to the second network entity.

187. A method in accordance with claim 186 wherein:

the handoff command is transmitted with the decompression context identifier to the one mobile compressor.

188. A method in accordance with claim 179 further comprising:

transmitting a handoff command from the first network entity to the one mobile compressor after storing of the decompression context information at the first network entity which causes transfer of the one mobile compressor to the second network entity.

189. A method in accordance with claim 188 wherein:

the handoff command is transmitted with the decompression context identifier to the one mobile compressor.

190. A method in accordance with claim 180 further comprising:

transmitting a handoff command from the first network entity to the one mobile compressor after storing of the decompression context information at the first network entity which causes transfer of the one mobile compressor to the second network entity.

191. A method in accordance with claim 190 wherein:

the handoff command is transmitted with the decompression context identifier to the one mobile compressor.

192. A method in accordance with claim 181 further comprising:

transmitting a handoff command from the first network entity to the one mobile compressor after storing of the decompression context information at the first network entity which causes transfer of the one mobile compressor to the second network entity.

193. A method in accordance with claim 192 wherein:

the handoff command is transmitted with the decompression context identifier to the one mobile compressor.

194. A method in accordance with claim 1 wherein:

the context information transmitted from the first node to the third node comprises a context information component which is time related.

195. A method in accordance with claim 194 wherein:

the context information component which is time related includes elements related to at least one of a time stamp and an arrival time of at least one previous packet.

196. A method in accordance with claim 194 wherein:

the context information component which is time related includes a current timer value.

197. A method in accordance with claim 194 wherein:

the context information component which is time related consists of a current timer value.

198. A method in accordance with claim 26 wherein:

the context information transmitted from the first network entity to the second network entity comprises a context information component which is time related.

199. A method in accordance with claim 198 wherein:

the context information component which is time related includes elements related to at least one of a time stamp and an arrival time of at least one previous packet.

200. A method in accordance with claim 198 wherein:

the context information component which is time related includes a current timer value.

201. A method in accordance with claim 198 wherein:

the context information component which is time related consists of a current timer value.

202. A method in accordance with claim 33 wherein:

the decompression context information transmitted from the first network entity to the second network entity comprises a context information component which is time related.

203. A method in accordance with claim 202 wherein:

the context information component which is time related includes elements related to at least one of a time stamp and an arrival time of at least one previous packet.

204. A method in accordance with claim 202 wherein:

the context information component which is time related includes a current timer value.

205. A method in accordance with claim 202 wherein:

the context information component consists of a current timer value.

206. A method in accordance with claim 56 wherein:

the context information transmitted from the first node to the third node comprises a context information component which is time related.

207. A method in accordance with claim 205 wherein:

the context information component which is time related includes elements related to a time stamp and an arrival time of at least one previous packet.

208. A method in accordance with claim 205 wherein:

the context information component which is time related includes a current timer value.

209. A method in accordance with claim 205 wherein:

the context information component consists of a current timer value.

210. A method in accordance with claim 109 wherein:

the decompression context information is transmitted from the third node to the second node comprises a context information component which is time related.

211. A method in accordance with claim 210 wherein:

the context information component which is time related includes elements related to at least one of a time stamp and an arrival time of at least one previous packet.

212. A method in accordance with claim 210 wherein:

the context information component which is time related includes a current timer value.

213. A method in accordance with claim 210 wherein:

the context information component consists of a current timer value.

214. A method in accordance with claim 147 wherein:

the context information transmitted from the first network entity to the second network entity comprises a context information component which is time related.

215. A method in accordance with claim 214 wherein:

the context information component which is time related includes elements related to at least one of a time stamp and an arrival time of at least one previous packet.

216. A method in accordance with claim 214 wherein:

the context information component which is time related includes a current timer value.

217. A method in accordance with claim 214 wherein:

the context information component consists of a current timer value.

218. A method in accordance with claim 176 wherein:

the decompression context information transmitted from the first network entity to the second network entity comprises a context information component which is time related.

219. A method in accordance with claim 218 wherein:

the context information component which is time related includes elements related to at least one of a time stamp and an arrival time of at least one previous packet.

220. A method in accordance with claim 218 wherein:

the context information component which is time related includes a current timer value.

221. A method in accordance with claim 218 wherein:

the context information component consists of a current timer value.

222. A method of transferring context information including a decompression context information component which is time related used for decompression of headers of packets transmitted in an uplink from one of a plurality of mobile compressors to one of a plurality of network entities before a relocation of a decompression function from a first network entity to a second network entity comprising:

transmitting at least one compressed header from the one mobile compressor through second network entity to the first network entity;

starting a timer at the second network entity which stores a time of reception of packets;

decompressing the at least one compressed header at the first network entity;

after the decompressing of the at least one compressed header at the first network entity transmitting a portion of the decompression context information component which is time related from the first network entity to the second network entity;

storing the portion of the decompression context information component which is time related at the second network entity;

storing a time of reception of at least one additional packet with a compressed header received from the one mobile compressor and transmitting the at least one additional packet to the first network entity which decompresses the at least one additional packet and obtains another portion of the decompression context information component which is time related;

transmitting the another portion of the decompression context information component which is time related to the second network entity; and after storing of the time of reception of the at least one additional packet and the another portion of the decompression context information component which is time related storing a complete decompression context information component at the second network entity and decompressing at least one packet having a compressed header received at the second network entity using the stored complete decompression context information component.

223. A method in accordance with claim 222 wherein:
the portion comprises non-time varying time related information.

224. A method in accordance with claim 223 wherein:
the portion comprises TSO and T_stride.

225. A method in accordance with claim 222 wherein the another portion comprises:
a time stamp or other information of the at least one additional packet.

226. A method in accordance with claim 223 wherein the another portion comprises:
a time stamp or other information of the at least one additional packet.

227. A method in accordance with claim 224 wherein the another portion comprises:
a time stamp or other information of the at least one additional packet.

228. A method in accordance with claim 222 wherein:
an identifier is transmitted with the at least one compressed header;
the first network entity returns the identifier along with a time stamp; and
the second network entity uses the identifier to correlate and determine which of the at least one compressed header with which the time stamp is associated.

229. A method in accordance with claim 228 wherein:
the identifier is a sequence number.

230. A method in accordance with claim 229 wherein:
an identifier is transmitted with the at least one compressed header;
the first network entity returns the identifier along with a time stamp; and
the second network entity uses the identifier to correlate and determine which of the at least one compressed header with which the time stamp is associated.

231. A method in accordance with claim 230 wherein:
the identifier is a sequence number.

232. A method of transferring context information including a compression context information component which is time related used for compression of headers of packets transmitted in a downlink from one of a plurality of network entities to one of a plurality of mobile decompressors before a relocation of a compression function from a first network entity to a second network entity comprising:

starting a timer at the second network entity which stores a time of reception of packets;

transmitting at least one packet having a compressed header from the first network entity to the second network entity including a portion of the compression context information component which is time related;

storing the portion of the component of compression context information component which is time related at the second entity;

storing a time of reception and a time stamp of the least one additional packet having a compressed header and a corresponding uncompressed header received or information elements from the corresponding uncompressed header from the first network entity at the second network entity;

transmitting at least one additional packet containing the compressed header to the one mobile decompressor and decompressing the at least one additional packet at the one mobile decompressor;

transmitting feedback to the second network entity that the one mobile decompressor has decompressed the at least one additional packet with a compressed header; and after reception of the feedback determining that the stored portion is sufficient to function as the compression context information component which is time related and starting compression of subsequent packets at the second network entity which are transmitted to the one mobile decompressor using the stored portion as the compression context information component which is time related.

233. A method in accordance with claim 232 further comprising:
transmitting feedback from the second network entity to the first network entity that the second network entity is starting compression of the subsequent packets; and
the first network entity, in response to the feedback, stops transmission of packets having compressed headers to the second network entity.

234. A method in accordance with claim 232 wherein:
the portion of the compression context information component which is time related comprises non-time varying time related information.

235. A method in accordance with claim 234 wherein:
the portion comprises TSO and T_stride.

236. A method in accordance with claim 233 wherein:
the portion of the compression context information component which is time related comprises non-time varying time related information.

237. A method in accordance with claim 236 wherein:
the portion comprises TSO and T_stride.

238. A method in accordance with claim 232 wherein:
the feedback to the second network entity enables the second network entity to determine that the stored portion, a time stamp and a time of reception of at least one additional packet is sufficient to function as the compression context information component which is time related.

239. A method of transferring context information including a compression context information component which is time related used for compression of headers of packets transmitted in a downlink from one of a plurality of network entities to one of a plurality of mobile decompressors before a relocation of a compressor function from a first network entity to a second network entity comprising:
starting a timer at the second network entity which stores a time of reception of packets;
transmitting at least one packet having a compressed header from the first network entity to the second network entity including a portion of the compression context information component which is time related;
storing the portion of the time related component of compression context information component which is time related at the second network entity;
transmitting a plurality of additional packets having a compressed header and a corresponding uncompressed header from the first network entity to the one mobile decompressor via the second network entity;
after reception of the plurality of additional packets at the second network entity having a compressed header and a corresponding uncompressed headers, storing at the second network entity a second portion of the compression context information which is time related component obtained from the plurality of additional packets;
after the stored first and second portions of the compression context information components which are time related, obtaining and storing a complete compression context information component which is time related used for compression of headers at the second network entity; and
using the stored complete compression context information component which is time related to compress at least one subsequent packet at the second network entity and transmitting the compressed at least one subsequent packet to the one mobile decompressor.

240. A method in accordance with claim 239 wherein the second portion comprises:
a time stamp and time of reception of the plurality of additional packets.

241. A method in accordance with claim 239 further comprising:
decompressing the at least one subsequent packet at the one mobile terminal.

242. A method in accordance with claim 240 further comprising:
decompressing the at least one subsequent packet at the one mobile terminal.

243. A method in accordance with claim 239 wherein:
a number of the plurality of additional headers is chosen to be sufficient to be probable that at least one of the plurality of additional headers transmitted to the one mobile decompressor is received by the one mobile decompressor.

244. A method in accordance with claim 240 wherein:
a number of the plurality of additional headers is chosen to be sufficient to be probable that at least one of the plurality of additional headers transmitted to the one mobile decompressor is received by the one mobile decompressor.

245. A method in accordance with claim 241 wherein:
a number of the plurality of additional headers is chosen to be sufficient to be probable that at least one of the plurality of additional headers transmitted to the one mobile decompressor is received by the one mobile decompressor.

246. A method in accordance with claim 242 wherein:
a number of the plurality of additional headers is chosen to be sufficient to be probable that at least one of the plurality of additional headers transmitted to the one mobile decompressor is received by the one mobile decompressor.

247. A method of compressing headers of packets transmitted from a second entity to a third entity after the third entity has been handed off from a first entity to the second entity comprising:
storing at the second entity original compression context information derived from a first plurality of packets;
producing an additional plurality of compressed headers from uncompressed headers at the second entity using the original compression context information derived from a plurality of headers obtained by adding to the first plurality of headers new compressed headers which are transmitted to the third entity for decompression; and
after transmitting the plurality of additional compressed headers, discarding the headers in the first plurality of headers and using compression context information derived from the plurality of additional compressed headers to compress at least one subsequent uncompressed header at the second entity which is transmitted as a compressed header to the third entity.

248. A method in accordance with claim 247 wherein:
the original and additional plurality of compressed headers contain an identical number of packets.

249. A method in accordance with claim 248 wherein:
the original and additional plurality of compressed headers are tracked by age; and
after the original plurality of compressed headers are discarded, the additional plurality of compressed headers are updated upon reception of each new header by adding each new header to the additional plurality of compressed headers and discarding an oldest compressed header in the additional plurality of compressed headers.

250. A method in accordance with claim 247 wherein:
the third entity decompresses headers of received packets using decompression context information in synchronism with an identifier contained in each received compressed packet and updates decompression context information stored by the third entity from the decompressed headers.

251. A method in accordance with claim 247 wherein:
the compression context information comprises time related information.

252. A method in accordance with claim 251 wherein:

the time related information comprises a time stamp, a time of transmission of the packets, TSO and TS_stride.

253. A method in accordance with claim 247 wherein:

the identical number of packets is chosen to have a probability that at least one packet is received by the third entity.

254. A method in accordance with claim 253 wherein:

the transmission medium is radio transmission medium.

255. A method in accordance with claim 250 wherein:

the decompression context information of the third entity is updated with a first received packet containing a compressed header compressed by the second entity.

256. A method of compressing headers of packets transmitted from a third entity to a second entity after the third entity has been handed off from a first entity to the second entity comprising:

storing at the third entity original compression context information derived from a first plurality of packets;

producing an additional plurality of compressed headers from uncompressed headers at the third entity using the original compression context information derived from a plurality of headers obtained by adding to the first plurality of headers new compressed headers which are transmitted to the second entity for decompression; and after transmitting the plurality of additional compressed headers, discarding the headers in the first plurality of headers and using compression context information derived from the plurality of additional compressed headers to compress at least one subsequent uncompressed header at the third entity which is transmitted as a compressed header to the second entity.

257. A method in accordance with claim 256 wherein:

the original and additional plurality of compressed headers contain an identical number of packets.

258. A method in accordance with claim 257 wherein:

the original and additional plurality of compressed headers are tracked by age; and after the original plurality of compressed headers are discarded, the additional plurality of compressed headers are updated upon reception of each new header by adding each new header to the additional plurality of compressed headers and discarding an oldest compressed header in the additional plurality of compressed headers.

259. A method in accordance with claim 256 wherein:

the second entity decompresses headers of received packets using decompression context information in synchronism with an identifier contained in each received compressed packet and updates decompression context information stored by the second entity from the decompressed headers.

260. A method in accordance with claim 256 wherein:

the compression context information comprises time related information.

261. A method in accordance with claim 260 wherein:

the time related information comprises a time stamp, a time of transmission of the packets, TSO and TS_stride.

262. A method in accordance with claim 256 wherein:

the identical number of packets is chosen to have a probability that at least one packet is received by the second entity.

263. A method in accordance with claim 262 wherein:

the transmission medium is radio transmission medium.

264. A method in accordance with claim 259 wherein:

the decompression context information of the second entity is updated with a first received packet containing a compressed header compressed by the third entity.

* * * * *